United States Patent [19]
Nozue et al.

[11] Patent Number: 5,627,987
[45] Date of Patent: May 6, 1997

[54] MEMORY MANAGEMENT AND PROTECTION SYSTEM FOR VIRTUAL MEMORY IN COMPUTER SYSTEM

[75] Inventors: Hiroshi Nozue; Mitsuo Saito; Kenichi Maeda; Shigehiro Asano; Toshio Okamoto; Shin Sungho; Hideo Segawa, all of Tokyo, Japan

[73] Assignee: Kabushiki Kaisha Toshiba, Kawasaki, Japan

[21] Appl. No.: 21,098

[22] Filed: Feb. 23, 1993

Related U.S. Application Data

[63] Continuation-in-part of Ser. No. 983,149, Nov. 30, 1992, abandoned.

[30] Foreign Application Priority Data

| Nov. 29, 1991 | [JP] | Japan | 3-317085 |
| Jan. 16, 1992 | [JP] | Japan | 4-026040 |
| Mar. 31, 1992 | [JP] | Japan | 4-076776 |
| Jan. 13, 1993 | [JP] | Japan | 5-003937 |

[51] Int. Cl.[6] ............................ G06F 12/00; G06F 12/14
[52] U.S. Cl. .................... 395/410; 395/800; 395/417; 395/427; 395/491; 364/DIG. 1; 364/DIG. 2
[58] Field of Search ............................... 395/800, 425, 395/417, 427, 491, 410; 364/DIG. 1, DIG. 2

[56] References Cited

U.S. PATENT DOCUMENTS

| 4,035,779 | 7/1977 | Birney et al. | 364/200 |
| 4,037,214 | 7/1977 | Birney et al. | 364/200 |
| 4,047,243 | 9/1977 | Dijkstra | 364/200 |
| 4,521,846 | 6/1985 | Scalzi et al. | 364/200 |
| 4,669,043 | 5/1987 | Kaplinsky | 364/200 |
| 4,677,546 | 6/1987 | Freeman et al. | 364/200 |
| 4,899,275 | 2/1990 | Sachs et al. | 364/200 |
| 5,023,773 | 6/1991 | Baum et al. | 364/200 |
| 5,075,845 | 12/1991 | Lai et al. | 395/425 |
| 5,301,287 | 4/1994 | Herrell et al. | 395/400 |
| 5,319,760 | 6/1994 | Mason et al. | 395/400 |
| 5,321,841 | 6/1994 | East et al. | 395/725 |
| 5,390,310 | 2/1995 | Welland | 395/400 |
| 5,454,091 | 9/1995 | Sites et al. | 395/413 |

FOREIGN PATENT DOCUMENTS

1-273153  11/1989  Japan .

OTHER PUBLICATIONS

HP Laboratories Technical Report; A comparison of *Protection Lookaside Buffers* and the PA–RISC protection architecture; John Wilkes and Bart Sears; Mar. 1992, pp. 1–11.

*Primary Examiner*—Thomas G. Black
*Assistant Examiner*—Valerie Darbe
*Attorney, Agent, or Firm*—Oblon, Spivak, McClelland, Maier & Neustadt, P.C.

[57] ABSTRACT

A memory management and protection system for realizing a high speed execution and a proper and flexible memory access control for multiple programs sharing an identical logical address space. In the system, the memory access is permitted according to a segment identifier identifying a segment in the logical address space, and a memory protection information for a region in each segment including a target right permission to indicate assigned rights to make a memory access from the region to each of the segments, and an execution permission to indicate a type of the memory access permitted by the right permission. Alternatively, a memory access can be permitted by using an access control list to be attached to each address table entry, which stores a plurality of program numbers identifying programs which are permitted to make accesses to the logical address stored in each address table entry, among which one that matches with the current program number is to be searched. Also, it is preferable to allocate a plurality of programs within a limit of available memory protection capacity to an identical logical address space, without any overlap between adjacently allocated address regions.

13 Claims, 56 Drawing Sheets

FIG.5A
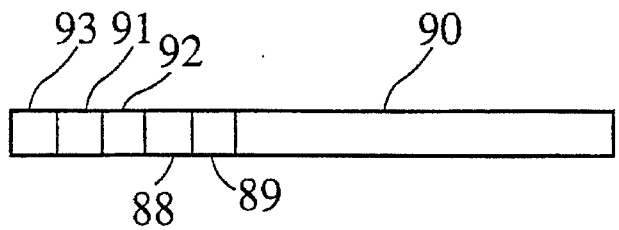
FIG.5B
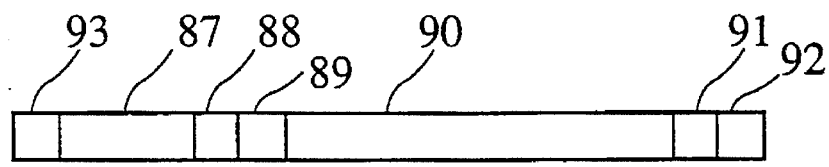
FIG.5C
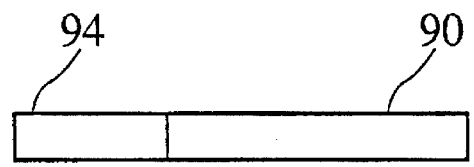
FIG.5D
| OPERATION TYPE CODE | CONTENT |
|---|---|
| 0 0 0 | invalid |
| 0 0 1 | read only |
| 0 1 0 | write only |
| 0 1 1 | read write |
| 1 0 0 | execute only |
| 1 0 1 | execute read |
| 1 1 0 | transit |
| 1 1 1 | execute read write |

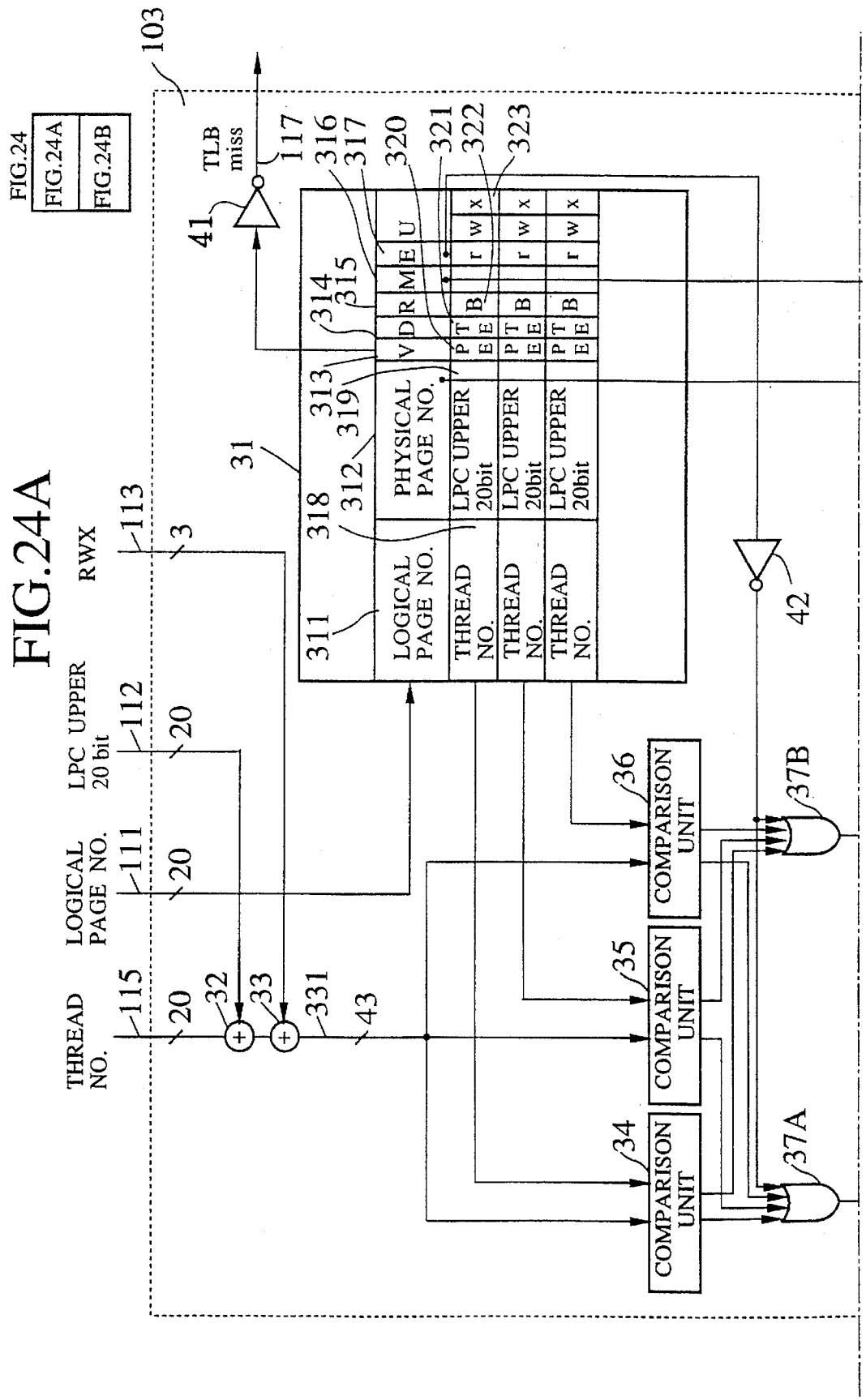

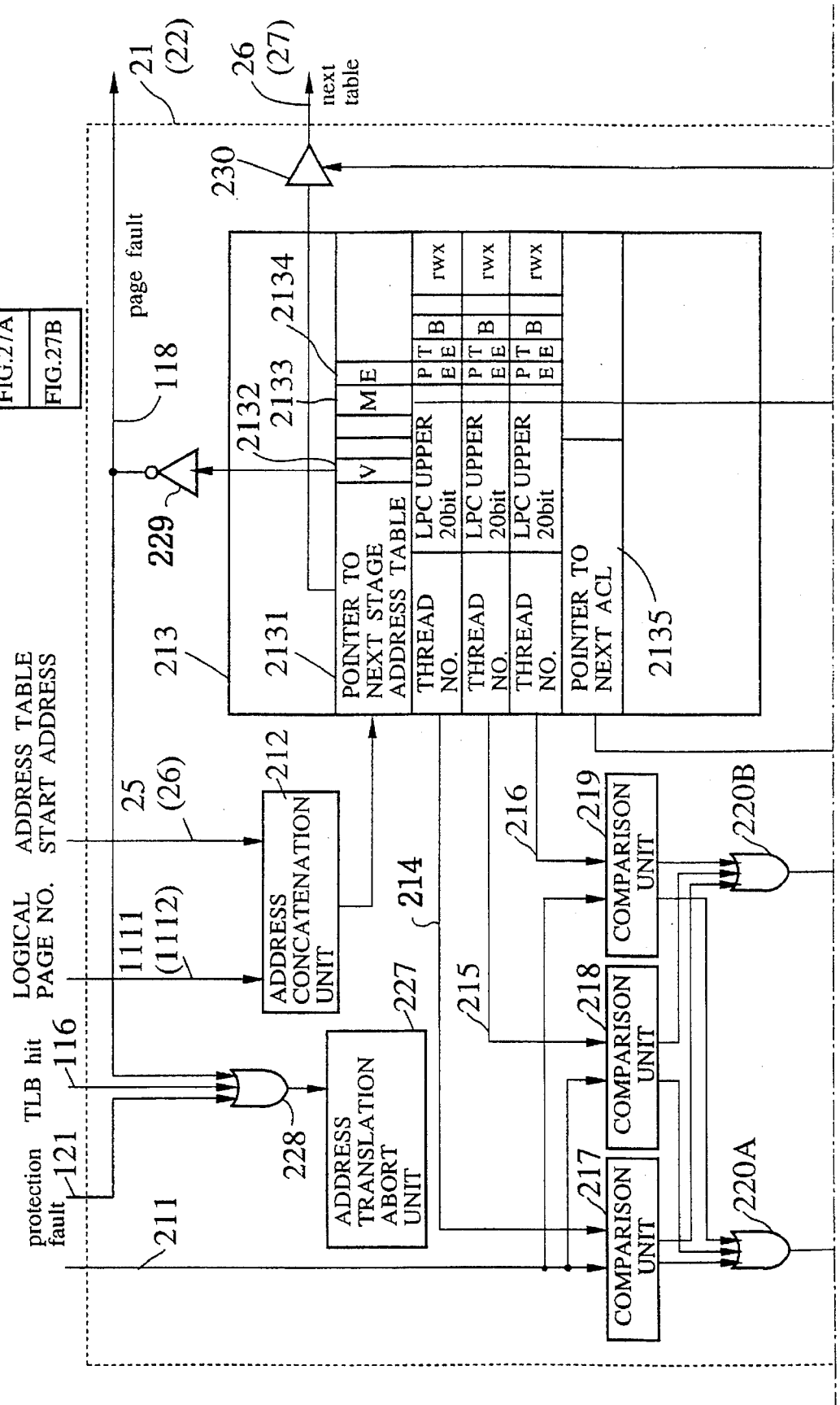

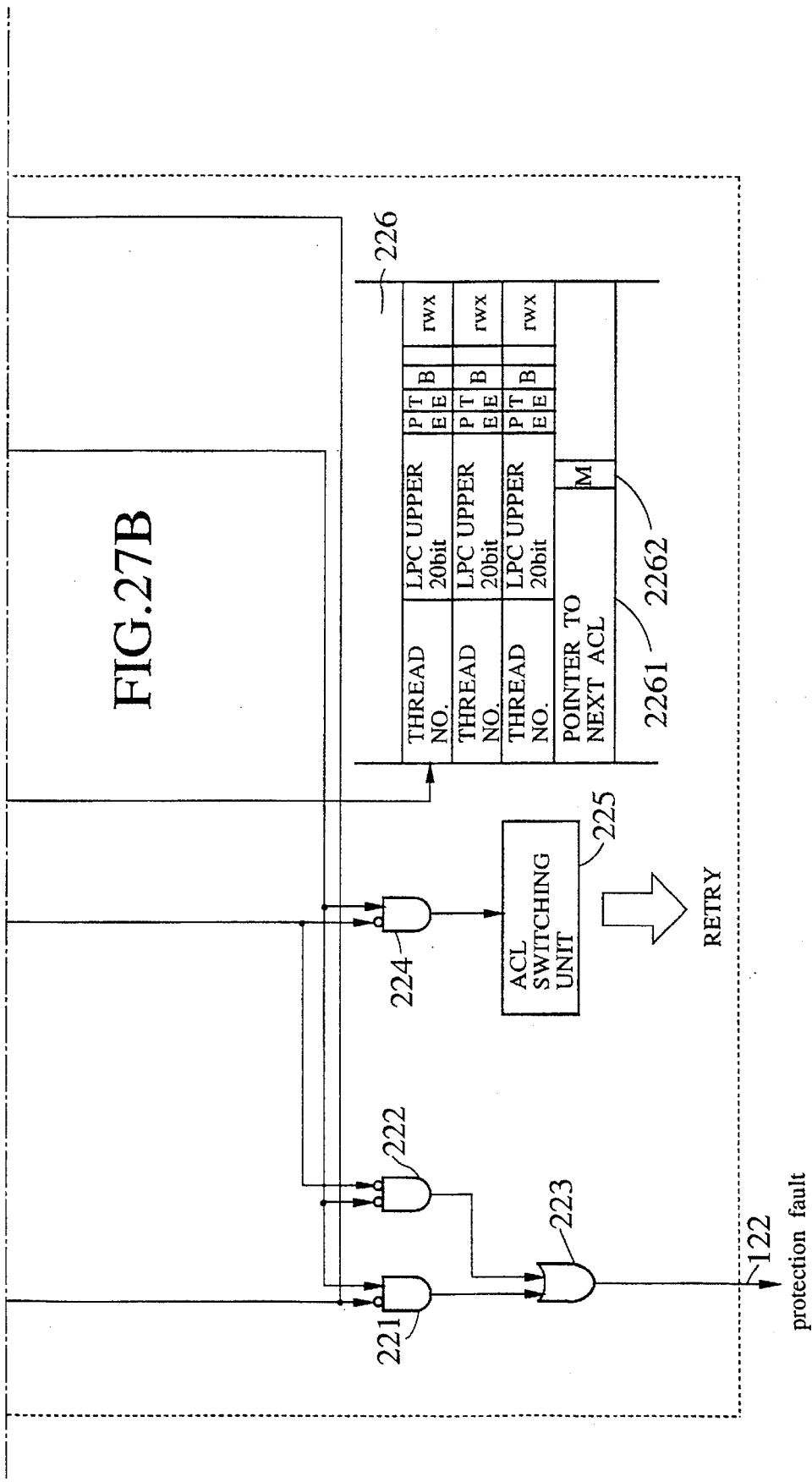

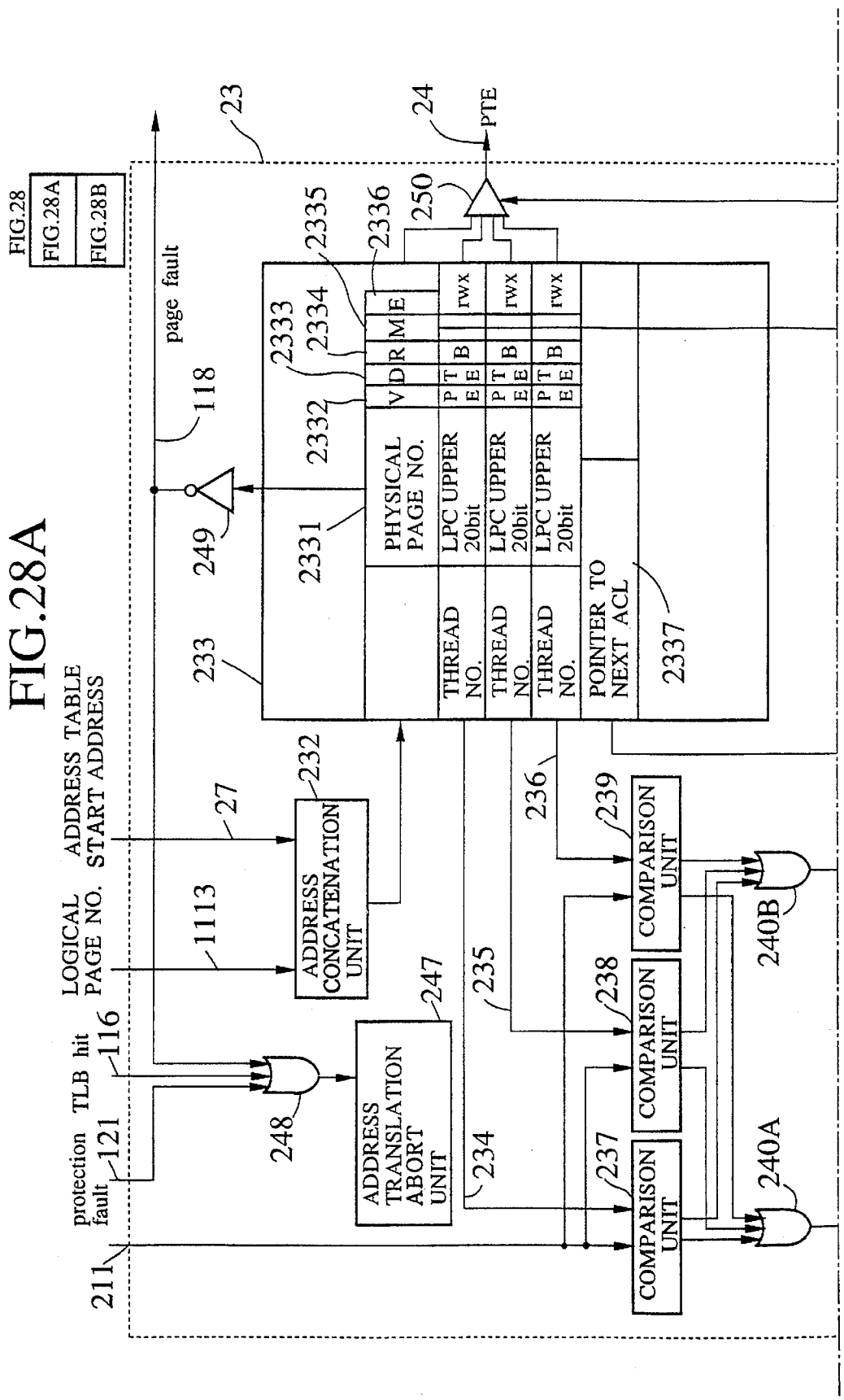

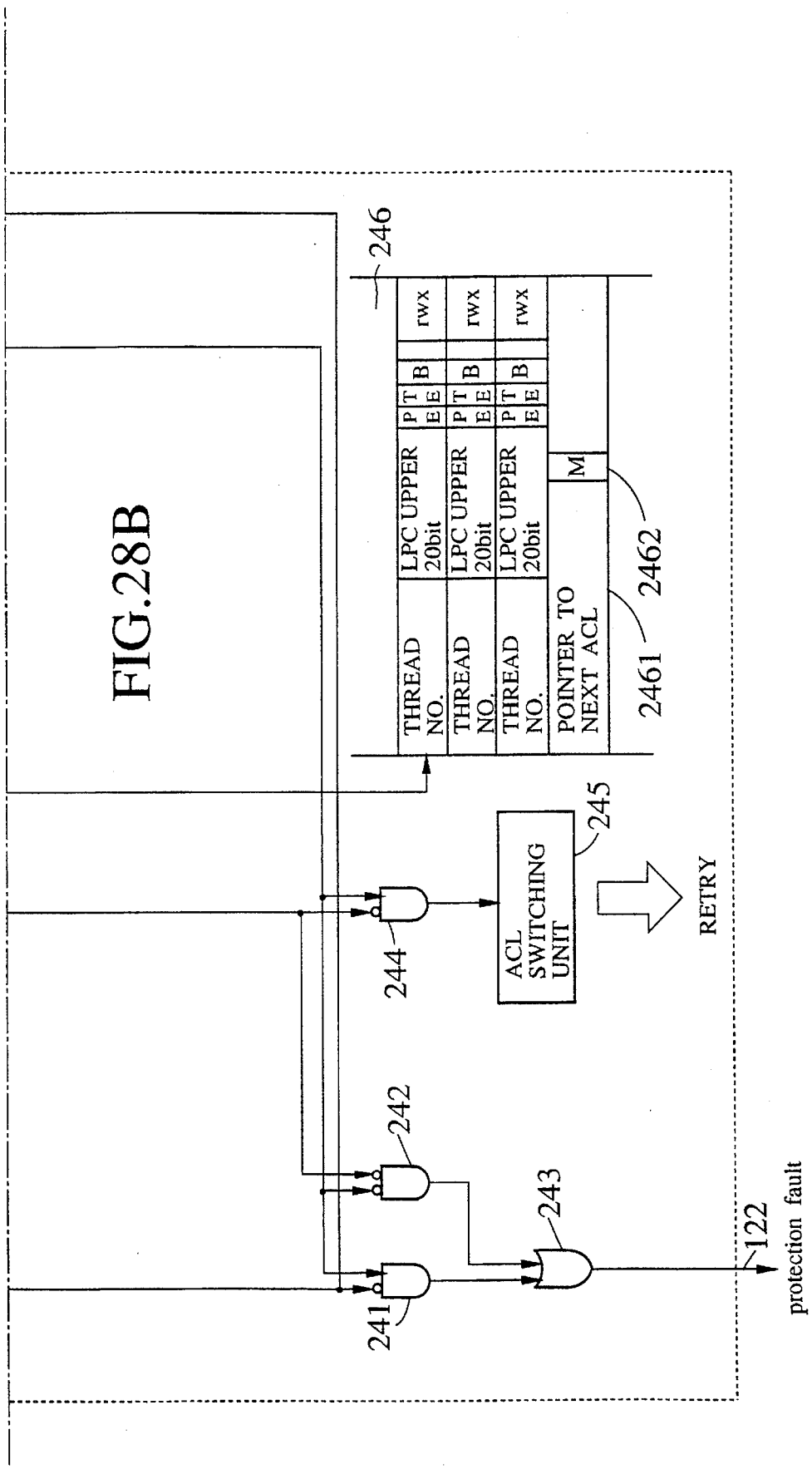

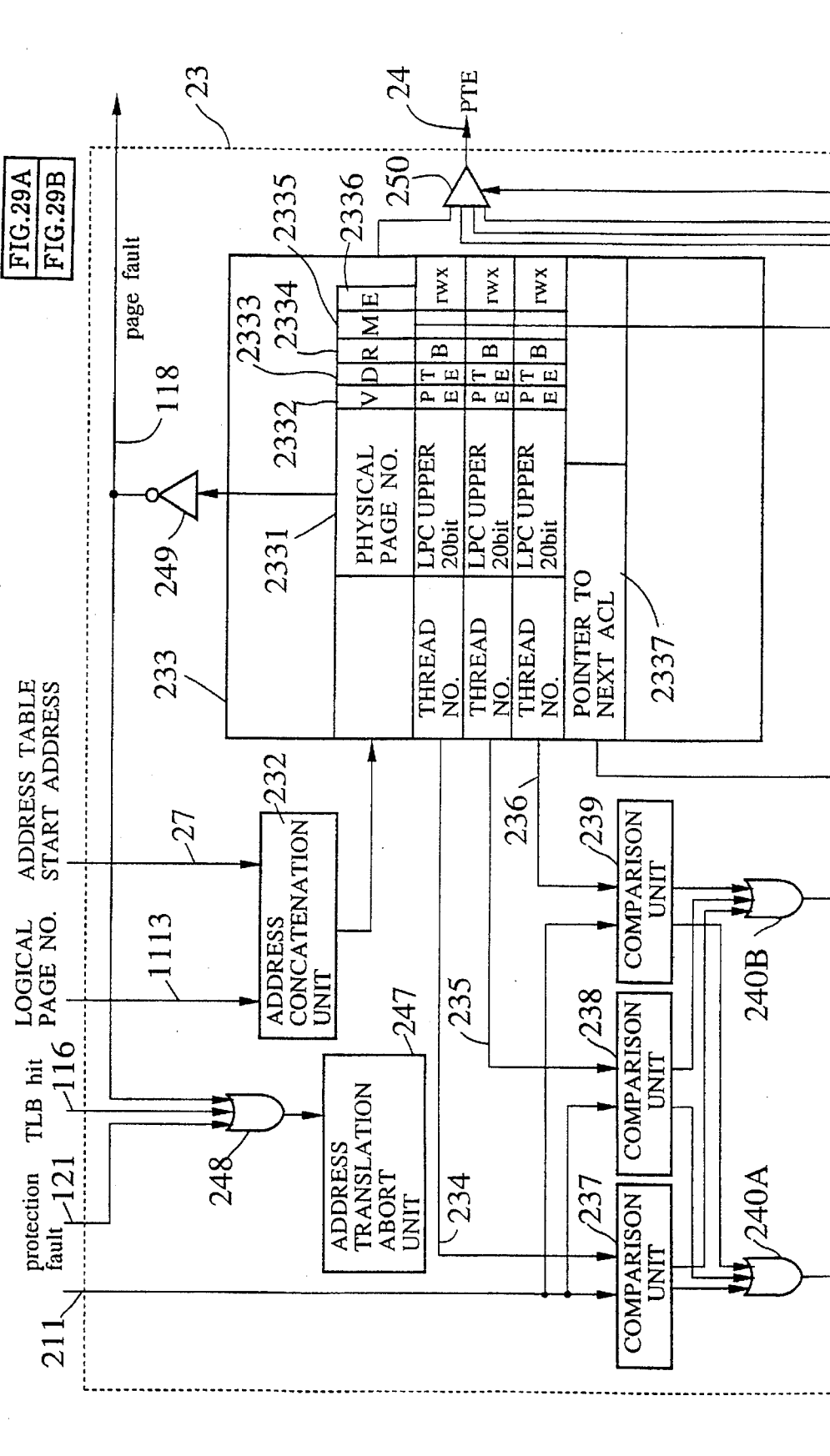

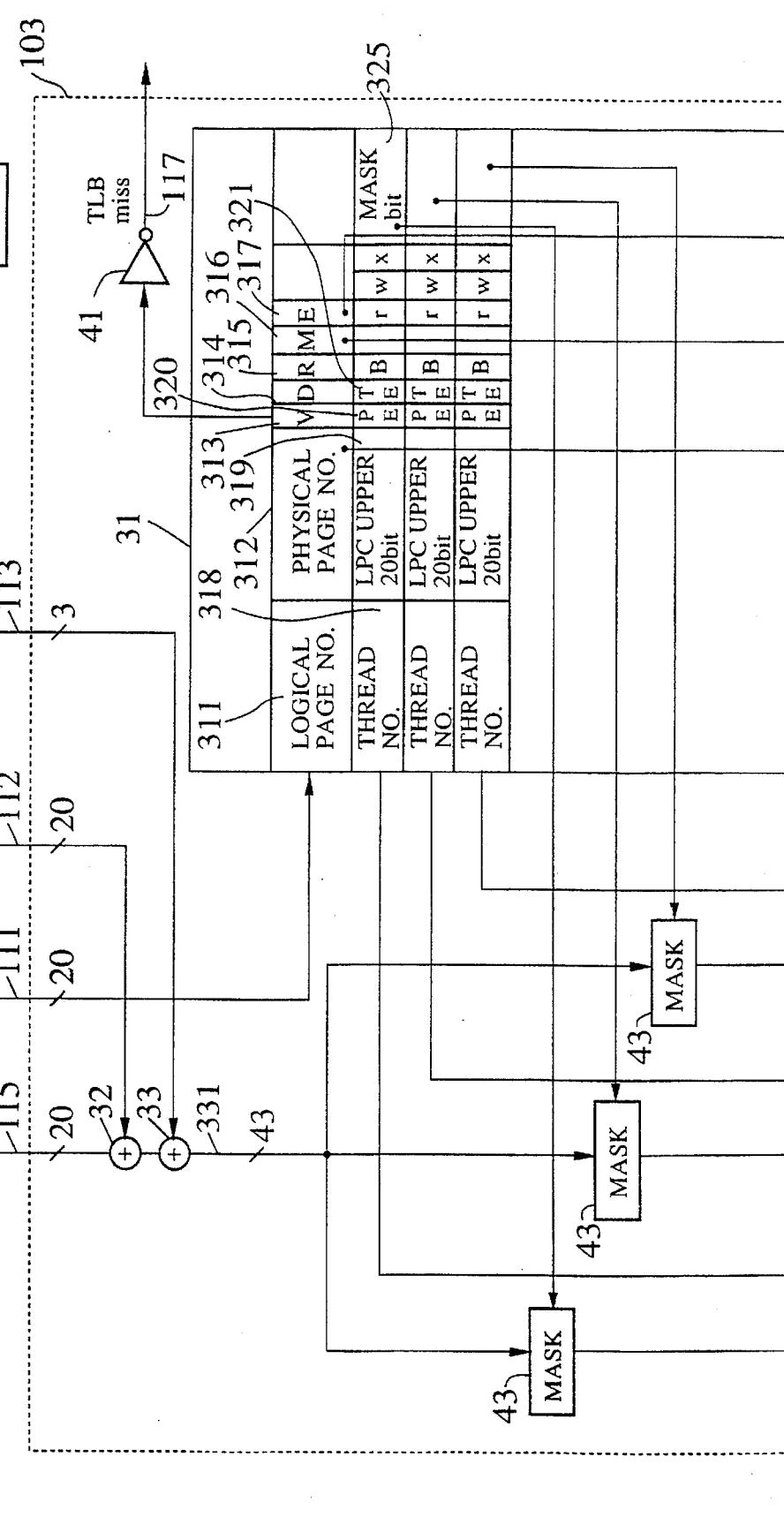

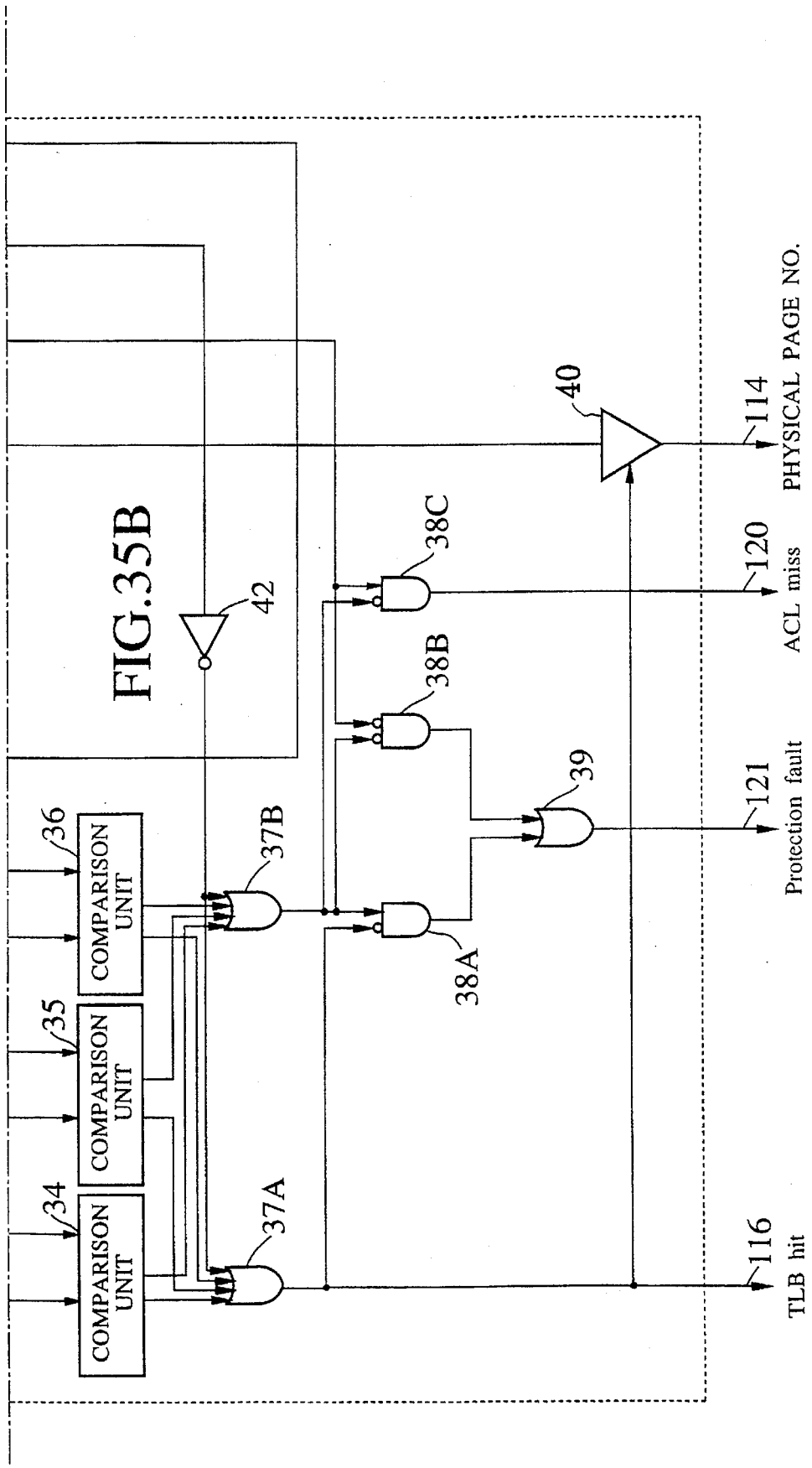

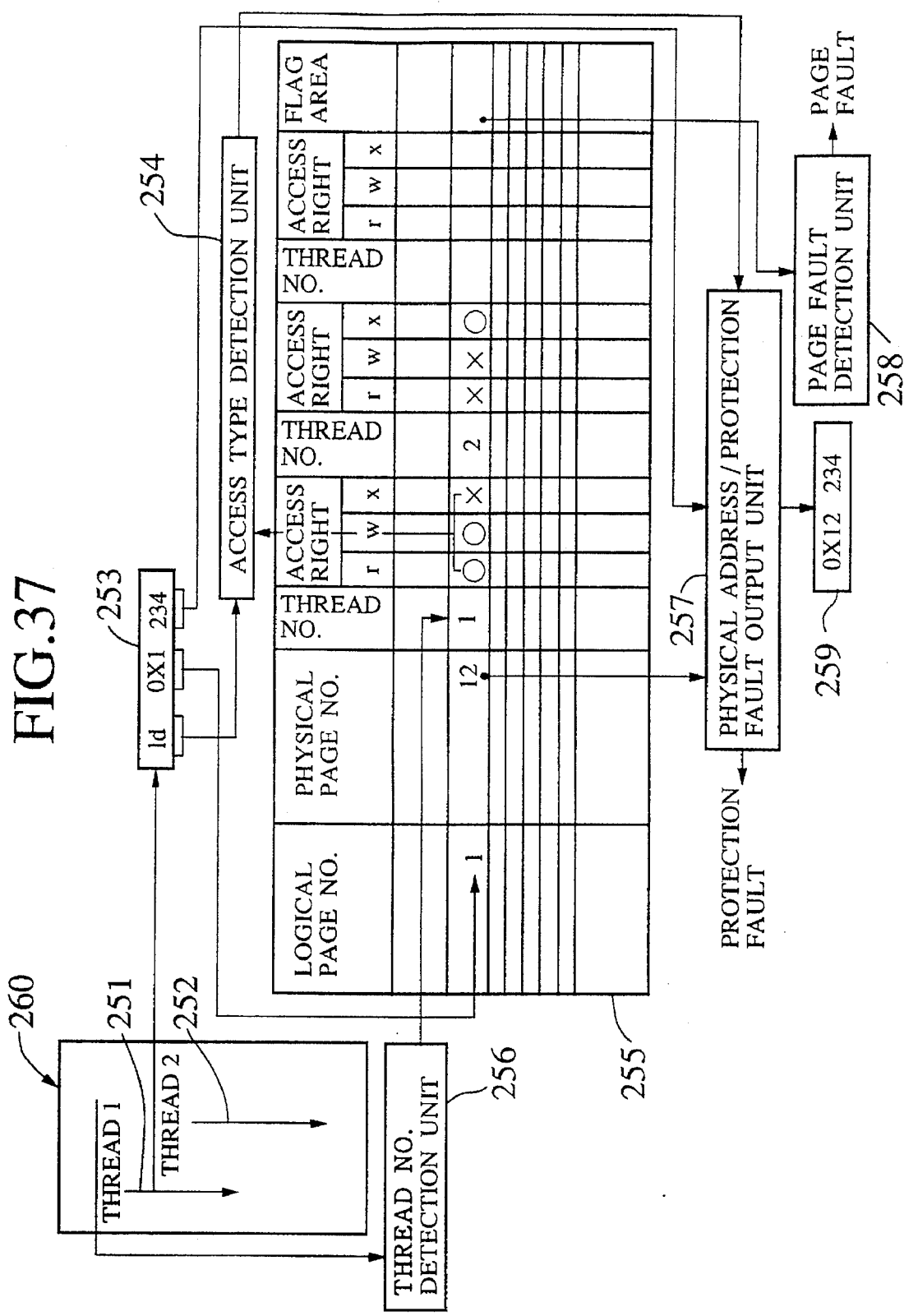

FIG.42A
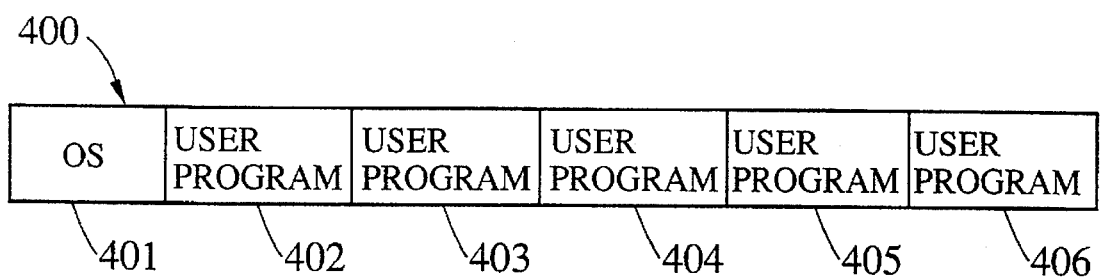
FIG.42B
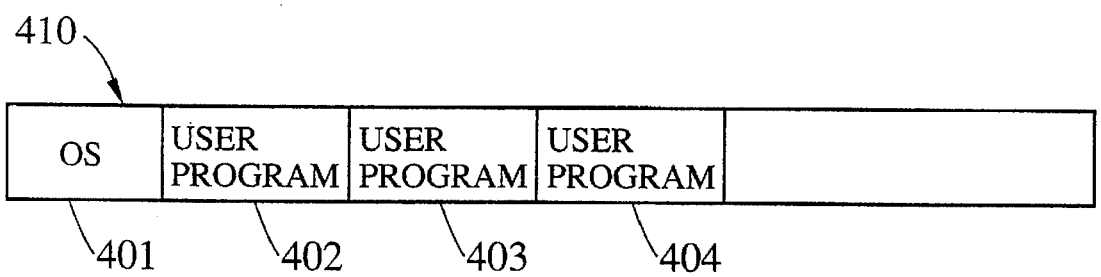
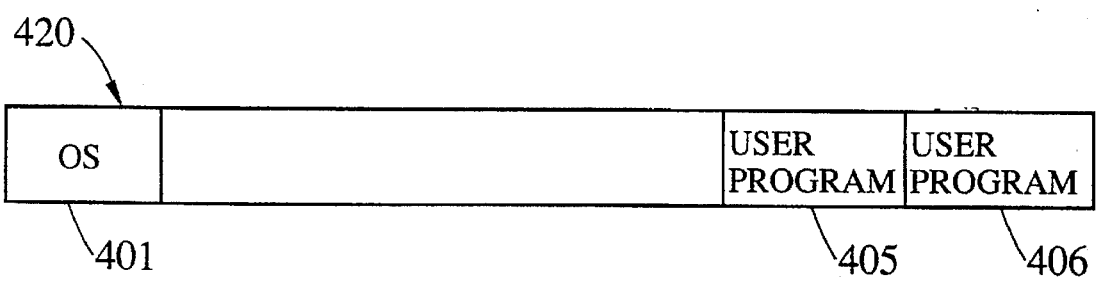

| START ADDRESS | END ADDRESS | PROGRAM ID | PROGRAM NAME. | STATE | OTHER INFO |
|---|---|---|---|---|---|
| 0 | 32M-1 | 0 | USER PROGRAM-1 | IN USE | |
| 32M | 64M-1 | 1 | USER PROGRAM-2 | IN USE | |
| 64M | 96M-1 | 2 | USER PROGRAM-3 | IN USE | |
| 640M | 672M-1 | 20 | | EMPTY | |

FIG.45

| REGION NO. | START ADDRESS | END ADDRESS | PROGRAM NAME | STATE | LOGICAL ADDRESS SPACE NO. | PROTECTION KEY | OTHER INFO |
|---|---|---|---|---|---|---|---|
| 0 | 0 | 32M-1 | USER PROGRAM-1 | IN USE | 2 | 0 | |
| 1 | 32M | 64M-1 | USER PROGRAM-2 | IN USE | 2 | 1 | |
| 2 | 64M | 96M-1 | USER PROGRAM-3 | IN USE | 2 | 2 | |
| 3 | 96M | 128M-1 | USER PROGRAM-4 | IN USE | 3 | 0 | |
| 4 | 160M | 192M-1 | USER PROGRAM-5 | IN USE | 3 | 1 | |
| 5 | 192M | 224M-1 | USER PROGRAM-6 | IN USE | 3 | 2 | |
| 6 | 224M | 256M-1 | USER PROGRAM-7 | EMPTY | — | — | |
| ... | ... | ... | ... | ... | ... | ... | |

FIG.46

| LOGICAL ADDRESS SPACE NO. | PROTECTION KEY | STATE | REGION NO. | OTHER INFO |
|---|---|---|---|---|
| 0 | 0 | EMPTY | - | |
| 0 | 1 | EMPTY | - | |
| 0 | 2 | EMPTY | - | |
| 1 | 0 | EMPTY | - | |
| 1 | 1 | EMPTY | - | |
| 1 | 2 | EMPTY | - | |
| 2 | 0 | IN USE | 0 | |
| 2 | 1 | IN USE | 1 | |
| 2 | 2 | IN USE | 2 | |
| 3 | 0 | IN USE | 3 | |
| 3 | 1 | IN USE | 4 | |
| 3 | 2 | IN USE | 5 | |
| ⋮ | ⋮ | ⋮ | ⋮ | |

FIG.49

| | INVALIDATION BIT | LOGICAL ADDRESS | PHYSICAL ADDRESS |
|---|---|---|---|
| 1ST LINE | 0 | a ○ ○ | A ○ ○ |
| 2ND LINE | 1 | b □ □ | B □ □ |
| 3RD LINE | 0 | a △ △ | A △ △ |
| | ⋮ | ⋮ | ⋮ |
| n-TH LINE | 0 | a × × | A × × |

| to<br>from | 412 | 413 | 414 | 415 | 416 | 417 |
|---|---|---|---|---|---|---|
| 412 | ○ | × | × | ○ | ○ | ○ |
| 413 | × | ○ | × | ○ | ○ | ○ |
| 414 | × | × | ○ | ○ | ○ | ○ |
| 415 | × | × | × | ○ | × | × |
| 416 | × | × | × | × | ○ | × |
| 417 | × | × | × | × | × | ○ |

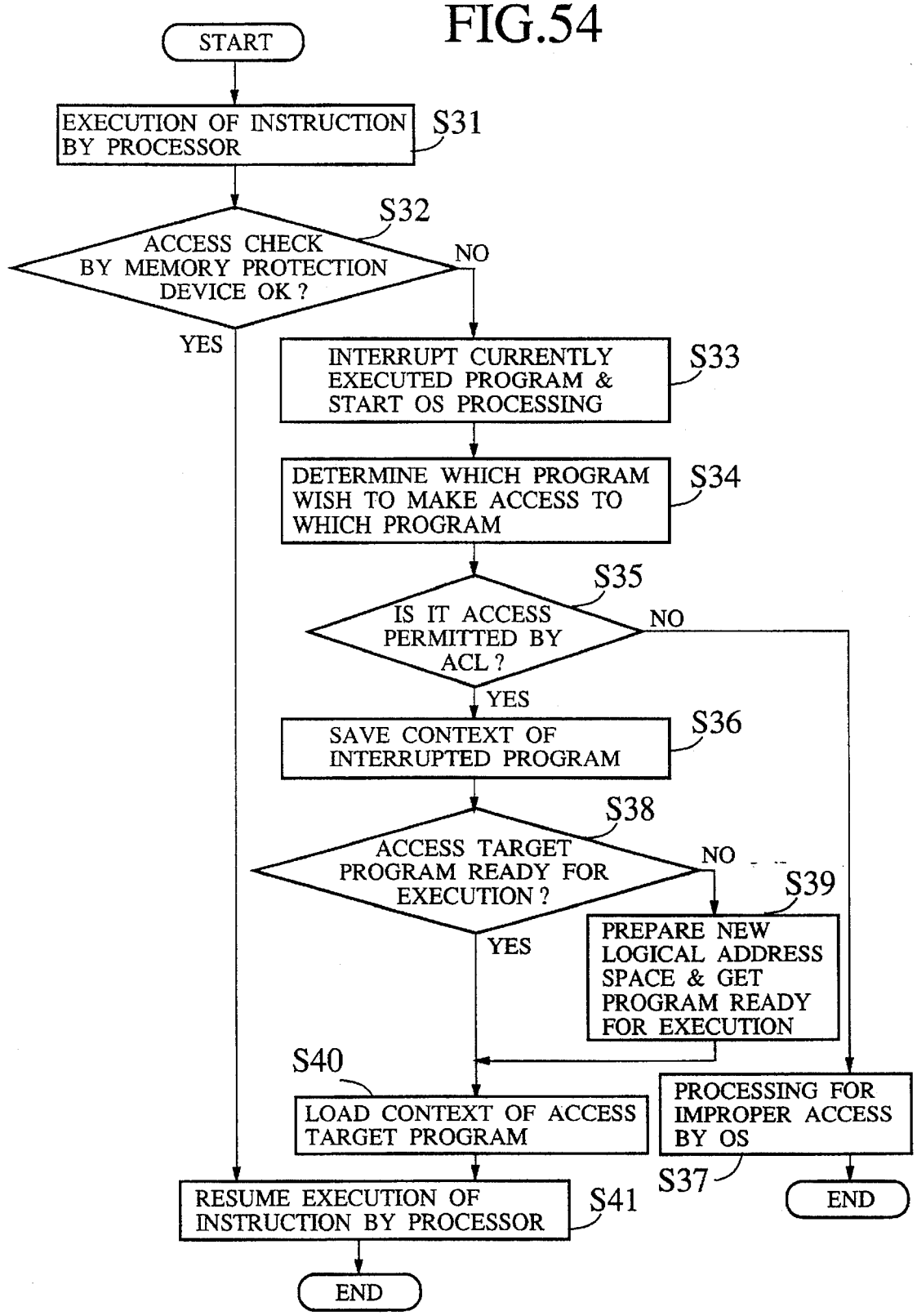

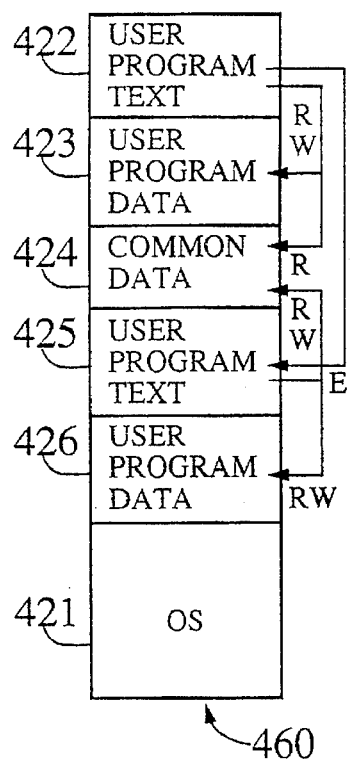
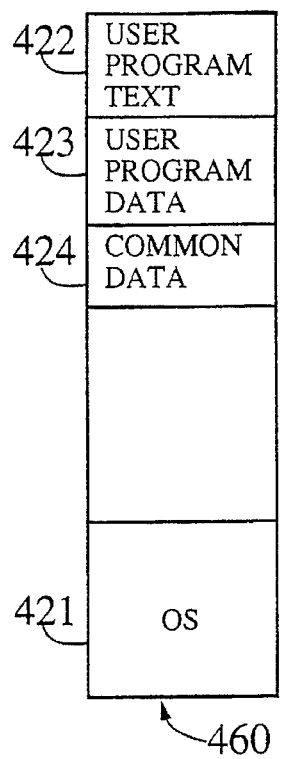
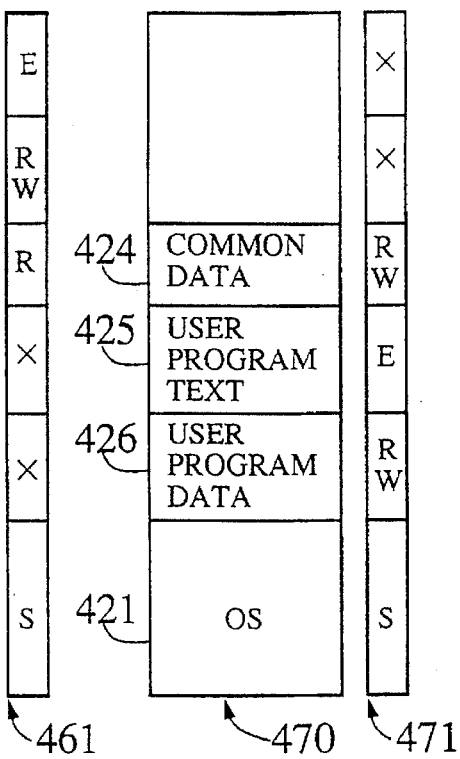
FIG.56
| to from | 422 | 423 | 424 | 425 | 426 |
|---|---|---|---|---|---|
| 422 | E | RW | R | E | X |
| 423 | X | X | R | E | X |
| 424 | X | X | R | E | X |
| 425 | X | X | RW | E | RW |
| 426 | X | X | R | E | X |
| ALL | X | X | R | E | X |

MEMORY MANAGEMENT AND PROTECTION SYSTEM FOR VIRTUAL MEMORY IN COMPUTER SYSTEM

This is a continuation-in-part application of our earlier, commonly assigned application Ser. No. 07/983,149 filed on Nov. 30, 1992, which is now abandoned.

BACKGROUND OF THE INVENTION

1. Field of the Invention

The present invention relates to a computer system using a virtual memory, and more particularly, to the memory management and the protection for controlling memory accesses to the virtual memory in the computer system.

2. Description of the Background Art

Conventionally, in a computer system using a virtual memory, a so called MMU (Memory Management Unit) has been used in translating the logical addresses to the physical addresses and protecting the memory region specified by the physical addresses. In a usual MMU, a program number uniquely assigned to each program is utilized for distinguishing a plurality of programs which can make accesses to the memory, such that the same logical address can be translated into different physical addresses for the different programs.

In such a computer system using a virtual memory, it has become popular in recent years to employ a programming mode such as a server-client type programming in which a plurality of programs sharing the same data are executed in mutual cooperation, as a result of the recent progresses made in the network technique and the parallel processing technique. In such a programming mode, a plurality of memory accesses are made from a plurality of programs to the identical physical address storing the shared data, so that it becomes necessary to provide a memory region protection in order to limit the memory accesses made from the plurality of programs to only those which are judged as proper ones.

To this end, a conventionally employed memory region protection method has been that which utilizes the program number as the identifier for indicating a program from which each memory access originates. Namely, in such a conventional memory region protection method, each data is accompanied by the program number of the program which may make accesses to this data, while the program numbers available to each program are appropriately assigned to each program as an identifier in advance. Then, the access to each data is permitted only when this access is judged as a proper one having the identifier indicating the program number which matches with the program number accompanying each data. The well known examples of this type of a conventional memory region protection method include a segmentation method and a ring protection method.

In a segmentation method, a dedicated memory region can be secured for each program by assigning a unique program number available only to that program, while a shared memory region for a plurality of programs can be secured by assigning a program number commonly available to these plurality of programs, so that the highly flexible memory region protection can be realized.

However, in order to deal with a plurality of program numbers, it becomes necessary in this segmentation method to provide a plurality of identifier storage registers and a plurality of identifier comparators. As a consequence, this segmentation method has been associated with the following problems.

Firstly, there is a case in which a number of identifier storage registers are occupied with respect to a single physical address, such that the address translation for the other physical addresses cannot be carried out efficiently. For example, in a case a number of entries in the address table is constant, when a plurality of entries are occupied by a number of identical logical and physical address pairs with different program numbers assigned, the types of the physical addresses that can be stored in the address table can be reduced considerably. Such a situation is equivalent to a case in which the address table covers only a limited range of the address space. When the covered range of the address space is limited, the probability at which the address given from the processor makes a hit at the address table becomes lower and a number of address table misses increases, such that a time required for the address table miss recovery operation increases. This time required for the address table miss recovery operation is counted as a part of the overall address translation time, so that the average overall address translation time is increased considerably in such a case.

Secondly, when the program to be executed is switched from one program to another, the entries accompanied by the program numbers used in the previously executed program are invalidated regardless of whether the program numbers are shared by the next program to be executed, so that the operation for filling the address table entries is required even for the shared program numbers. For example, in a case two programs sharing the logical address space are to be executed alternatively, when a new entry is required, the entries accompanied by the program numbers used in the previously executed program are invalidated regardless of whether these entries belong to the shared logical address space or not. In order to fill these invalidated entries anew, it becomes necessary to carry out the operations of address translation and the program number matching for each entry all over again, and the time required for these address translation and program number matching operations is counted as a part of the overall address translation time, so that in a case of the switching of the program to be executed, the average overall address translation conversion time is increased considerably. In the worst case, the time required for these address translation and program number matching can occupy the major part of the overall address translation time, as the invalidation of the entries occur every time the program to be executed is switched.

Thirdly, it becomes necessary to check the properness of the rights to make accesses for a plurality of programs simultaneously, so that the operation for checking the properness of the rights to make accesses can be quite complicated. For example, in a case a plurality of programs share the identical logical address space, an entry in the address table is set up for each of the program numbers. In such a case, when a page swapping occurred, it becomes necessary to invalidate all the entries related to the specific logical address or physical address, whereas when a plurality of entries made hits, it becomes necessary to select the valid one among the plurality of entries making hits, and the time required for these operation for invalidating all the related entries and selecting the valid entry is counted as a part of the overall address translation time. Here, the number of related entries are unknown, so that the operation can be quite complicated as a great number of different states must be accounted for.

Now, there is an alternative manner of handling a plurality of program numbers in the segmentation method in which a specialized instruction is provided in the processor side to specify the program number at a time of execution. The switching operation using such a specialized instruction is effective in reducing the number of identifier storage registers so that the time required for the exchange of the segment registers can be shortened. However, in this case, each execution of each instruction becomes quite time consuming, so that it has been difficult to improve the throughput of the program. Thus, in the segmentation method, it is easy to separate the different programs completely, but it requires a large number of additional hardware and complicated operations to share the data among the programs.

In addition, in the segmentation method, there is a problem that it is necessary to provide a flexible protection check mechanism capable of dealing with different types of accesses differently permitted to different programs and different levels of the rights to make accesses differently endowed to different programs. For example, in a case a plurality of programs share the data, very frequently, there is a case in which only one program is permitted to update the data and the other programs are only permitted to read this data.

Also, there is a case in which it is necessary to provide the hierarchical protection among the programs according to the difference of the content and the level of the programs such as Kernel, OS, and application programs. The method to achieve such a hierarchical protection is known as a ring protection method.

In order to cope with such cases, it is necessary to provide each entry of the address table with a field for specifying a data access type and a field for specifying a ring level, so as to distinguish the data in different specified levels as different entries.

In the ring protection method, the program numbers are hierarchically ordered to establish strength relationships in which the transition of the control toward the stronger region is limited to only those which are made through a proper procedure, and the data access toward the stronger region is prohibited, such that the directionality can be provided in the accesses among the protected regions. In this ring protection method, one program number can have a right to make accesses to a plurality of regions, so that the number of identifiers can be reduced and the time required for switching the identifiers can be shortened. In addition, the check of the properness of the program number can be made by comparing the sizes of the identifier of the accessing side and the identifier of the accessed side at a time of the access, so that there is no need to provide a specialized instruction to the processor side in this ring protection method.

However, this ring protection method has a drawback that the set up of the protection regions is not very flexible because it is predetermined that the overlapping region between the region for one identifier and the region for another identifier is to be regarded as the region for the stronger identifier.

Now, in general, in the ring protection method, a kernel program is positioned at the strongest level, and the protection levels of the other programs are determined according to the absolute strength relationship of each program with respect to the kernel program.

However, in a case of the server-client type programming in which a plurality of programs are executed in mutual cooperation, there is a case in which the hierarchical relationship among the program changes in every execution, so that it has been difficult to set up the absolute protection level for each program in advance.

The strength relationships established among the memory regions in the ring protection method is shown in FIG. 1, in which segment-1 to -4 corresponds to the different programs such as kernel, OS, library, and application programs. Here, in order for each of the kernel program and the OS program to have a dedicated data region, the segment-3 and the segment-4 corresponding to the OS program and the kernel program must be assigned to the same protection level as shown in FIG. 1, and the dedicated data regions of these two programs must be managed the method other than the ring protection method, so as to make the dedicated data region of one hidden from the dedicated data region of another.

However, in FIG. 1, there are four protection levels provided in correspondence to four programs, so that when the kernel program and the OS program are assigned to the same protection level, there will be a protection level to which no program is assigned. In other words, there are cases in which the programs having no hierarchical relationship with each other must be assigned to the same protection level, and the protection level having no program assigned exist. Such a conflict of the hierarchical relationships occurs at a higher possibility as a number of programs to be allocated into the protection space increases, and makes the management of the different protection levels difficult.

Thus, the ring protection method is suitable for a case in which the cooperative relationships among the programs are simple and fixed, but lacking in an ability to express semi-ordered hierarchical relationships among the programs.

As a consequence, in the ring protection method, it is impossible for the memory protection device to set up the strength relationships among the programs dynamically according to the progress of the programs. In addition, in the ring protection method, a region belonging to a certain protection level is accessible from the regions belong to the stronger protection levels, so that it has been impossible to provide a dedicated region for a program belonging to an intermediate protection level.

Moreover, in the ring protection method, there is a possibility for the entries of the address table to be occupied by the identical logical and physical address pairs, so that the ring protection method also has the drawback of the extended average memory access time, similar to the segmentation method. Furthermore, in the ring protection method, there is a case in which a plurality of entries make hits in an address table look up, and it becomes necessary in such a case to select the valid one among the plurality of entries making hits. Also, when a number of programs share the OS region, it is required to manage a certain group of programs collectively, but this has been impossible in the conventional ring protection method and it would have been necessary to manage each entry separately.

Now, the virtual memory to be used in a computer system is in either one of a single virtual space scheme in which a plurality of programs to be executed in parallel are loaded into one virtual space, or a multiple virtual space scheme in which each of the plurality of programs to be executed in parallel is allocated to separate one of a plurality of virtual spaces.

For example, in the UNIX system, the different processes are allocated to different virtual spaces. For this reason, when the multiple processes are executed, the virtual space must be switched when the process is switched and the hit rates for the TLB (Translation Look-aside Buffer) and cache devices can be deteriorated considerably. In other words, the TLB and cache devices which are provided for the purpose of increasing the execution speed would not operate effectively in such a multiple process environment.

Here, it is noted that, in the TLB and cache devices, the data and the physical addresses are searched by using the virtual addresses used in each program as keys, and the address positions are usually fixed regardless of the program so that the virtual address positions are common to all the programs. For this reason, when the data of the previously executed program are left in the TLB and cache devices, there is a possibility for causing an erroneous hit during the execution of the new program after the program switching.

In order to prevent the occurrence of such an erroneous hit, conventionally, a space number for identifying each virtual space has been provided in addition to the virtual addresses, and the consistency of the TLB and cache devices with respect to the main memory device are checked every time the context is switched. However, these conventional provisions require an extra amount of hardware, and also make the software operation to be used in the context switching very complicated, so that the increase of the execution speed could not have been realized without introducing considerable disadvantages in other practical aspects.

Despite of this difficulty, the performance under such a multiple process environment has become increasingly important because of the increasing use of the server-client type programming in which a plurality of programs sharing the same data are executed in mutual cooperation, due to the considerable advantages of the server-client type programming that the server program and the client program can be developed separately and flexibly such that each program can be developed to have a wider applicability and a longer lifetime.

In this regard, the size of the OS has been increased so much recently, because of the increasing number of functions to be supported by the OS, such that the OS is no longer provided as a single program as it used to be but separated into a plurality of mutually cooperating programs according to the types of the functions to be supported. Similarly, there are cases in which the application programs are also provided as a plurality of mutually hidden programs, in order to improve the software productivity. In such a case in which a plurality of programs are to be operated in mutual cooperation, the operations related to the context switching and the copying of the argument which are to be carried out by the data processing unit become quite time consuming.

In order to resolve this problem, it has been considered desirable to omit the operation related to the switching of the programs by allocating a plurality of programs to a single virtual space. Here, in a conventional scheme such as that shown in FIG. 2 in which a plurality of user programs 601 to 605 are separately allocated to separate virtual spaces under the OS 600 while these user programs 601 to 605 are using the same address region, it is impossible for one user program to make an improper access to the data of the other user program as each user program is allocated to separate virtual space. However, when the scheme to allocate a plurality of programs to a single virtual space is adopted, the data of the other programs, which have been inaccessible in the multiple virtual space scheme, become accessible as all the programs are allocated to the same virtual space, so that there is a need to provide a mechanism to control the accesses according to the properness of each access.

However, when the conventional segmentation method is utilized for this purpose, an enormous amount of hardware would be required such that the switching of the access regions would be quite complicated, while when the conventional ring protection method is utilized for this purpose, the protection ranges cannot be set up freely among the programs because the strength relationships cannot be changed dynamically in the ring protection method. Consequently, it has conventionally been difficult to realize the simple and flexible protection of the memory regions among a plurality of programs in which the protection ranges can be set up freely.

In summary, there has been the following three major S problems in the conventional memory management and the protection system for controlling memory accesses to the virtual memory in the computer system adopting a server-client type programming mode in which a plurality of programs sharing the same data are executed in mutual cooperation.

First of all, as the programs are allocated to different logical address spaces separately, it becomes necessary for the programs allocated to different address spaces to exchange the data through the operating system (OS) in order to share the data among them, but this causes a considerable slow down of the processing speed due to the overhead of the OS.

Here, it is possible to devise a method in which a plurality of threads are executed on a single logical address space such that the sharing of the data among the threads can be achieved without causing any overhead to the OS.

However, such a method does not account for the protection of the data among the threads, so that in order to protect the data used by one thread from the other threads, it becomes necessary to employ a scheme requiring a large overhead to the OS. Namely, to this end, it becomes necessary to allocate each thread to different logical address space along with those data which are accessible from this thread. This scheme actually requires a considerably large overhead to the OS so that it is quite impractical to adopt this scheme.

Thus, the first major problem is that it has been impossible for each program to have the different types of accesses that are permitted to each thread.

Secondly, in order to provide a logical address space for each thread separately, it becomes necessary to provide a page table for each logical address space and allocate the same program to the same address region in the different logical address spaces. However, this in turn requires all the threads which are commonly accessible to a certain address region to have the same logical address and physical address pair in respective page tables, such that the memory capacity to be used by the page tables of all the threads must be provided redundantly to a large extent.

Here, when the types of accesses permitted to all the threads which are accessible to the commonly accessible address region are identical, it becomes possible to share a part of the page tables among a plurality of threads, but in a case of using a TLB (Table Look-aside Buffer) as a cache device for the page table, the redundancy cannot be avoided and the average processing speed for the address translation is inevitably slowed down accordingly.

The reason for this drawback is as follows. Namely, each entry of the cache of the page table has a pair of a page table information and a thread number, so that different cache entries are required for different threads even when the page table information is identical. Consequently, a number of cache entries having the same page table information but different thread numbers will occupy a large portion of the cache, such that a number of actually different physical addresses that can be stored in the cache will be reduced, and therefore the processing speed for the address translation will be slowed down.

In addition, there is also a drawback that the information related to the same page must be placed and managed on a plurality of page tables, such that the processing for the paging becomes quite complicated. For instance, in a case a plurality of threads are mapping the identical physical address to different logical address spaces, when it becomes necessary to page out a certain page, it becomes necessary to search and invalidate all the entries of the page tables which are mapped to that certain page. Similarly, in a case of page In, it becomes necessary to search and validate all the entries of the page tables which are mapped to that certain page. The additional time required for these operations will be added to the average address translation processing time, so that the processing speed for the address translation will be slowed down.

Thus, the second major problem is that the memory capacities required for the page tables and the page table caches are redundant and the management of the page tables and the page table caches becomes quite complicated and inefficient.

Thirdly, it has been considered effective in some applications to change the access rights permitted to each thread depending on which thread is executing a program on which address region in each logical address space. For example, when the data on a certain address region can be changed only by the thread executing the programs on another certain address region, the data on that certain address region can be changed while maintaining certain conditions. In a case the data of the database are allocated to that certain address region while the access routines for the data of the database are allocated to that another certain address region, it becomes possible to make accesses to the data of the database without requiring the intermediate use of the OS. While protecting the data of the database sufficiently, so that the high speed access processing becomes possible.

On the other hand, a conventionally memory management unit such as the Intel's 80486 processor has been capable only of changing the access rights by limiting the range of the programs that can be executed by each thread by using the segmentation scheme and shifting from one access level to another access level by using a call gate. In other words, such a conventional memory management unit has been lacking a flexibility in that the access rights can only be controlled among the elements related by an order relationship, such as the application programs with respect to the OS and the kernel, such that the element at a higher access level will become accessible to all the elements at lower access levels, because a number of different access levels realizable has been limited by the hardware.

Thus, the third major problem is that it has been impossible to flexibly change the permitted access rights for each address region, in a case the programs and data are allocated to a plurality of divided address regions within the single logical address space.

SUMMARY OF THE INVENTION

It is therefore an object of the present invention to provide a memory management and protection system for a virtual memory in a computer system, in which the protection ranges can be set up freely, without requiring a use of a special instruction on a processor side, an extension of the data processing time, and the considerable increase of hardware.

It is another object of the present invention to provide a memory management and protection system for a virtual memory in a computer system, capable of providing a proper and flexible control of the memory accesses made by a plurality of programs sharing an identical logical address space, without requiring an extension of the data processing time.

It is another object of the present invention to provide a memory management and protection system for a virtual memory in a computer system, capable of realizing a high speed execution of multiple programs by effectively utilizing the TLB and the cache devices.

According to one aspect of the present invention there is provided a memory management and protection system for controlling memory accesses to a logical address space managed in terms of segments, comprising: segment information extraction means for obtaining a target segment identifier for identifying a target segment containing a logical address to be accessed in the segments of the logical address space, according to the logical address; memory protection information extraction means for obtaining a target memory protection information for a target region containing the logical address to be accessed in the target segment identified by the target segment identifier, according to the logical address, the memory protection information including a target right permission to indicate assigned rights to make a memory access from the target region to each of the segments of the logical address space, and a target execution permission to indicate a type of the memory access permitted by the target right permission as one of instruction access and data access; and memory access permission means for permitting the memory access to the logical address according to the target segment identifier and the target memory protection information.

According to another aspect of the present invention there is provided a memory management and protection system, comprising: address table means having a plurality of address table entries, each address table entry storing a logical address and a physical address corresponding to the logical address; access control list means, attached to each address table entry, for storing a plurality of program numbers for identifying programs which are permitted to make accesses to the logical address stored in said each address table entry; hit check means for detecting one of the plurality of program numbers stored in the access control list means attached to one of the address table entries storing the logical address to be accessed, which matches with a current program number identifying a currently executed program; hit notice means for generating an address table hit notice when the hit check means detects said one of the plurality of program numbers; and means for outputting the physical address stored in said one of the address table entries, when the hit notice means generates the address table hit notice.

According to another aspect of the present invention there is provided a memory management and protection system for a logical address space containing a plurality of programs to be executed by a plurality of threads, comprising: address table means having a plurality of address table entries, each address table entry storing a logical address and a physical address corresponding to the logical address; access control list means, attached to each address table entry, for storing access permissions indicating whether each thread is permitted to make accesses to the logical address stored in said each address table entry; thread number memory means for storing a thread number assigned to a currently executed thread; verification means for verifying whether the currently executed thread specified by the thread number stored in the thread number memory means is permitted to make accesses to a logical address to be accessed stored in one of the address table entries, according to the access permissions stored in the access control list means attached to said one of the address table entries; and means for outputting the physical address stored in said one of the address table entries, when the verification means verifies that the currently executed thread is permitted to make accesses to the logical address to be accessed.

According to another aspect of the present invention there is provided a memory management and protection system for a logical address space divided into a plurality of address regions, comprising: address table means having a plurality of address table entries, each address table entry storing a logical address and a physical address corresponding to the logical address; access control list means, attached to each address table entry, for storing access permissions indicating whether accesses from each address region to the logical address stored in said each address table entry are permitted; address region detection means for detecting a current address region containing a currently executed program; verification means for verifying whether the accesses from the current address region detected by the address region detection means to a logical address to be accessed stored in one of the address table entries are permitted, according to the access permissions stored in the access control list means attached to said one of the address table entries; and means for outputting the physical address stored in said one of the address table entries, when the verification means verifies that the accesses are permitted from the current address region to the logical address to be accessed.

According to another aspect of the present invention there is provided a memory management and protection system, comprising: address table means having a plurality of address table entries, each address table entry storing a logical address and a physical address corresponding to the logical address; access control list means, attached to each address table entry, for storing access permissions for accesses from each program allocated to a logical address space with respect to the logical address stored in said each address table entry; verification means for verifying the access permissions for accesses from a currently executed program with respect to a logical address to be accessed stored in one of the address table entries, according to the access permissions stored in the access control list means attached to said one of the address table entries; and means for outputting the physical address stored in said one of the address table entries, when the verification means verifies that the access permissions for the currently executed program with respect to the logical address to be accessed.

According to another aspect of the present invention there is provided a memory management and protection system, comprising: program allocation means for determining an allocation of a plurality of programs to at least one of logical address spaces, where only up to a predetermined number of the programs are allocated to each logical address space, and any one address region allocated to any one of the programs does not overlap with any other address regions allocated to any other ones of the programs within said at least one of the logical address spaces; memory protection means for detecting an occurrence of an improper access from one address region allocated to one of the programs to another address region allocated to another one of the programs, among said up to the predetermined number of the programs allocated to said each logical address space; cache means for storing data to be accessed by the programs; and processing means for executing the programs by making accesses to the cache means according to the allocation determined by the program allocation means, unless the memory protection means detects the occurrence of the improper access.

Other features and advantages of the present invention will become apparent from the following description taken in conjunction with the accompanying drawings.

BRIEF DESCRIPTION OF THE DRAWINGS

Fig. 5A is a diagram of one example of a page table entry to be used in obtaining a memory protection information according to a logical address in the memory protection device of FIG. 3.

FIG. 5B is a diagram of another example of a page table entry to be used in obtaining a memory protection information according to a logical address in the memory protection device of FIG. 3.

FIG. 5C is a diagram of still another example of a page table entry to be used in obtaining a memory protection information according to a logical address in the memory protection device of FIG. 3.

FIG. 5D is a table summarizing an operation type code and its content to be used in the still another example of the page table entry shown in FIG. 5C.

FIGS. 24A and 24B are detailed block diagrams of a translation look-aside buffer (TLB) check device in the memory management unit of FIG. 23.

FIGS. 27A and 27B are further detailed block diagrams of a first (or a second) stage address translation unit in the address translation device of FIG. 26.

FIGS. 28A and 28B are further detailed block diagrams of a third stage address translation unit in the address translation device of FIG. 26.

FIGS. 29A and 29B are further detailed block diagrams of the third stage address of FIG. 28 for a case involving access control list (ACL) switching.

FIGS. 35A and 35B are detailed block diagrams of a modified configuration for a translation look-aside buffer (TLB) check device in the memory management unit of FIG. 23.

FIG. 37 is a block diagram of additional embodiment of a memory management unit according to the present invention.

FIG. 42A is a diagrammatic representation of one example of allocation of the multiple programs to a single logical address space in the memory management and protection system of FIG. 41.

FIG. 42B is a diagrammatic representation of one example of allocation of the multiple programs to two logical address spaces in the memory management and protection system of FIG. 41.

FIG. 45 is an illustration of an exemplary configuration of a program management table to be used by a program allocation unit in the memory management and protection system of FIG. 41 for a case of a multiple virtual space scheme.

FIG. 46 is an illustration of an exemplary configuration of a logical address space management table to be used by a program allocation unit in the memory management and protection system of FIG. 41 for a case of a multiple virtual space scheme.

FIG. 49 is an illustration of an exemplary configuration of a TLB with invalidation bit to be used in the memory management and protection system of FIG. 41 for a case of a multiple virtual space scheme.

FIG. 53 is an illustration of an access control list (ACL) to be used in the memory management and protection system of FIG. 41 for a case of using the allocation of FIG. 52.

FIG. 54 is a flow chart for the operation of the memory management and protection system of FIG. 41 in a case of calling up one user program from another user program in the allocation of FIG. 52.

FIG. 55A is a diagrammatic representation of one example of allocation of the multiple programs in the memory management and protection system of FIG. 41.

FIG. 55B is a diagrammatic representation of the programs allocated to one logical address space at one stage of the operation of the memory management and protection system of FIG. 41 according to the allocation of FIG. 55.

FIG. 55C is a diagrammatic representation of the programs allocated to another logical address space at another stage of the operation of the memory management and protection system of FIG. 41 according to the allocation of FIG. 55.

FIG. 56 is an illustration of an access control list (ACL) to be used in the memory management and protection system of FIG. 41 for a case of using the allocation of FIG. 55A.

DETAILED DESCRIPTION OF THE PREFERRED EMBODIMENTS

Figure 1:
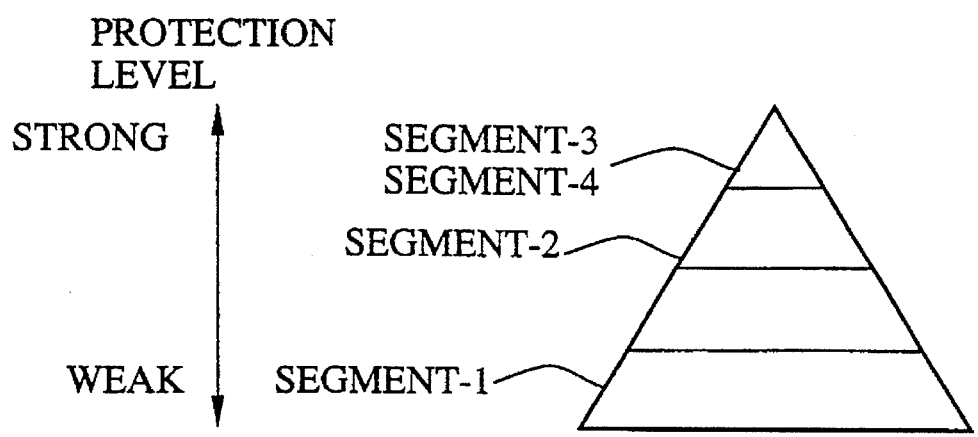
FIG. 1 is a diagram representing hierarchical relationships among segments of a logical address space realized in a conventional memory management unit using a ring protection scheme.
Figure 2:
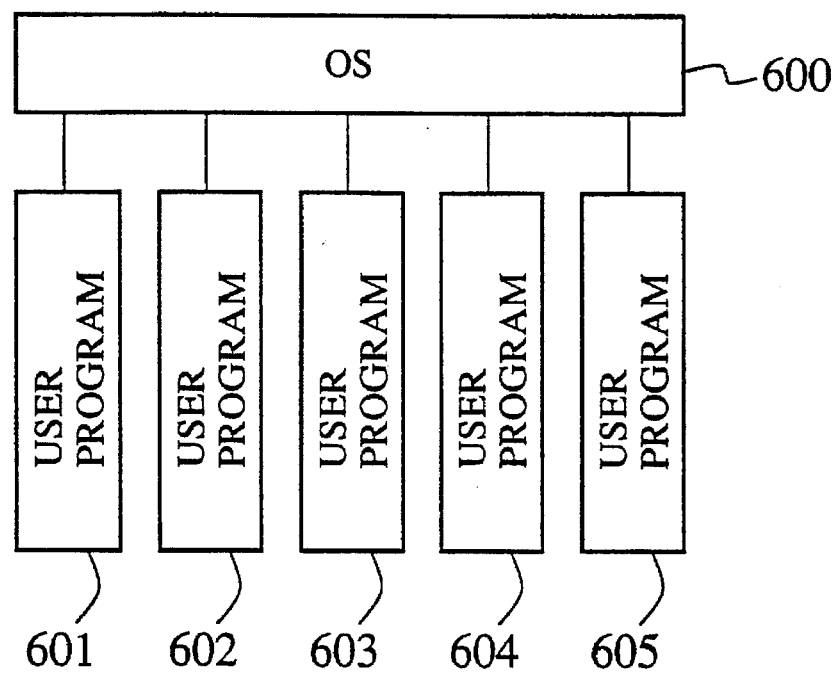
FIG. 2 is a diagrammatic representation of a conventional manner of allocation of the multiple programs to logical address spaces.
Figure 3:
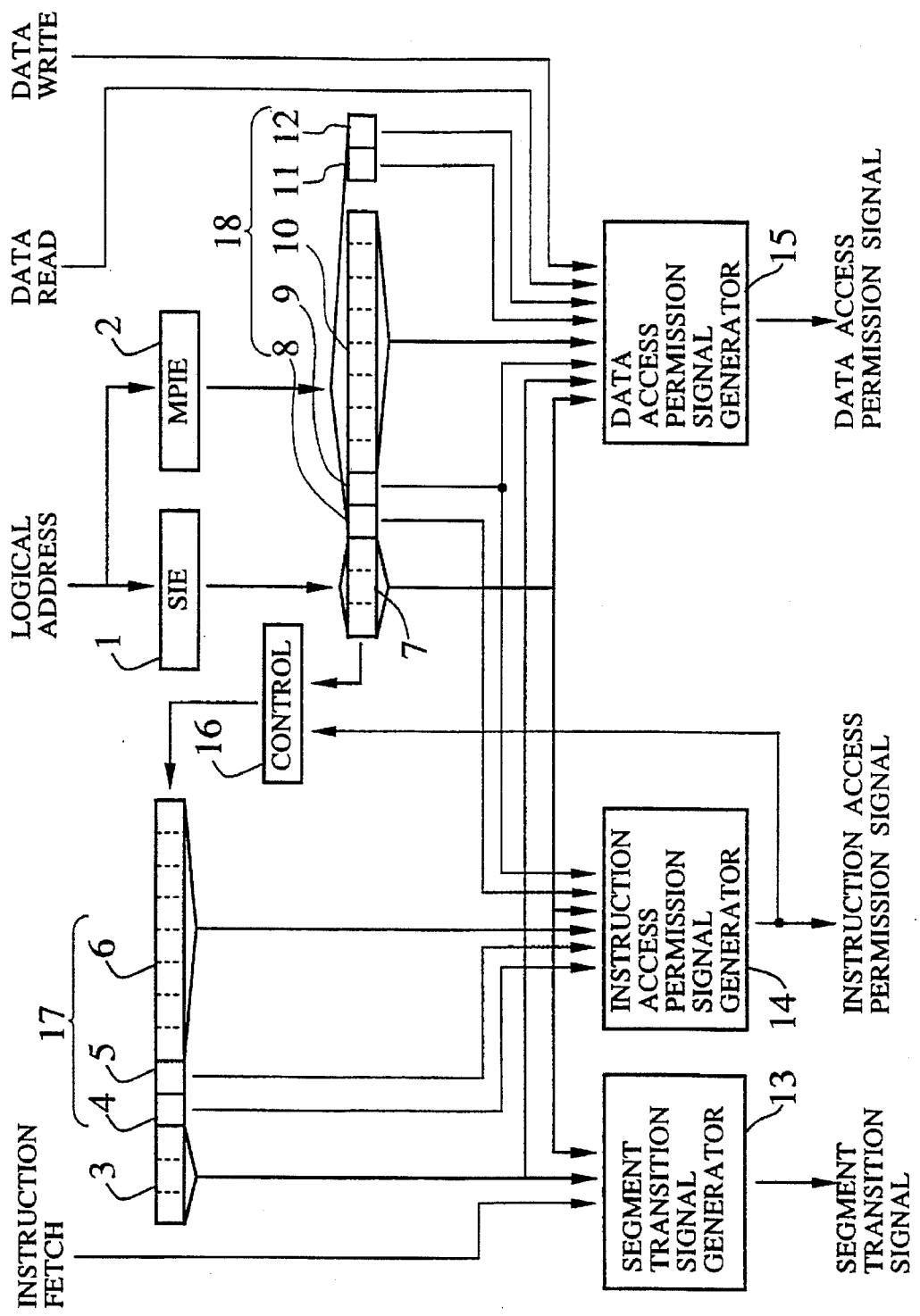
FIG. 3 is a block diagram of one embodiment of a memory protection device to be used in a memory management unit according to the present invention.

Referring now to FIG. 3, one embodiment of a memory protection device to be used in a memory management unit according to the present invention will be described in detail. Here, for the sake of definiteness, the description will be given for the memory protection device which is utilized in managing a logical address space divided into eight segments, where the protection is provided in units of regions representing physical pages in each segment, although the applicability of the present invention is not limited to this particular case.

Figure 8:
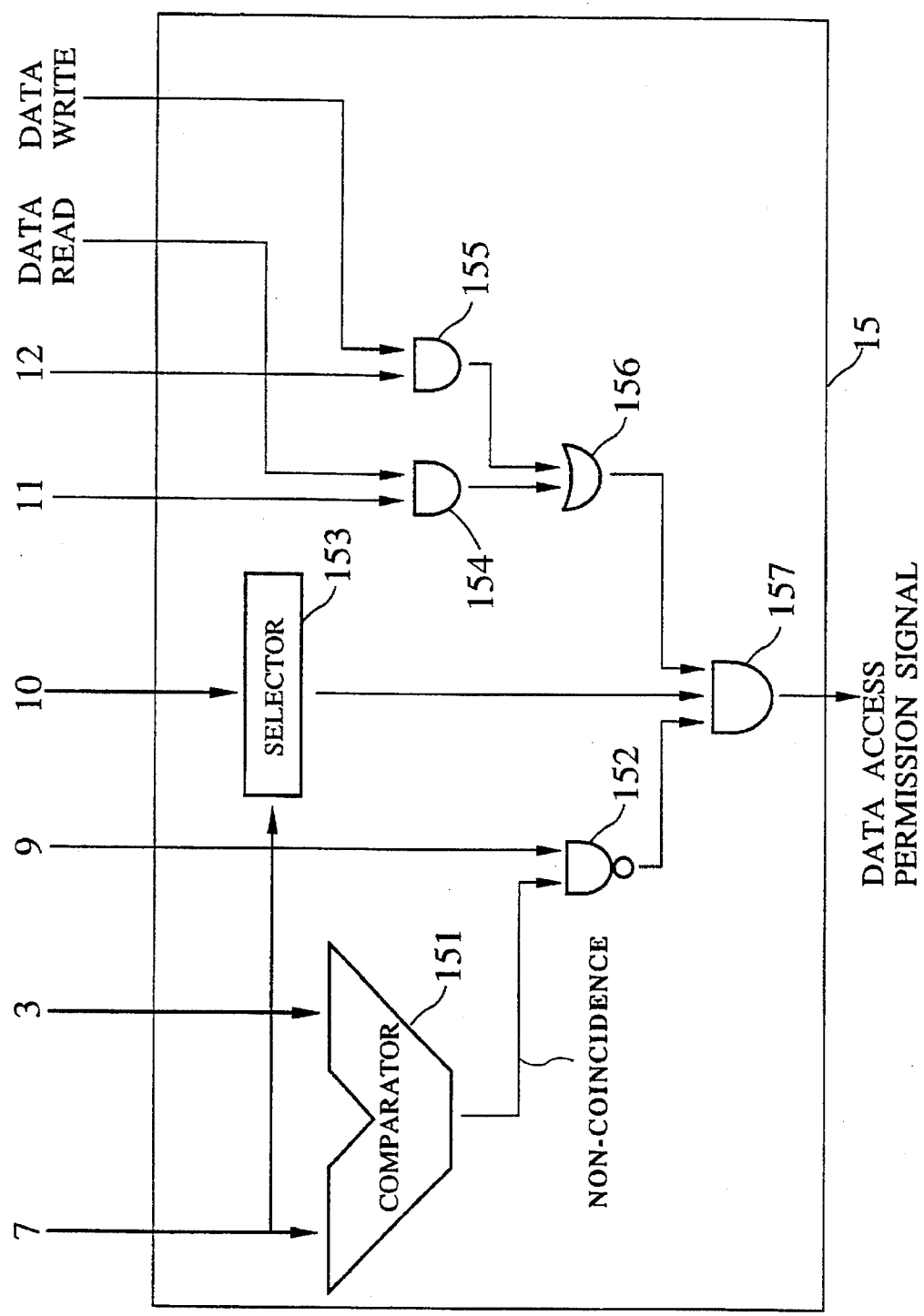
FIG. 8 is a detailed block diagram of a data access permission signal generator in the memory protection device of FIG. 3.

This memory protection device of FIG. 8 comprises: a segment information extractor (SIE) 1 for extracting a segment identifier identifying a segment to be accessed next from a logical address to be accessed next; a memory protection information extractor (MPIE) 2 for extracting a memory protection information for a region (page) to be accessed next from the logical address; a current segment identifier 3 for storing a segment identifier identifying a segment in which a currently executed instruction is present; a current memory protection information 17 for storing a memory protection information for the currently executed instruction, including a current transition permission 4, a current execution permission 5, and a current right permission 6; a target segment identifier 7 for storing the segment identifier extracted by the segment information extractor 1; a target memory protection information 18 for storing a memory protection information for the region (page) to be accessed next, including a target transition permission 8, a target execution permission 9, a target right permission 10, a read permission 11, and a write permission 12; a segment transition signal generator 13 for generating a segment transition signal indicating an occurrence of a segment transition by an access to the logical address; an instruction access permission signal generator 14 for generating an instruction access permission signal indicating a permission to make an instruction access to the logical address; a data access permission signal generator 15 for generating a data access permission signal indicating a permission to make a data access to the logical address; and a control unit 16 for updating the current memory protection information 17 by the target memory protection information 18 in a case the instruction access causing the segment transition is permitted.

The segment information extractor 1 extracts a segment identifier from a logical address to be accessed next which is supplied to the memory protection device from a data processing unit (not shown in FIG. 3). Here, the segment identifier indicates a segment in which the supplied logical address belongs to. The segment identifier obtained by the segment information extractor 1 is then temporarily stored as the target segment identifier 7.

Figure 4A:
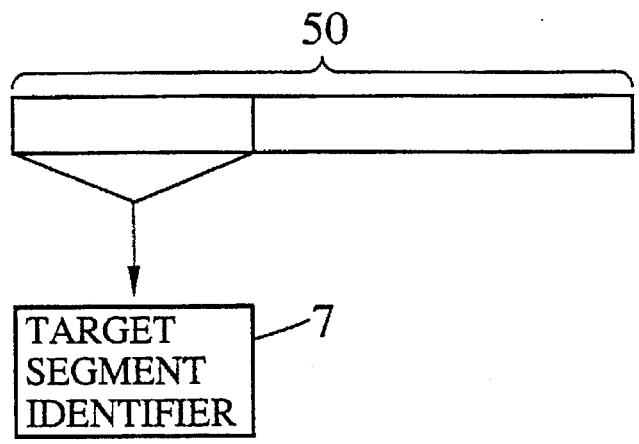
FIG. 4A is a diagram explaining one manner of obtaining a segment identifier according to a logical address in the memory protection device of FIG. 3.

Here, as shown in FIG. 4A, the segment identifier can be provided as upper bits of the logical address 50. In this case, the segment information extractor 1 can extract the segment identifier by selectively outputting only the upper bits of the supplied logical address 50, so that the segment identifier can be obtained very quickly solely from the supplied logical address.

Figure 4B:
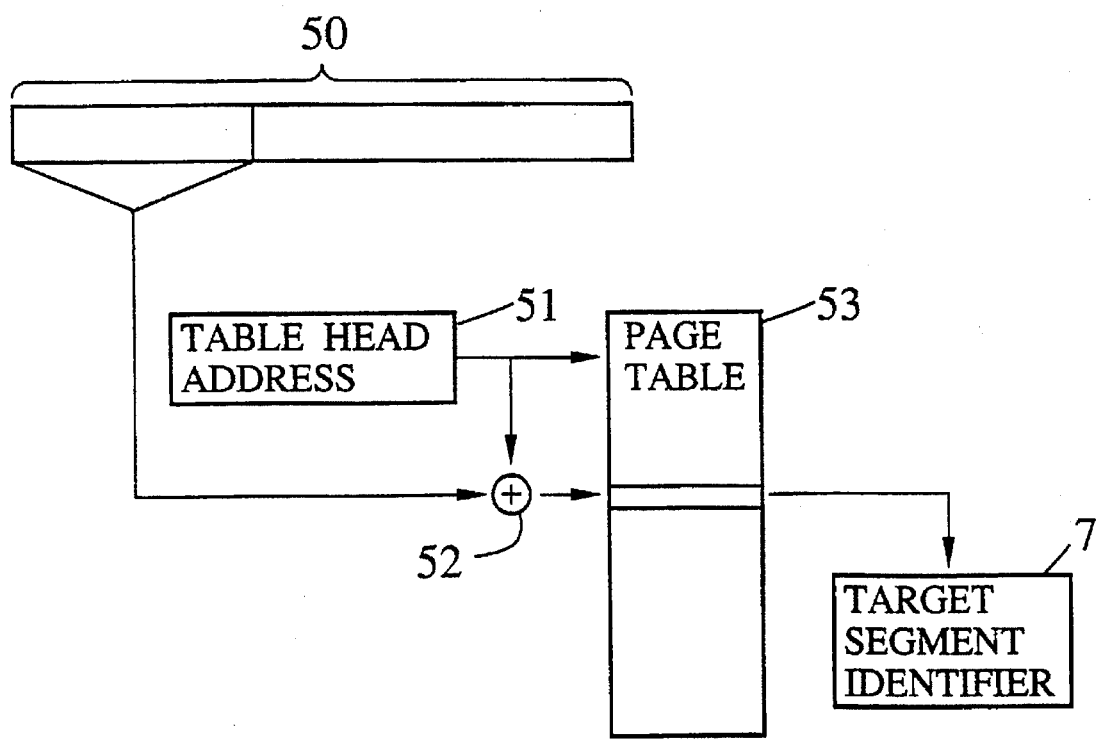
FIG. 4B is a diagram explaining another manner of obtaining a segment identifier according to a logical address in the memory protection device of FIG. 3.

Alternatively, as shown in FIG. 4B, the segment identifier can be provided as a part of an entry in a page table stored in a memory device or TLB (Translation Look-aside Buffer) 53, where each entry of the page table also stores corresponding memory protection information as will be described below. In this case, the segment information extractor 1 can extract the segment identifier by making an access to the page table on the memory device or TLB 53 by using a table access address obtained by an address calculator 52 from a table head address 51 indicating a starting address of the page table and a prescribed portion of the supplied logical address 50 indicating an offset with respect to the starting address. Consequently, the segments can be set up independently from the logical addresses, in irregular sizes if desired, and the extraction of the segment identifier can be achieved along with the extraction of the memory protection information also stored in the page table.

The memory protection information extractor 2 extracts the memory protection information also from the logical address supplied from the data processing unit. Here, the memory protection information is assigned in advance to each region (page) in each segment of the logical address space, in order to permit only a proper memory access to each region (page) in each segment. Such a memory protection information includes a transition permission indicating whether it is permitted to make an instruction access from each region (page) of each segment to another segment by making a segment transition, an execution permission indicating whether an access to the logical address is an instruction access or a data access, a right permission indicating rights assigned to each region in each segment to make an access to each of the eight segments of the logical address space, a read permission indicating whether it is permitted to make an access for a data read to each region (page) in each segment or not, and a write permission indicating whether it is permitted to make an access for a data write to each region (page) in each segment or not.

The memory protection information obtained by the memory protection information extractor 2 is then temporarily stored as the target memory protection information 18 including the target transition permission 8, the target execution permission 9, the target right permission 10, the read permission 11, and the write permission 12.

On the other hand, the current segment identifier 3, the current transition permission 4, the current execution permission 5, and the current right permission 6 store the segment identifier, the transition permission, the execution permission, and the right permission, respectively, for the currently executed instruction, and these current segment identifier 3 and the current memory protection information 17 are to be updated by the control unit 16 to the target segment identifier 7 and the part of the memory protection information stored in the target transition permission 8, the target execution permission 9, and the target right permission 10, when the instruction access permission signal is asserted by the instruction access permission signal generator 14.

This memory protection information is provided either as an entry in the page table stored in the memory device or TLB, which can be obtained by making an access to the page table according to the supplied logical address. Here, in a case the segment identifier is provided as upper bits of the logical address as in a case of FIG. 4A described above, the entry in the page table can have a format as shown in FIG. 5A, containing the transition permission 88, the execution permission 89, the right permission 90, the read permission 91, and the write permission 92 to constitute the memory protection information as well as a valid bit 93 indicating the validity of this page table entry.

Alternatively, in a case the segment identifier is provided as a part of an entry in the page table as in a case of FIG. 4B described above, the entry in the page table can have a format as shown in FIG. 5B, containing the transition permission 88, the execution permission 89, the right permission 90, the read permission 91, the write permission 92, and the valid bit 93, along with the segment identifier 87.

Moreover, the entry in the page table can have a format as shown in FIG. 5C, containing the right permission 90 along with an operation type code 94 given in three bits, where the operation type code 94 encodes the transition permission 88, the execution permission 89, the read permission 91, the write permission 92, and the valid bit 93, as indicated in a table shown in FIG. 5D.

Here, it is to be noted that, in this embodiment, the memory protection information is provided in the page table on the memory device or TLB so that the set up or the change of the memory protection information can be made by using a usual data access instruction to the memory device or TLB, in which case the protection of the memory protection information on the memory device or TLB is automatically provided by this memory protection unit. In addition, the right permission 90 expresses the relationship between the current segment and the target segment, so that the change of the relationship between certain two segments does not affect the relationship between the other segments. Consequently, the change of the right permission 90 can be made easily by the usual data access operation even during the execution of a program without affecting the relationships among the segments unrelated to the change.

Now, in this embodiment, the segment identifier, the right permission, and the execution permission plays roles of three arguments of a function to return an output indicating a permission or rejection of the access to the supplied logical address. Thus, by assigning the desired output to all the combinations of these three arguments appropriately, it becomes possible in this memory protection device to realize a control of memory accesses according to a semi-ordered hierarchical relationships among the regions (pages), without requiring a large amount of additional hardwares or special instructions on the data processing unit side.

Figure 6:
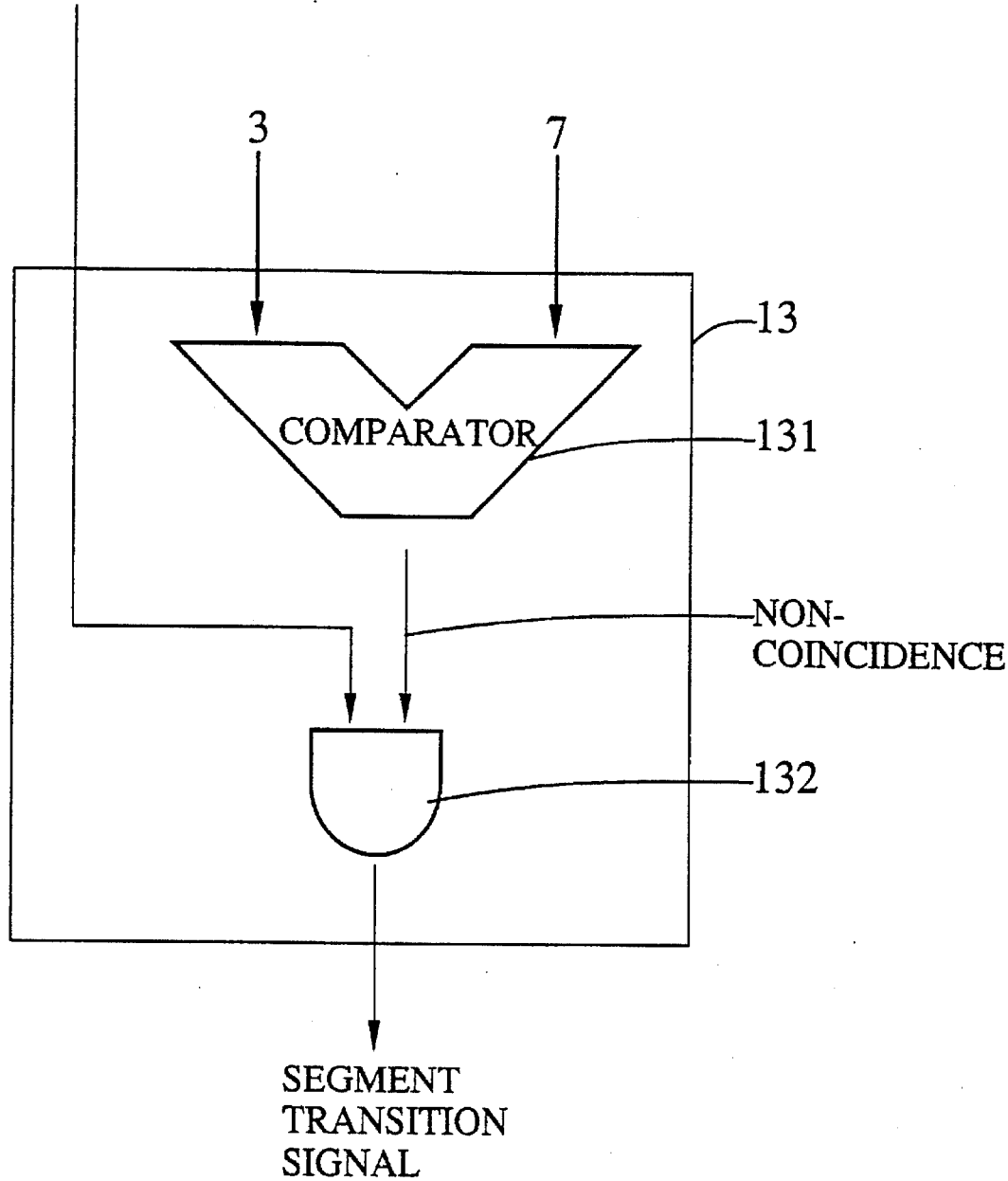
FIG. 6 is a detailed block diagram of a segment transition signal generator in the memory protection device of FIG. 3.

As shown in FIG. 6, the segment transition signal generator 13 further comprises: a comparator 131 for comparing the current segment identifier 3 and the target segment identifier 7 and asserting a non-coincidence signal when the current segment identifier 3 and the target segment identifier 7 are not identical; and an AND gate 132 for receiving an instruction fetch command from the data processing unit and the non-coincidence signal from the comparator 131 and asserts the segment transition signal when both of the non-coincidence signal and the instruction fetch command are asserted. Thus, the AND gate 132 negates the segment transition signal when the current segment identifier 3 and the target segment identifier 7 are the same as well as when the access to be made is the data access.

Figure 7:
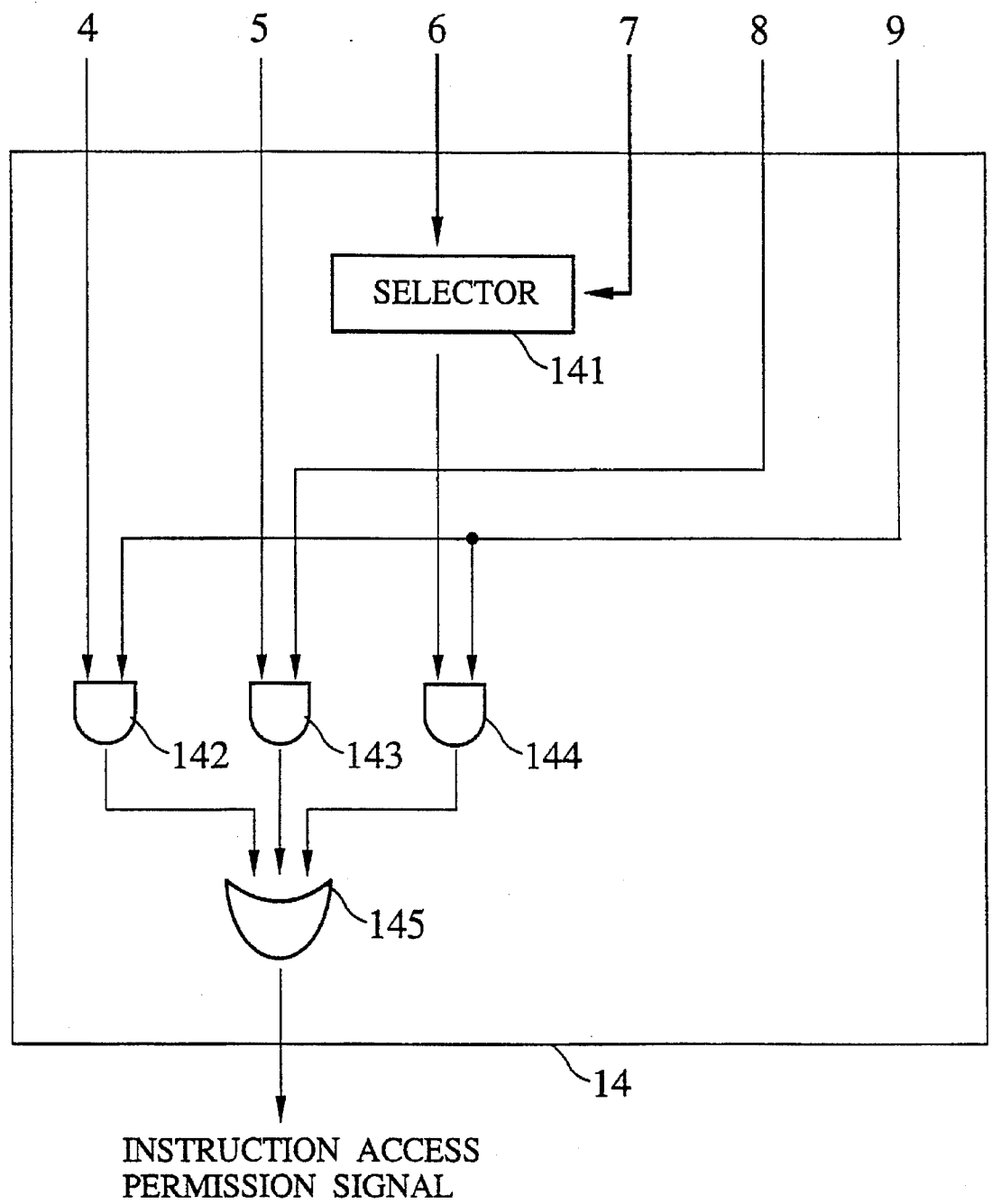
FIG. 7 is a detailed block diagram of an instruction access permission signal generator in the memory protection device of FIG. 3.

As shown in FIG. 7, the instruction access permission signal generator 14 further comprises: a selector 141 for selecting an entry of the current right permission 6 corresponding to the target segment identifier 7; an AND gate 142 for asserting its output when both of the current transition permission 4 and the target execution permission 9 are asserted; an AND gate 143 for asserting its output when both of the current execution permission 5 and the target transition permission 8 are asserted; an AND gate 144 for asserting its output when both of the entry of the current right permission 6 selected by the selector 141 and the target execution permission 9 are asserted; and an OR gate 145 for asserting the instruction access permission signal when any one of the outputs of the AND gates 142, 143, and 144 is asserted. Thus, the OR gate 145 negates the instruction access permission signal when none of the outputs of the AND gates 142, 143, and 144 is asserted.

As shown in FIG. 8, the data access permission signal generator 15 further comprises: a comparator 151 for comparing the current segment identifier 3 and the target segment identifier 7 and asserts a non-coincidence signal output when the current segment identifier 3 and the target segment identifier 7 are not identical; a NAND gate 152 for receiving the non-coincidence signal from the comparator 151 and the target execution permission 9 and asserts its output when either one of the non-coincidence signal and the target execution permission 9 is negated; a selector 153 for selecting an entry of the target right permission 10 corresponding to the target segment identifier 7; an AND gate 154 for asserting its output when both of the read permission 11 and the data read command from the data processing unit are asserted; an AND gate 155 for asserting its output when both of the write permission 12 and the data write command from the data processing unit are asserted; an AND gate 156 for asserting its output when both of the outputs of the AND gates 154 and 155 are asserted; and an AND gate 157 for asserting the data access permission signal when both of the outputs of the NAND gate 152 and the AND gate 156 as well as the entry of the target right permission 10 selected by the selector 153 are asserted. Thus, the AND gate 157 negates the data access permission signal when any one of the outputs of the NAND gate 152 and the AND gate 156 and the entry of the target right permission 10 selected by the selector 153 is negated.

Figure 9:
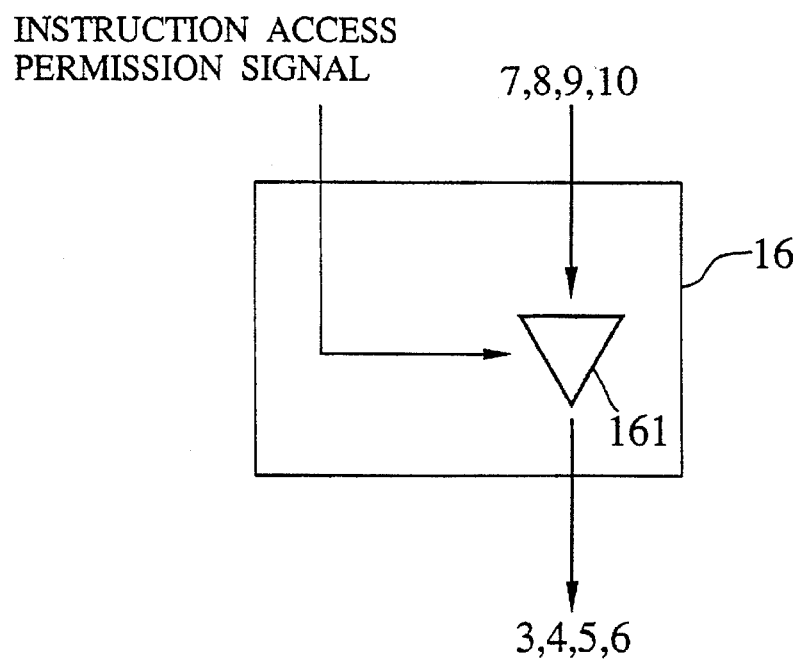
FIG. 9 is a detailed block diagram of a control unit in the memory protection device of FIG. 3.

As shown in FIG. 9, the control unit 16 further comprises a gate 161 for transmitting the target segment identifier 7, the target transition permission 8, the target execution permission 9, and the target right permission 10 to the current segment identifier 3, the current transition permission 4, the current execution permission 5, and the current right permission 6, respectively, so as to update the current memory protection information 17 stored in the current segment identifier 3, the current transition permission 4, the current execution permission 5, and the current right permission 6, when the instruction access permission signal generated by the instruction access permission signal generator 14 is asserted.

Now, in a case of carrying out the instruction access according to the instruction fetch command from the data processing unit, this memory protection device of FIG. 3 operates as follows.

First, in a case of the instruction access, the data processing unit supplies the logical address to be accessed and the instruction fetch command to the memory protection device.

In the memory protection device, the logical address is supplied to the segment information extractor 1 and the memory protection information extractor 2.

The segment information extractor 1 then extracts the segment identifier from the supplied logical address, and the obtained segment identifier is stored into the target segment identifier 7.

On the other hand, the memory protection information extractor 2 extracts the memory protection information including the transition permission, the execution permission, the right permission, the read permission, and the write permission, also from the supplied logical address, and the obtained memory protection information is then stored in the target transition permission 8, the target execution permission 9, the target right permission 10, the read permission 11, and the write permission 12, as the target memory protection information 18.

Then, the segment transition signal generator 13 generates the segment transition signal according to the supplied instruction fetch command, the current segment identifier 3, and the target segment identifier 7, as described above. In this embodiment, this segment transition signal is generated regardless of whether the instruction access has actually taken place or not. In a case the access is actually rejected, the segment transition signal can be utilized in judging whether the rejected access is a branch instruction or not.

Also, the instruction access permission signal generator 14 generates the instruction access permission signal according to the current memory protection information, the target segment identifier 7, the current transition permission 8, and the current execution permission 9, as described above.

Here, when the instruction access permission signal is asserted by the instruction access permission signal generator 14, the control unit 16 updates the current memory protection information 17 by overwriting the current segment identifier 3, the current transition permission 4, the current execution permission 5, and the current right permission 6, with a part of the target memory protection information 18 stored in the target segment identifier 7, the target transition permission 8, the target execution permission 9, and the target right permission 10, respectively. In this embodiment, this update of the current memory protection information 17 by the control unit 16 is carried out regardless of the occurrence of the segment transition. However, it is also possible to modify this embodiment such that the control unit 16 carries out the update of the current memory protection information 17 only when the segment transition occurred while the instruction access permission signal is asserted, by utilizing the segment transition signal generated by the segment transition signal generator 13, if desired.

Figure 10:
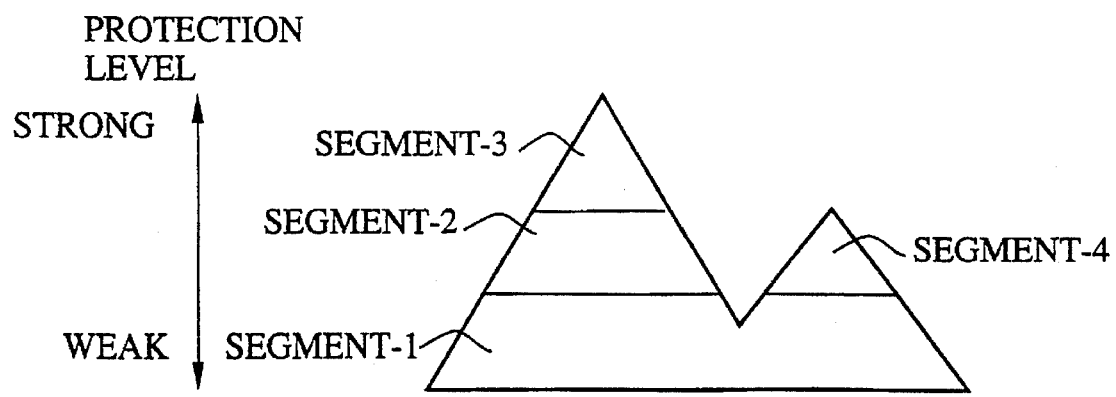
FIG. 10 is a diagram representing an example of semi-ordered hierarchical relationships among segments of a logical address space realized by the memory protection device of FIG. 3.
Figure 11:
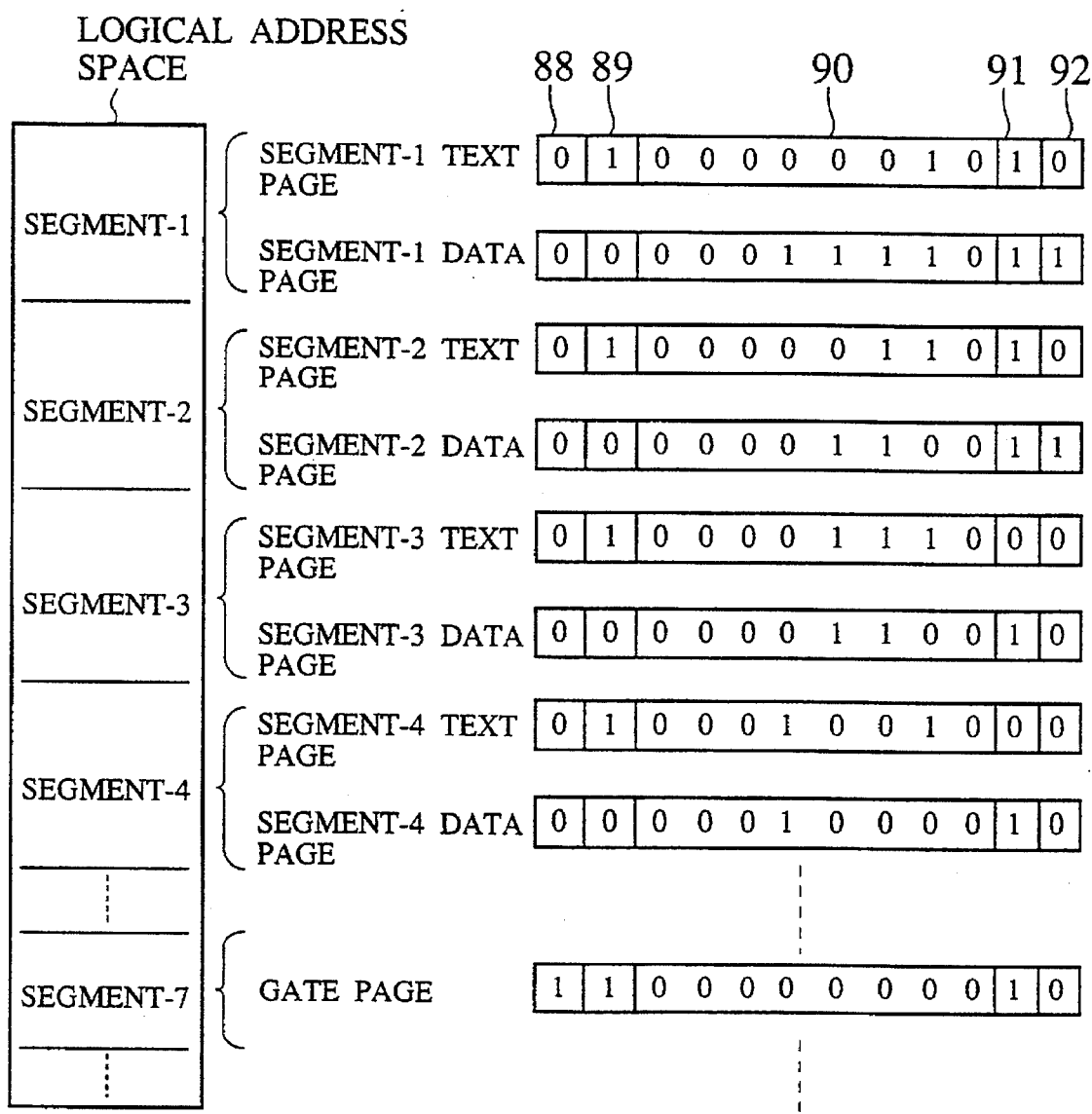
FIG. 11 is a diagrammatic illustration of an example of assignment of values to various permissions used in the memory protection device of FIG. 3, for realizing the semi-ordered hierarchical relationships shown in FIG. 10.

Now, such an operation of the memory protection device of FIG. 3 in a case of carrying out the instruction access according to the instruction fetch command from the data processing unit will be illustrated for an exemplary case of realizing a memory access control according to semi-ordered hierarchical relationships among the segments as shown in FIG. 10, by using a more concrete assignment of the values to the transition permission, the execution permission, the right permission, the read permission, and the write permission, for each region (page) in each segment as shown in FIG. 11, where the value "1" indicates an assertion while the value "0" indicates a negation.

Here, it is to be noted that, this assignment indicated in FIG. 11 includes a gate page at the segment-7, in which the transition permission 88 is asserted such that a transition from any segment can be made to this gate page and an access to any segment can be made from this gate page in a case of the instruction access, as will be illustrated below. This gate page is provided for the following reason.

Namely, in this embodiment, the instruction access is permitted only when the logical address to be accessed belongs to one of those segments to which the access is permitted by the current right permission 6. Consequently, the range in which the segment transition can be made in conjunction with the instruction access is limited in terms of the segments, so as to prevent the improper access from a weaker program such as a user program to a stronger program such as a system program, while permitting the proper access from the stronger program to the weaker program.

However, such a memory access control according to the current right permission 6 also excludes any possibility for calling up the stronger program from the weaker program as well. In order to make it possible for the weaker program to call up the stronger program, it becomes necessary to permit an access from the weaker program to the stronger program through an appropriate entrance address, even when the current right permission 6 does not permit this access.

In order to cope with such a situation, in this embodiment, the branching of the instruction execution to those segments to which the access is not permitted by the current right permission 6 is made possible by first making a branching to the gate page to which the a transition from any segment can be made, and then making a further branching from the gate page to the desired segment, using the usual branching instructions, without requiring a large amount of additional hardwares or special instructions on the data processing unit side.

Here, it is to be noted that the appropriate entrance address is usually prescribed to the gate page by the system program and cannot be changed from the other programs, such that there is no need to check the entrance address to be accessed from the gate page.

Figure 12:
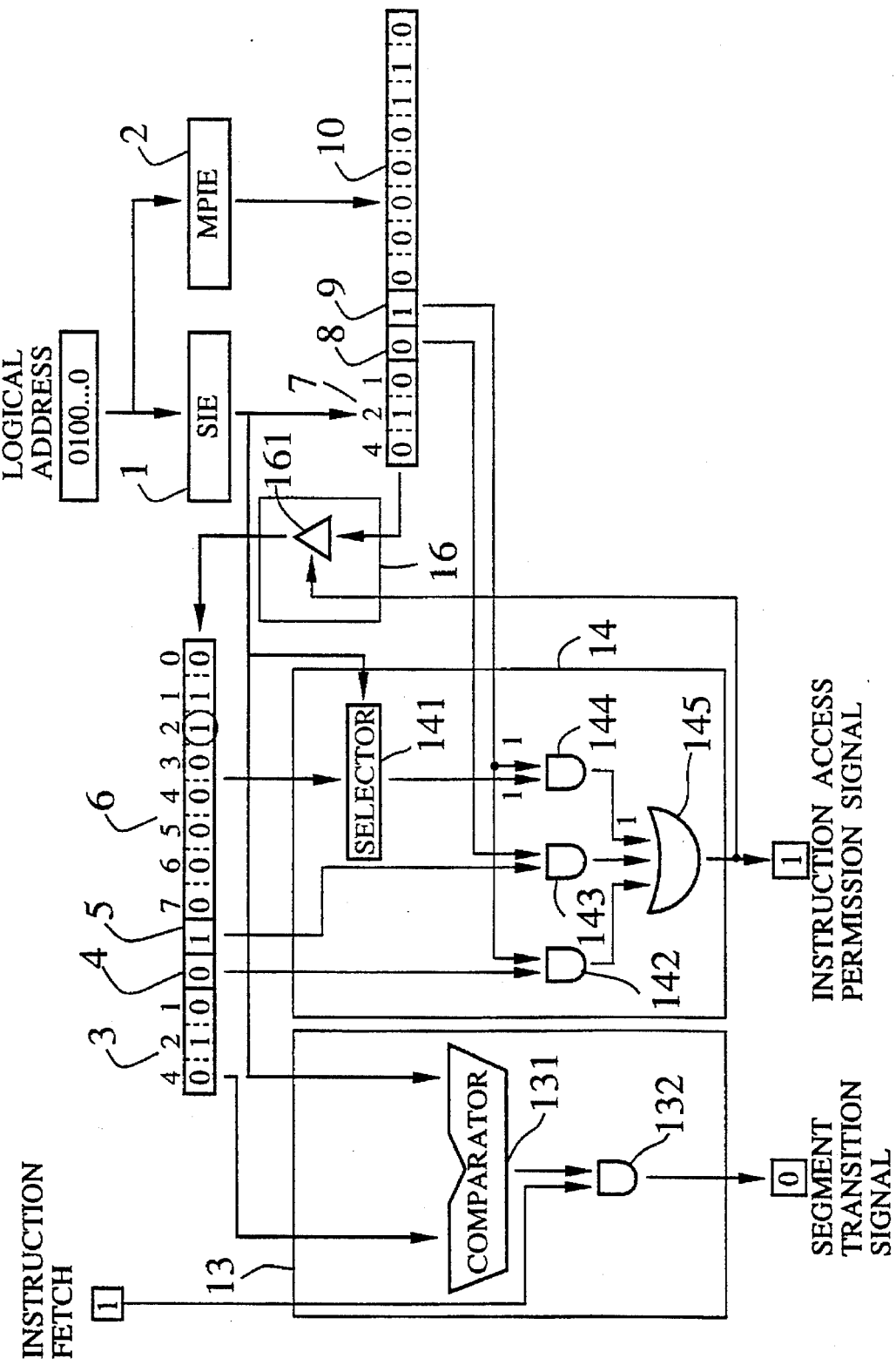
FIG. 12 is a block diagram of the memory protection device of FIG. 3 in a case of making an instruction access without a segment transition.

FIG. 12 shows a case of an instruction fetch for the next instruction to be executed which is present in the same segment as the currently executed instruction. Here, the segment in which the currently executed instruction is present is the segment-2 as indicated by the current segment identifier 3 while the segment in which the next instruction to be executed next is present is also the segment-2 as indicated by the target segment identifier 7, so that there is no segment transition and consequently the segment transition signal generator 13 negates the segment transition signal. Also, the instruction access to this segment-2 is permitted by the current execution permission 5 and the current right permission 6, so that the instruction access permission signal generator 14 asserts the instruction access permission signal. In this case, the update of the current segment identifier 3 and the current memory protection information 17 by the control unit 16 makes no change in the content of the current segment identifier 3 and the current memory protection information 17 as the target segment identifier 7 and the target memory protection information 18 are identical to the current segment identifier 3 and the current memory protection information 17.

Figure 13:
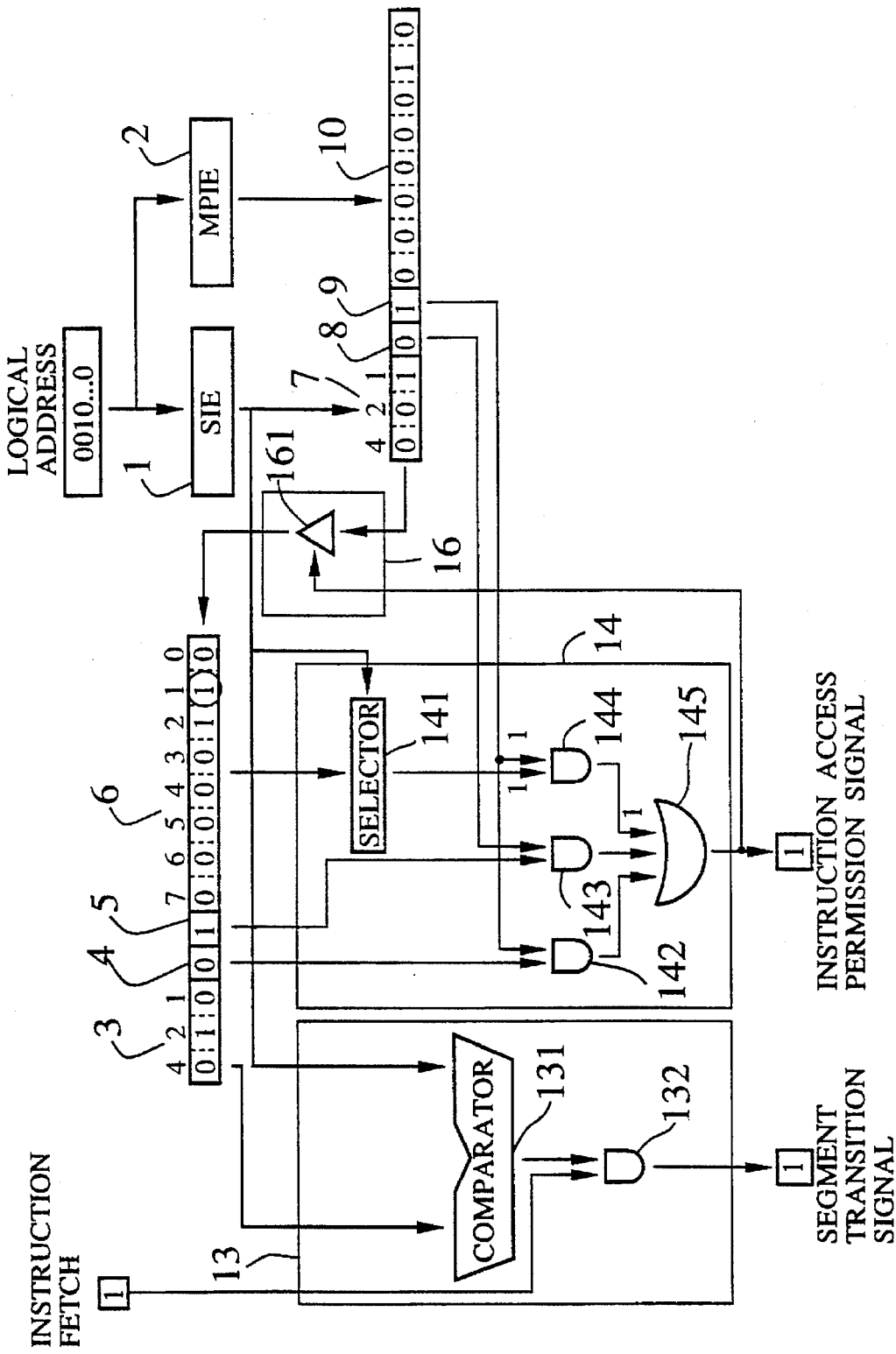
FIG. 13 is a block diagram of the memory protection device of FIG. 3 in a case of making an instruction access with a segment transition.

FIG. 13 shows a case of an instruction fetch for the next instruction to be executed which is located in the different segment as the currently executed instruction. Here, the segment in which the currently executed instruction is present is the segment-2 as indicated by the current segment identifier 3 while the segment in which the next instruction to be executed next is present is the segment-1 as indicated by the target segment identifier 7, so that there is a segment transition and consequently the segment transition signal generator 13 asserts the segment transition signal. Also, the instruction access by making a segment transition to this segment-1 is permitted by the current execution permission 5 and the current right permission 6, so that the instruction access permission signal generator 14 asserts the instruction access permission signal. In response, the control circuit 16 updates the current segment identifier 3, the current transition permission 4, the current execution permission 5, and the current right permission 6 by overwriting their current values by the values in the target segment identifier 7, the target transition permission 8, the target execution permission 9, and the target right permission 10.

Figure 14:
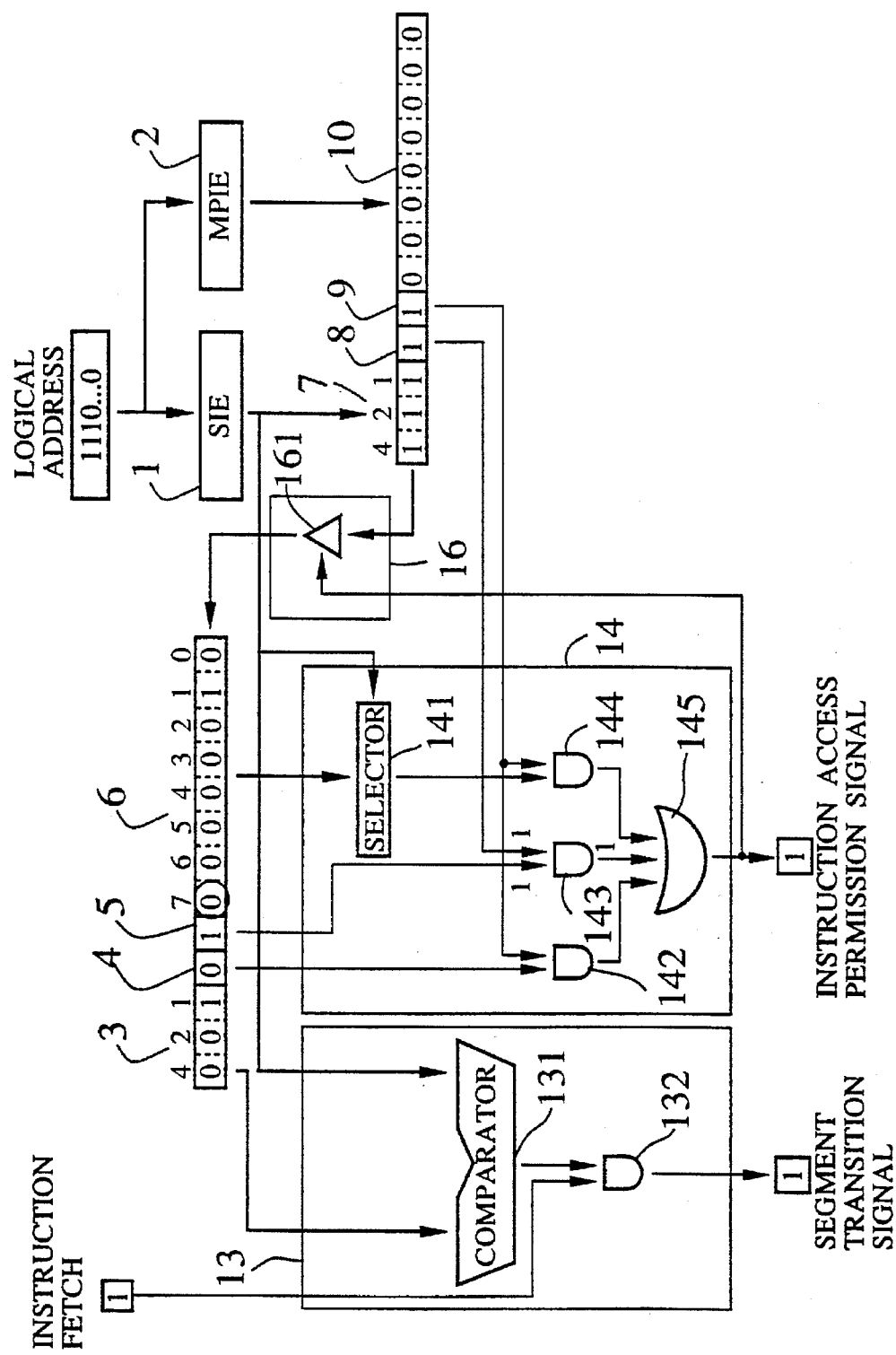
FIG. 14 is a block diagram of the memory protection device of FIG. 3 in a case of making an instruction access for a branching to a gate page.

FIG. 14 shows a case of an instruction fetch in which a segment transition to the gate page is made as a branching from the segment in which the currently executed instruction is present, which is the segment-1 as indicated by the current segment identifier 3. According to the assignment of FIG. 11, the segment transition from the current segment-1 is permitted only to the segment-1 itself and the segment-7 which is the gate page. In this case, there is a segment transition so that the segment transition signal generator 13 asserts the segment transition signal. Also, this gate page has the transition permission 88 asserted as indicated by the target transition permission 8, and the current execution permission 5 is also asserted, so that the instruction access permission signal generator 14 asserts the instruction access permission signal. In response, the control circuit 16 updates the current segment identifier 3, the current transition permission 4, the current execution permission 5, and the current right permission 6 by overwriting their current values by the values in the target segment identifier 7, the target transition permission 8, the target execution permission 9, and the target right permission 10.

Figure 15:
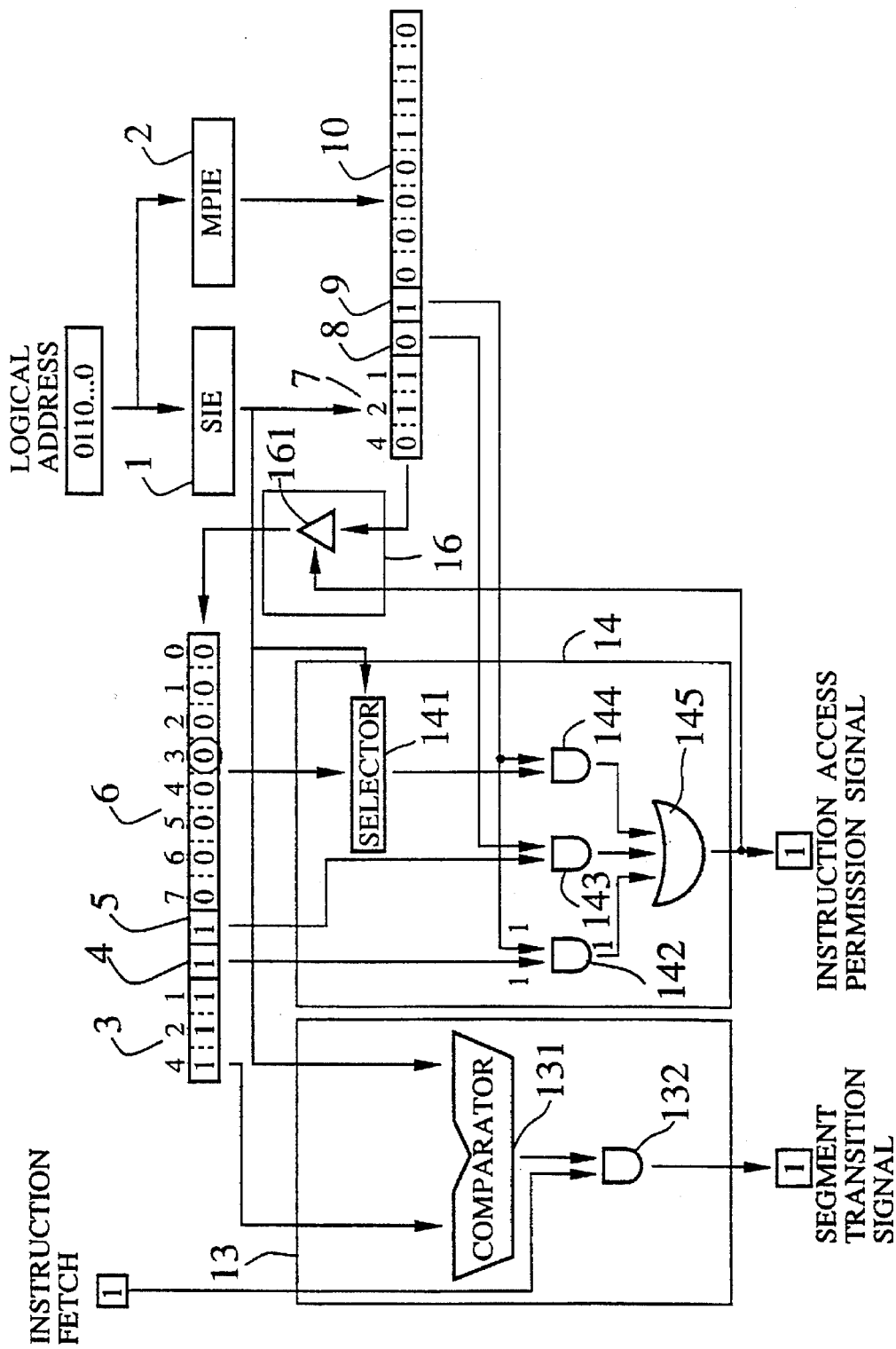
FIG. 15 is a block diagram of the memory protection device of FIG. 3 in a case of making an instruction access for a branching from a gate page.

FIG. 15 shows a case of an instruction fetch in which a segment transition from the gate page is made as a branching to a segment in which the next instruction to be executed is present, which is the segment-3 as indicated by the current segment identifier 3. In this case, there is a segment transition so that the segment transition signal generator 13 asserts the segment transition signal. Also, this gate page has the transition permission 88 asserted as indicated by the current transition permission 4, and the target execution permission 9 is also asserted, so that the instruction access permission signal generator 14 asserts the instruction access permission signal. In response, the control circuit 16 updates the current segment identifier 3, the current transition permission 4, the current execution permission 5, and the current right permission 6 by overwriting their current values by the values in the target segment identifier 7, the target transition permission 8, the target execution permission 9, and the target right permission 10.

Figure 16:
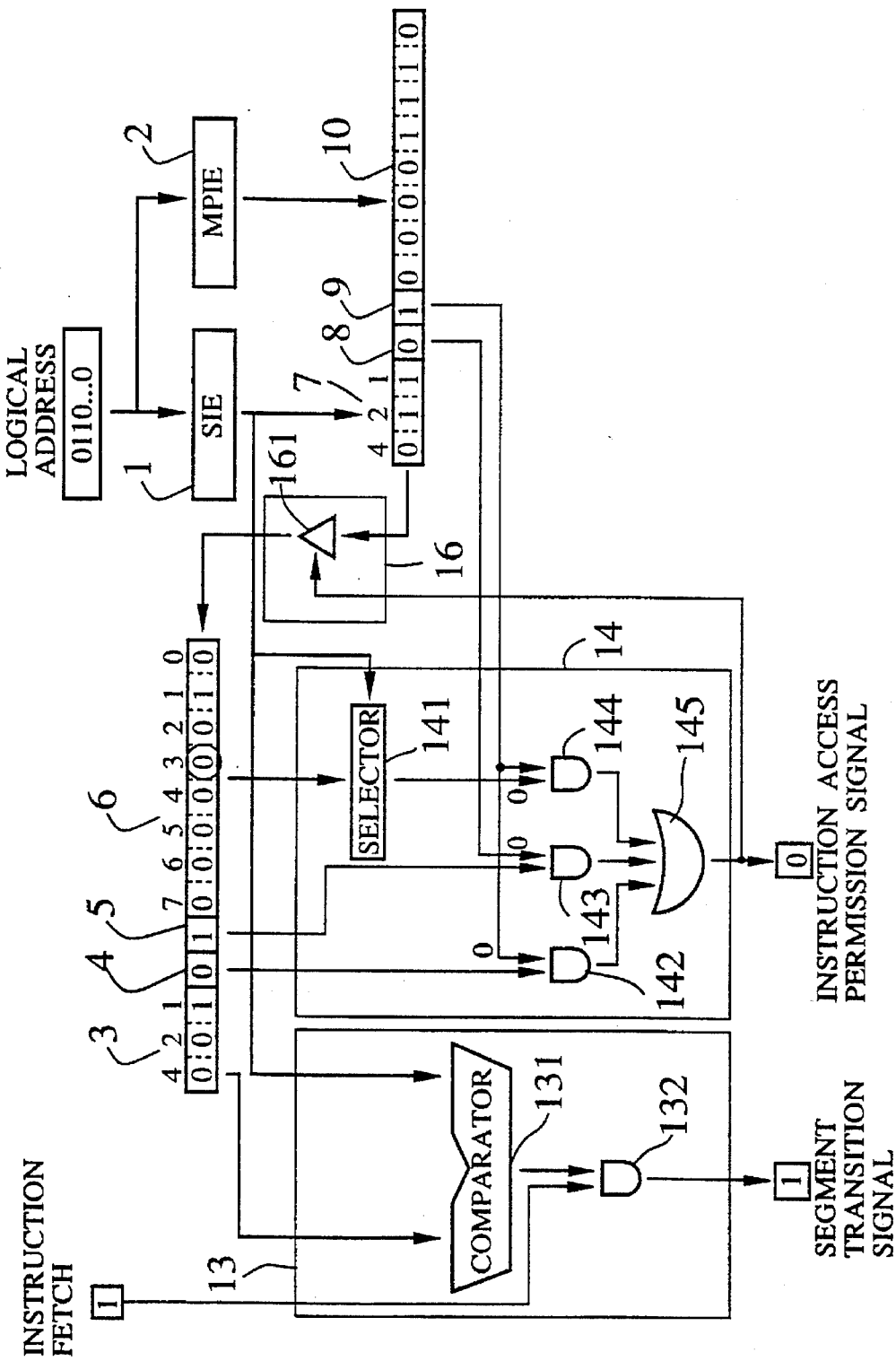
FIG. 16 is a block diagram of the memory protection device of FIG. 3 in a case of failing to make an instruction access with a prohibited segment transition.

FIG. 16 shows a case of an instruction fetch in which a requested segment transition is a segment transition to a segment to which the segment transition is not permitted. Namely, in this case, the currently executed instruction is present in the segment-1 as indicated by the current segment identifier 3, and the current right permission 6 for the permits the access only to the segment-1, while the next instruction to be executed is present in the segment-3 as indicated by the target segment identifier 7. In this case, the current right permission 6 does not permit the access to the segment-3, so that the entry of the current right permission 6 corresponding to the target segment identifier 7 selected by the selector 141 is negated and consequently the output of the AND gate 144 is negated. Also, the target transition permission 8 is negated as the segment-3 is not the gate page, so that the output of the AND gate 142 is also negated. Moreover, the current transition permission 4 is also negated as the segment-1 is not the gate page, so that the output of the AND gate 143 is also negated. Consequently, the OR gate 145 negates the instruction access permission signal as none of the outputs of the AND gates 142, 143, and 144 is asserted. In this case, the occurrence of the improper access can be indicated by the negated instruction access permission signal from the instruction access permission signal generator 14, and whether the rejected access is a branch instruction or not can be judged according to the segment transition signal from the segment transition signal generator 13. Also, since the instruction access permission signal is not asserted, the control circuit 16 does not update the current segment identifier 3, the current transition permission 4, the current execution permission 5, and the current right permission 6.

Next, in a case of carrying out the data access according to the data read command and the data write command from the data processing unit, this memory protection device of FIG. 3 operates as follows.

First, in a case of the data access, the data processing unit supplies the logical address to be accessed and the data read and the data write commands to the memory protection device.

In the memory protection device, the logical address is supplied to the segment information extractor 1 and the memory protection information extractor 2, just as in a case of the instruction access, such that the segment information extractor 1 extracts the segment identifier from the supplied logical address and the obtained segment identifier is stored into the target segment identifier 7, while the memory protection information extractor 2 extracts the memory protection information also from the supplied logical address and the obtained memory protection information is stored in the target transition permission 8, the target execution permission 9, the target right permission 10, the read permission 11, and the write permission 12, as the target memory protection information 18.

Then, the data access permission signal generator 15 generates the data access permission signal according to the current segment identifier 3, the target segment identifier 7, the target memory protection information 18, and the data read and data write commands supplied from the data processing unit, as described above. Here, it is to be noted that the checking made by the comparator 151 and the NAND gate 152 is provided in order to permit the access to the instruction region for reading or writing of the instruction by the data access operation as long as the instruction region to be accessed is in the same segment as the current segment. However, this checking made by the comparator 151 and the NAND gate 152 is not absolutely necessary, so that it can be omitted depending on the desired protection policy adopted.

Now, such an operation of the memory protection device of FIG. 3 in a case of carrying out the data access according to the data read and data write commands from the data processing unit will be illustrated for the same exemplary case of realizing hierarchical relationships among the segments shown in FIG. 10 by using the same assignment of the values to the transition permission, the execution permission, the right permission, the read permission, and the write permission, as shown in FIG. 11.

Here, it is to be noted that, in this case, the target execution permission 9 indicates that the access to be made next is the data access, so that the target right permission 10 can be regarded as indicating the right to be accessed for the data at the logical address to be accessed next. Consequently, the regions to which the instruction access is permitted from the supplied logical address is independent of the regions to which the data access is permitted from the supplied logical address, such that it becomes possible to set up the regions that can be accessed only from the regions in the same segment, and the regions that can be shared with the other segments. Thus, it is possible in this embodiment to hide the data which are effective in protecting the programs.

Figure 17:
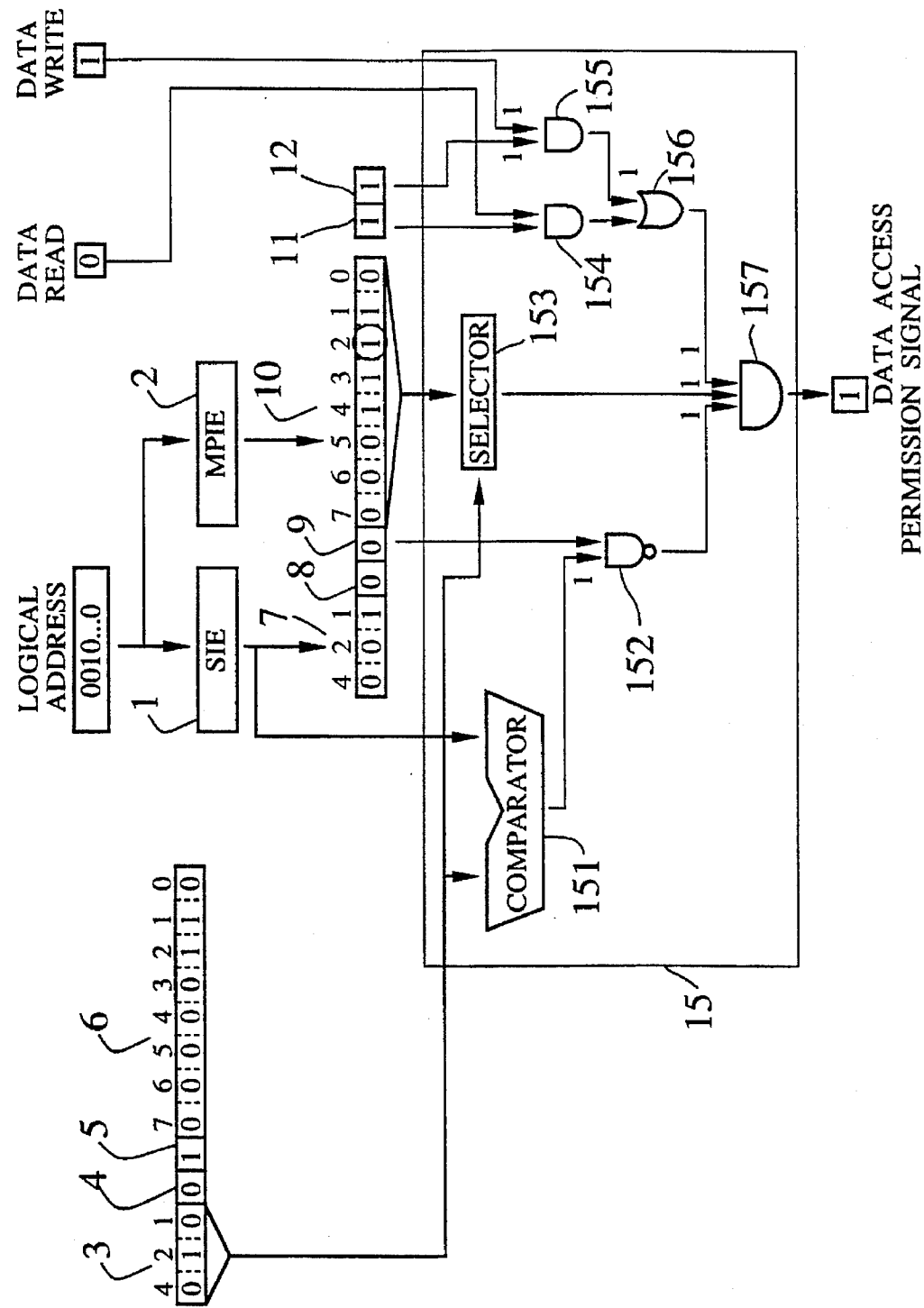
FIG. 17 is a block diagram of the memory protection device of FIG. 3 in a case of making a data access with a segment transition.

FIG. 17 shows a case of a data fetch for the data write operation to the segment to which the data access is permitted. Here, the segment in which the currently executed instruction is present is the segment-2 as indicated by the current segment identifier 3 while the segment to be accessed for the data write operation is the segment-1 as indicated by the target segment identifier 7. In this case, the target execution permission 9 is negated to indicate the data access so that the NAND gate 152 asserts its output, while the access from the segment-2 to the segment-1 is permitted by the target right permission 10 so that the entry of the target right permission 10 corresponding to the current segment identifier 3 selected by the selector 153 is asserted, and the write permission 12 permits the data write, so that the OR gate 156 asserts its output. Consequently, the data access permission signal generator 15 asserts the data access permission signal.

Figure 18:
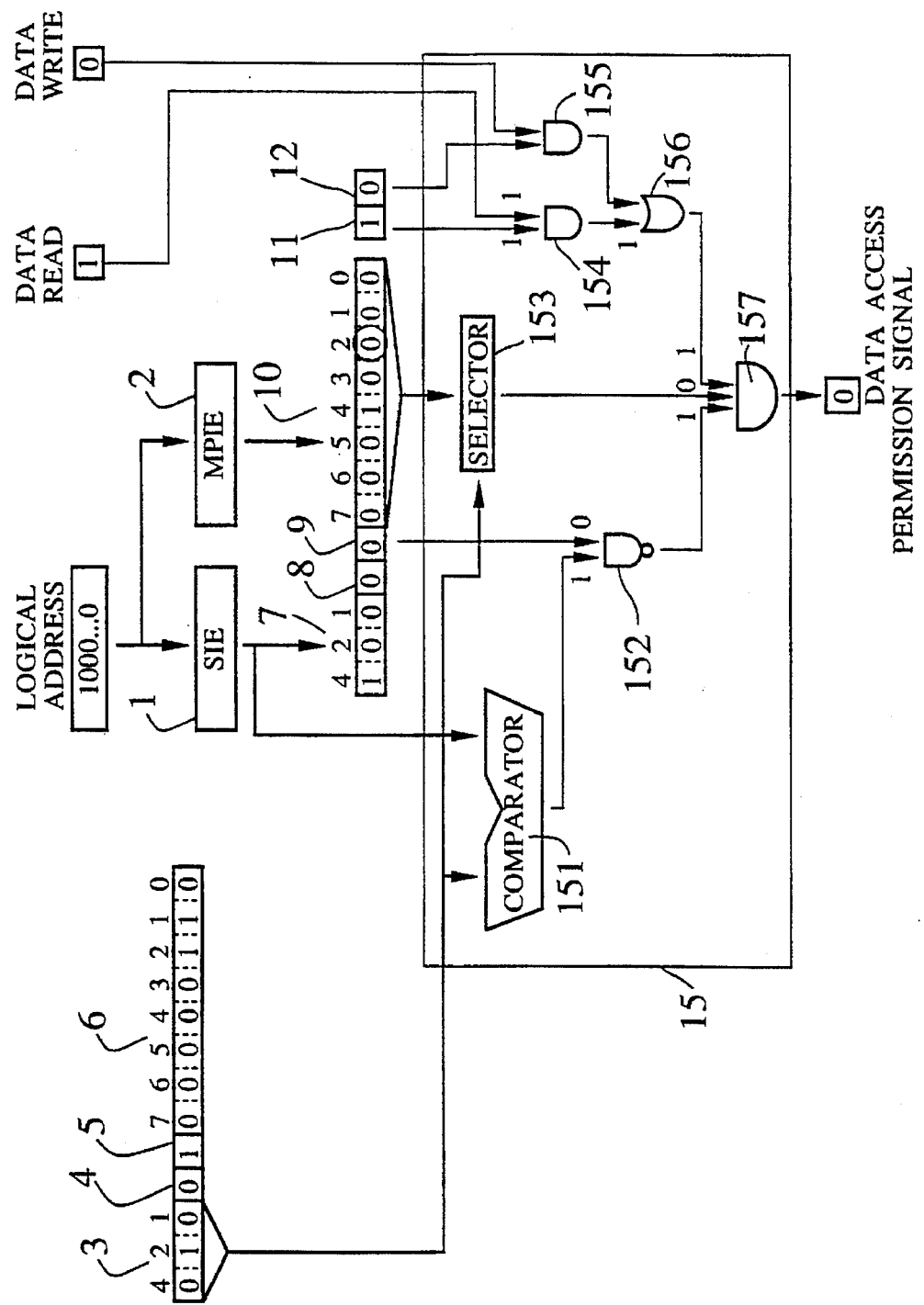
FIG. 18 is a block diagram of the memory protection device of FIG. 3 in a case of failing to make a data access with a prohibited segment transition.

FIG. 18 shows a case of a data fetch for the data read operation from the segment to which the data access is not permitted. Here, the segment in which the currently executed instruction is present is the segment-2 as indicated by the current segment identifier 3 while the segment to be accessed for the data read operation is the segment-4 as indicated by the target segment identifier 7. In this case, the target execution permission 9 is negated to indicate the data access so that the NAND gate 152 asserts its output, and the read permission 11 permits the data read so that the OR gate 156 asserts its output, but the access from the segment-2 to the segment-4 is not permitted by the target right permission 10, so that the entry of the target right permission 10 corresponding to the current segment identifier 3 selected by the selector 153 is negated. Consequently, the data access permission signal generator 15 negates the data access permission signal. In this case, the occurrence of the improper access can be indicated by the negated data access permission signal from the data access permission signal generator 15.

Thus, in this memory protection device of FIG. 3, the rights to make accesses to the segments in the virtual memory can be set up separately for the case of the instruction access and the case of the data access, according to semi-ordered hierarchical relationships among the segments such as that shown in FIG. 10.

Figure 19:
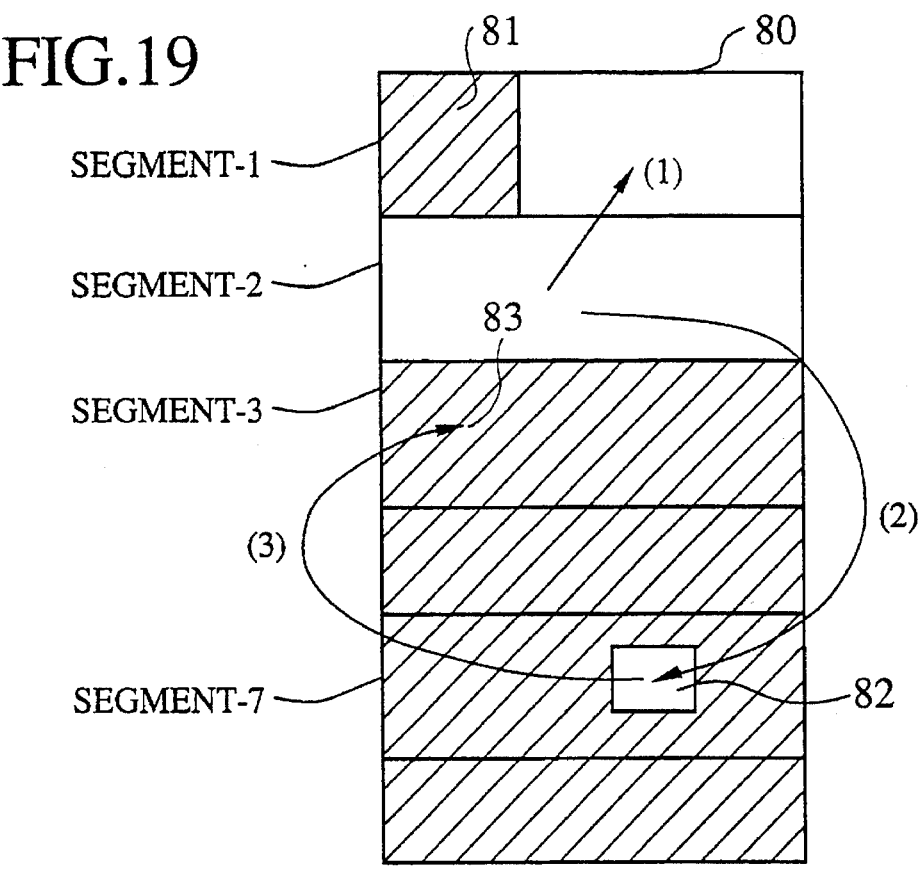
FIG. 19 is a diagrammatic representation of a logical address space, indicating exemplary accessible regions and three possible exemplary routes of permitted segment transitions for the instruction access in the memory protection device of FIG. 3.

Namely, when the assignment shown in FIG. 11 realizing the semi-ordered hierarchical relationships shown in FIG. 10 is used, the regions in the logical address space 80 to which the direct branching can be made from the segment-2 in a case of the instruction fetch can be limited, as indicated in FIG. 19, to the branching to the segment-1 excluding a data region 81 indicated by an arrow (1) which is permitted by the right permission, the branching to the gate page 82 indicated by an arrow (2), and the branching from the gate page 82 indicated by an arrow (3) to a prescribed entrance address 83.

Figure 20:
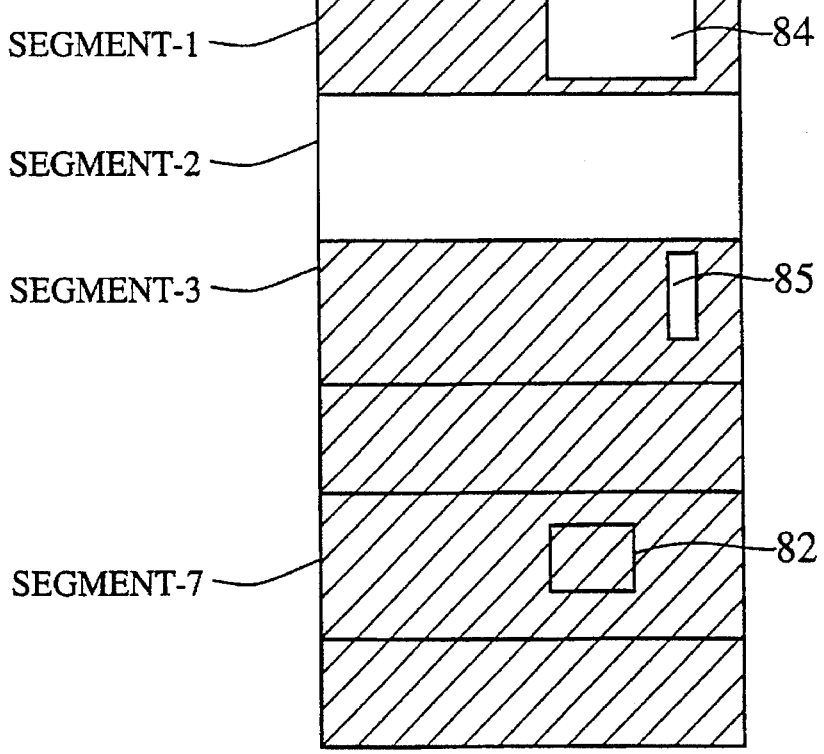
FIG. 20 is a diagrammatic representation of a logical address space, indicating exemplary accessible regions for the data access in the memory protection device of FIG. 3.

As for the case of the data fetch, the regions in the logical address space 80 to which the data access can be made from the segment-2 can be set up differently from the case of the instruction access, as indicated in FIG. 20, to the same segment-2, the argument region 84 in the segment-1 and the buffer region 85 in the segment-3.

As a consequence of realizing such a limited transition range for the instruction execution and a page accessible only from one segment, it becomes possible to realize a segment which is hidden from the other segment in a case of allocating a plurality of programs to a single virtual space, such that the hidden segment can be protected against the improper accesses from the other segments.

Figure 21:
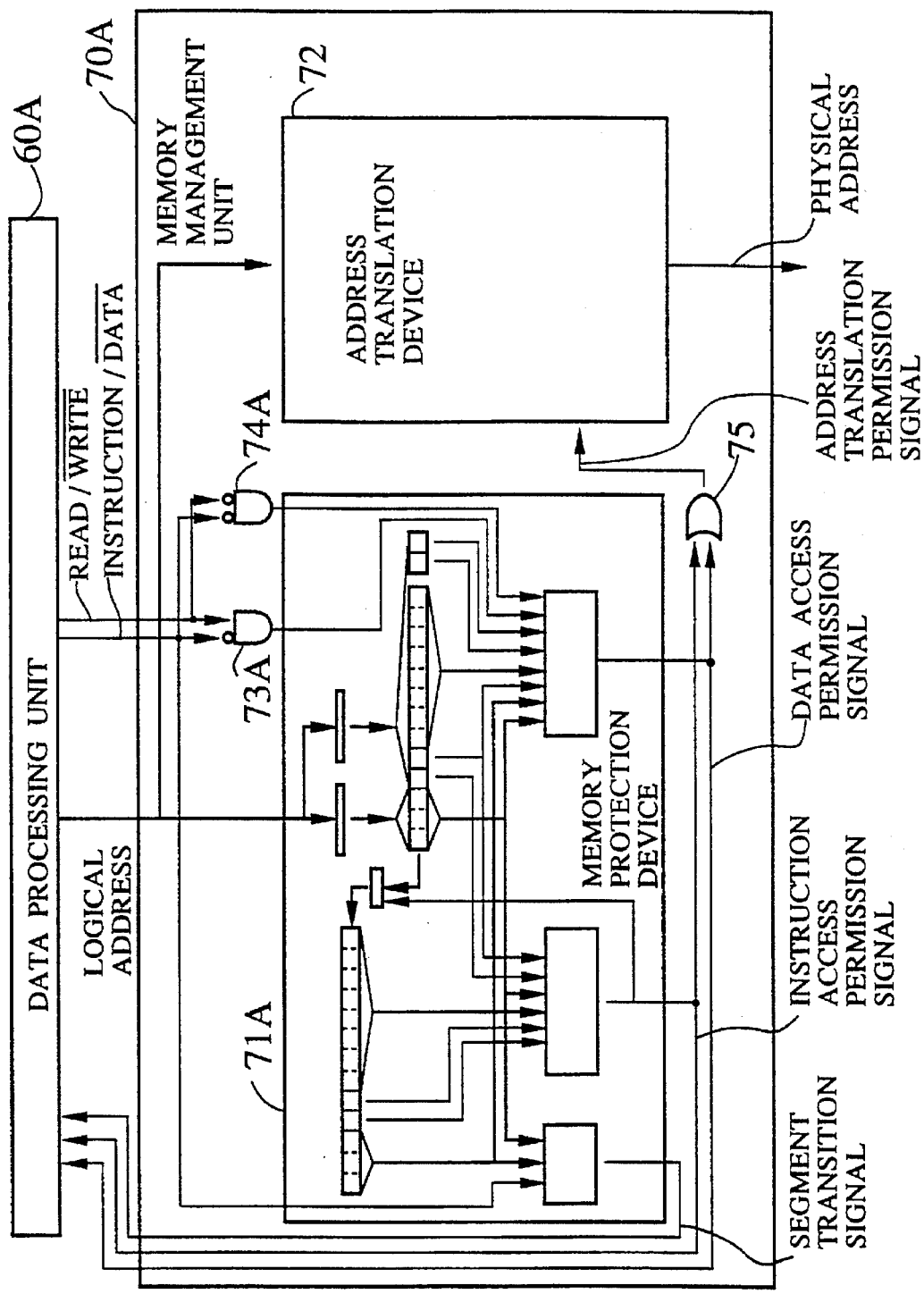
FIG. 21 is a block diagram of one exemplary configuration of a memory management unit using the memory protection device of FIG. 3.
Figure 22:
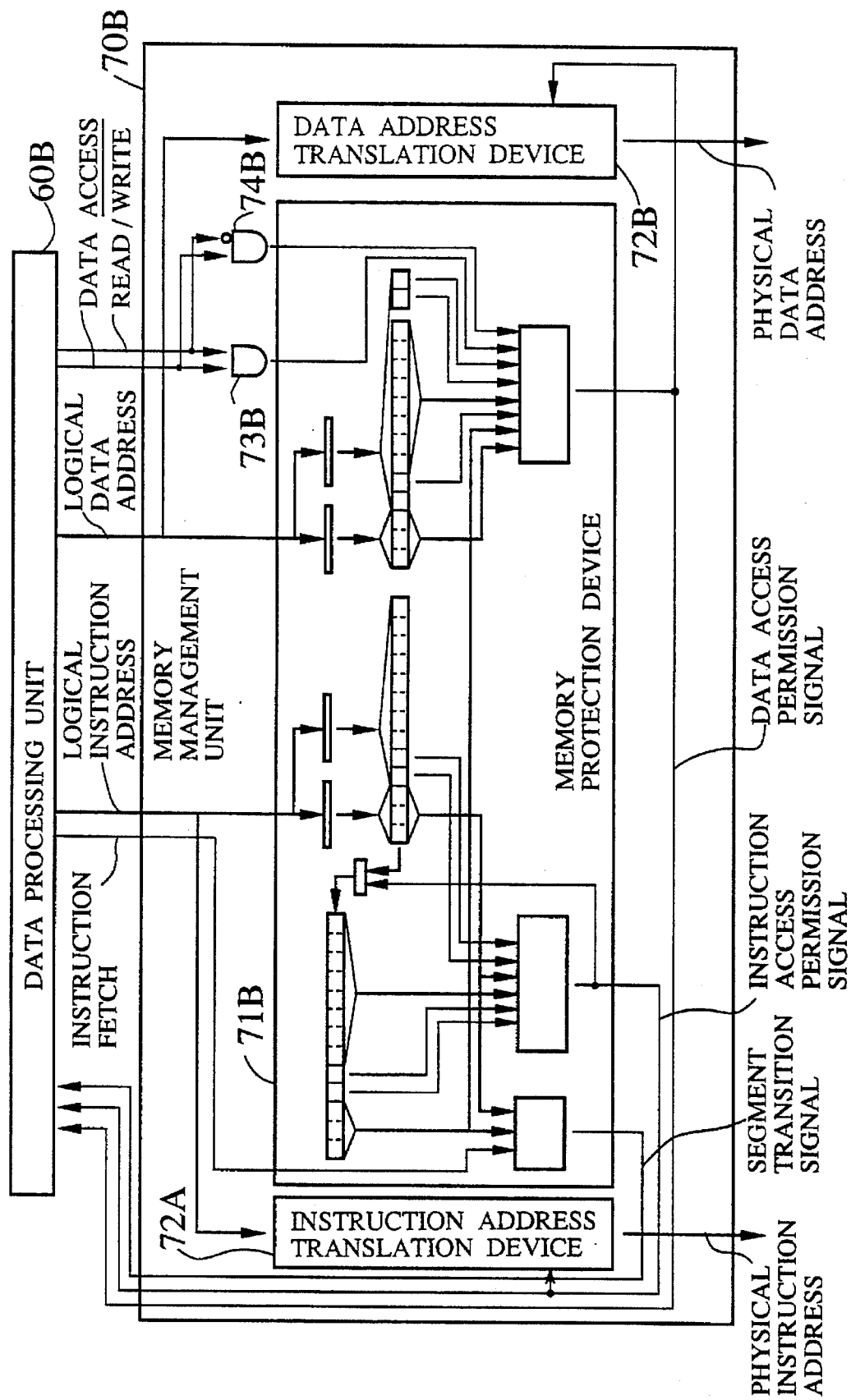
FIG. 22 is a block diagram of another exemplary configuration of a memory management unit using the memory protection device of FIG. 3.

Now, the memory protection device of FIG. 3 described above can be utilized as a component of a memory management unit having exemplary configurations as shown in FIG. 21 and FIG. 22.

FIG. 21 shows one exemplary configuration of a memory management unit, in which a memory management unit 70A generally comprises a memory protection device 71A of the type similar to that shown in FIG. 3, and an address translation device 72 for translating the logical address supplied from the data processing unit 60A into the physical address.

In this memory management unit 70A, the logical address and the instruction fetch command are supplied to the memory protection device 71A directly from the data processing unit 60A, while the data read and data write commands are supplied to the memory protection device 71A from AND gate 73A and NAND gate 74A which obtain the data read and data write commands from the read/write signal and the instruction/data signal supplied from the data processing unit 60A.

The segment transition signal, instruction access permission signal, and data access permission signal obtained by the memory protection device 71A are supplied to the data processing unit 60A. On the other hand, the address translation operation of the address translation device 72 is controlled by an address translation permission signal obtained by an OR gate 75 which outputs the address translation permission signal when either one of the instruction access permission signal and the data access permission signal obtained by the memory protection device 71A is asserted.

FIG. 22 shows another exemplary configuration of a memory management unit suitable for a case in which the data processing unit 60B supplies the logical instruction address and the logical data address separately. In this configuration of FIG. 22, a memory management unit 70B generally comprises: a memory protection device 71B of the type similar to that shown in FIG. 3 in which the segment information extractor, the memory protection information extractor, the target segment identifier, and the target memory protection information are provided in duplicate with respect to the separately supplied logical instruction address and logical data address; an instruction address translation device 72A for translating the logical instruction address supplied from the data processing unit 60A into the physical instruction address; and a data address translation device 72B for translating the logical data address supplied from the data processing unit 60A into the physical data address.

In this memory management unit 70B, the logical instruction address, the instruction fetch command, and the logical data address are supplied to the memory protection device 71B directly from the data processing unit 60B, while the data read and data write commands are supplied to the memory protection device 71B from an AND gates 73B and 74B which obtain the data read and data write commands from the read/write signal and the data access signal supplied from the data processing unit 60B.

The segment transition signal, instruction access permission signal, and data access permission signal obtained by the memory protection device 71B are supplied to the data processing unit 60B. On the other hand, the address translation operation of the instruction address translation device 72A is controlled by the instruction access permission signal obtained by the memory protection device 71B while the address translation operation of the data address translation device 72B is controlled by the data access permission signal obtained by the memory protection unit 71B.

Figure 23:
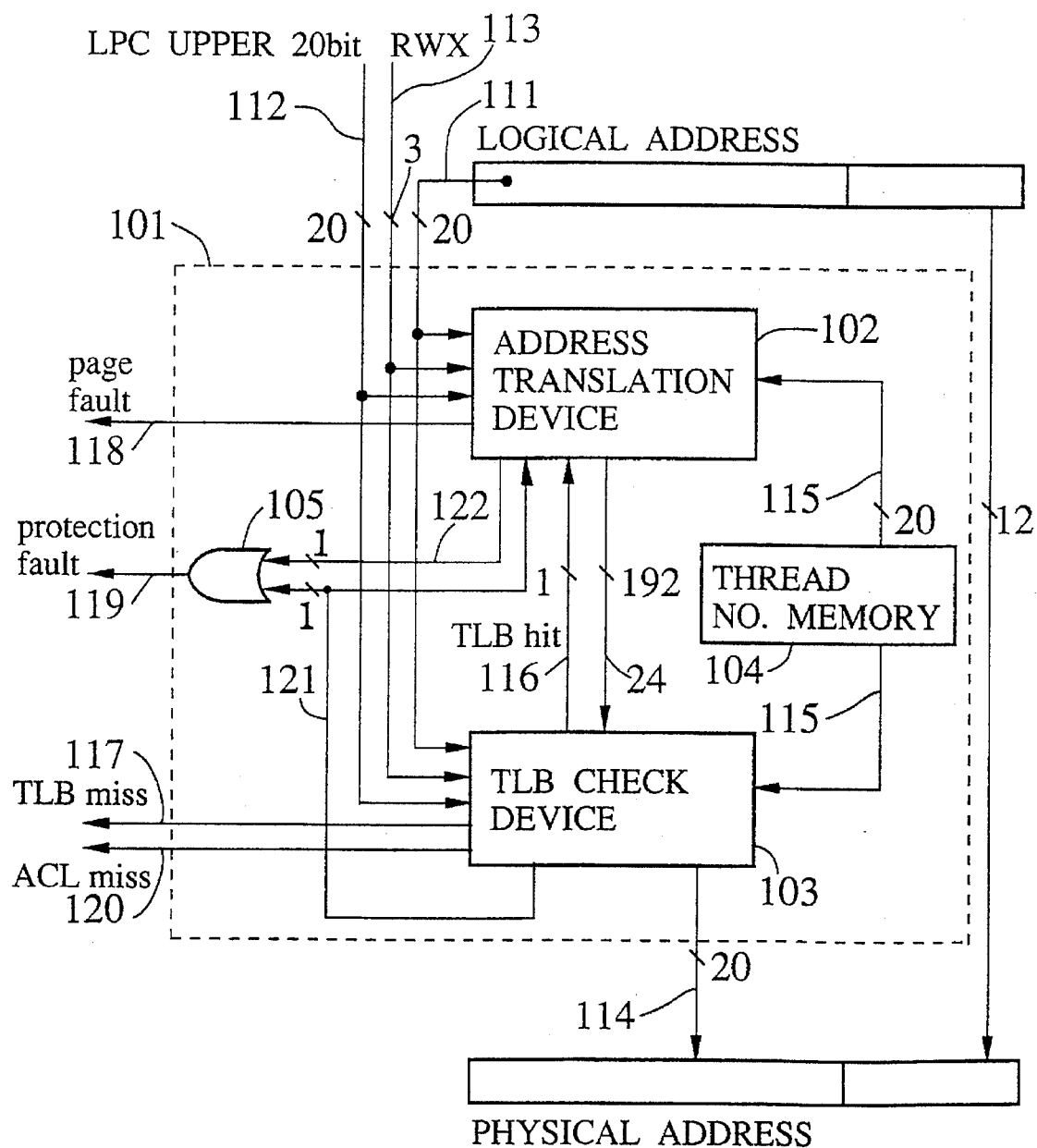
FIG. 23 is a block diagram of another embodiment of a memory management unit according to the present invention.

Referring now to FIG. 23, another embodiment of a memory management unit according to the present invention will be described in detail. This memory management unit utilizes an ACL (Access Control List) type controlling in which the access is controlled according to an ACL indicating where each page can be accessed from, instead of a capability type controlling used in the previous embodiment in which the access is controlled according to various permissions given in terms of bit patterns indicating where each page can make access to. Here, as in the above, for the sake of definiteness, the description will be given for a case in which the protection is provided in units of regions representing physical pages in each segment, where each page is identified by a page number defined by upper 20 bits of full address, although the applicability of the present invention is not limited to this particular case.

In this configuration of FIG. 23, the memory management unit 101 comprises: an address translation device 102 for translating a logical page number supplied from a data processing unit (not shown in FIG. 23) into a corresponding physical page number; a TLB (Translation Look-aside Buffer) check device 103 for checking a TLB storing a selected number of the logical and physical page number pairs along with the memory protection information for each logical address; a thread number memory 104 for storing thread numbers assigned in advance to threads to be executed in the data processing unit; and an OR gate for outputting a protection fault signal 119 indicating an occurrence of a protection fault.

In this embodiment, the memory management unit 101 is supplied with a logical page number 111 defined by upper 20 bits of the logical address to be accessed, an LPC (Last Program Counter) upper 20 bits value 112 defined by upper 20 bits of an immediately previous value indicated by a program counter in the data processing unit which indicates an address at which the currently executed instruction is present, and 3 bits memory access mode (RWX) 113 indicating a type of access to be made including read, write and execution, from the data processing unit. Then, the memory management unit 101 basically operates to obtain a physical page number 114 defined by upper 20 bits of the physical address corresponding to the supplied logical page number 111.

In the memory management unit 101, the supplied logical page number 111, LPC upper 20 bits value 112, and memory access mode 113 are supplied to the address translation device 102 and the TLB check device 103 simultaneously, along with a current thread 115 specifying a thread number of the currently executed thread stored in the thread number memory 104, such that the address translation operation to obtain the desired physical page number 114 for the physical address to be accessed is carried out in parallel at the address translation device 102 and the TLB check device 103.

Here, the address translation device 102 translates the supplied logical page number into the desired physical page number by using a page table enlisting all corresponding logical and physical page number pairs along with their associated memory protection information in forms of page table entries (PTE), while the TLB check device 103 obtains the desired physical page number corresponding to the supplied logical page number by using the TLB enlisting a selected number of the page table entries of the page table cached from the address translation device 102.

When the TLB check device 103 finds the desired physical page number in the TLB, the TLB check device 103 outputs this physical page number as the desired physical page number 114 and supplies a TLB hit signal 116 to the address translation device 102 in order to abort the address translation operation in the address translation device 102.

When the TLB check device 103 fails to find the desired physical page number in the TLB, the TLB check device 103 asserts a TLB miss signal 117. In this case, the address translation device 102 continues its address translation operation. In a case the address translation device 102 obtains the desired physical page number from the page table successfully, the address translation device 102 caches the page table entry (PTE) 24 for the obtained physical page number into the TLB in the TLB check device 103, and the TLB check device outputs this physical page number indicated by the supplied page table entry (PTE) 24 as the desired physical page number 114. On the other hand, in a case the address translation device 102 also fails to obtain the desired physical page number corresponding to the supplied logical page number, the address translation device 102 generates a page fault signal 118 to interrupt the operation of the data processing unit.

In addition, in a case the desired physical page number is found to be associated with the memory protection information indicating a prohibition to make an access to the physical address corresponding to this physical page number in either one of the address translation device 102 or the TLB check device 103, that one of the address translation device 102 or the TLB check device 103 which found the desired physical page number supplies the protection fault signal 122 or 121 to the OR gate 105 such that the protection fault signal 119 to interrupt the operation of the data processing unit is outputted from the OR gate 105.

Furthermore, when the TLB check device 103 finds the desired physical page number in the TLB, but fails to hit any ACL entries, the TLB check device 103 asserts an ACL miss signal 120. In this case, the address translation device 102 checks the ACL entries.

Figure 24B:
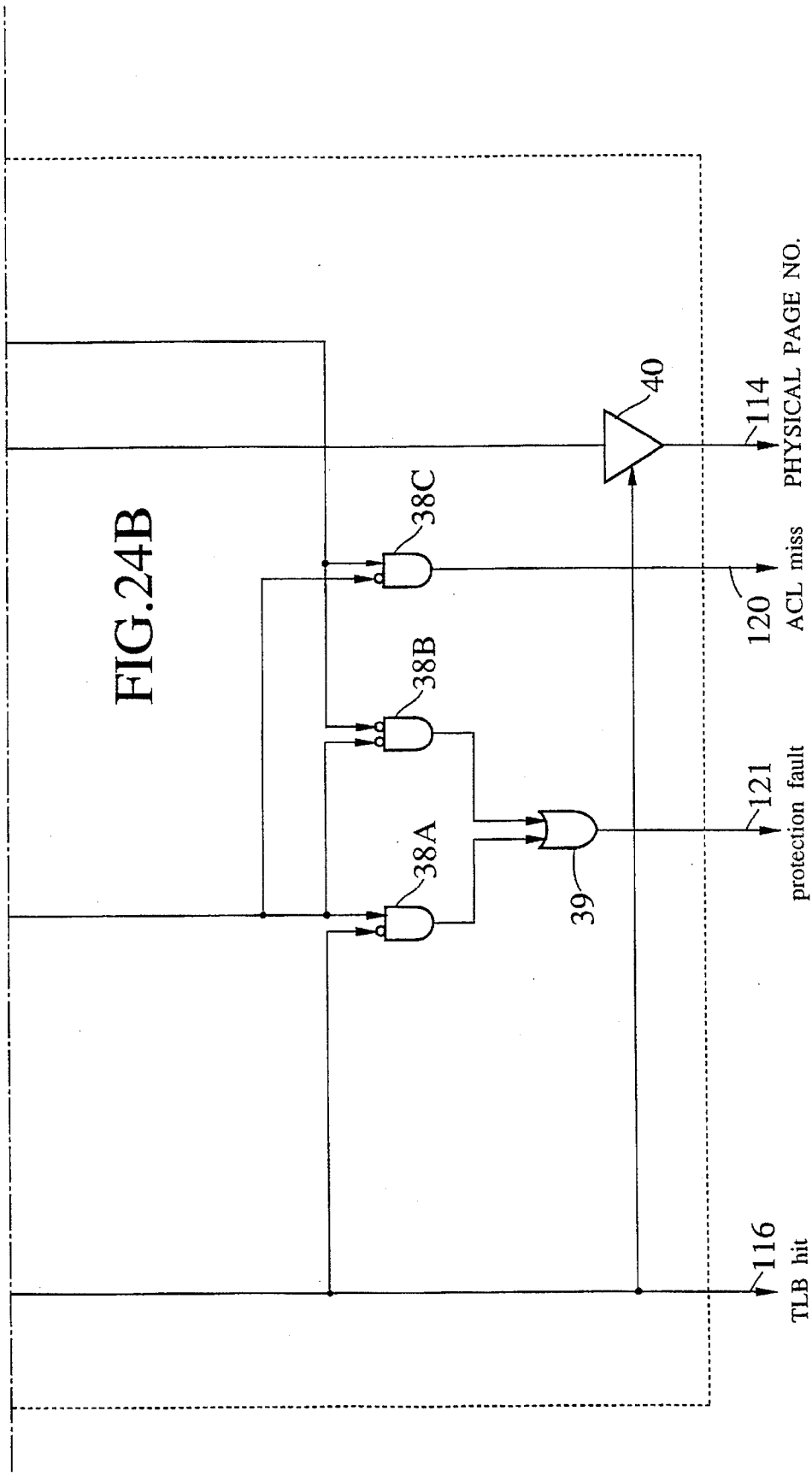

FIGS. 24A–B shows a further detail configuration of the TLB check device 103 in this memory management unit 101.

In this configuration of FIGS. 24A–B, the TLB check device 103 has the TLB 31 storing a plurality of entries, of which only one is shown in FIGS. 24A–B. Each entry of this TLB 31 includes: the logical page number 311; the physical page number 312 corresponding to the logical page number 311; five flags (V, D, R, M, and E) 313 to 317 for indicating the attributes of the page represented by the logical page number 311 and the physical page number 312; a plurality (three in FIGS. 24A-B) of thread numbers 318 for the threads which are permitted to make an access to the logical address corresponding to the logical page number 311; the LPC upper 20 bits value 319 corresponding to each of the thread numbers 318; three flags (PE, TE, and B) 320 to 322 associated with each of the thread numbers 318; and memory access mode permission (rwx) 323 associated with each of the thread numbers 318. In this TLB 31, an area U next to the flag E is unused.

In this embodiment, three sets of the thread number 318, the LPC upper 20 bits value 319, the flags 320 to 322, and the memory access mode permission 323 form the ACL (Access Control List) for indicating which thread that is executing codes of which logical page is permitted to make what kind of access to that logical page.

In this TLB 31, the five flags (V, D, R, M, and E) 313 to 317 indicate the following attributes of the page. The flag (V) 313 is a valid flag indicating whether this TLB entry is valid or not. The flag (D) 314 is a dirty flag indicating whether the page represented by this TLB entry has been changed or not. The flag (R) 315 is a referenced flag indicating whether the page represented by this TLB entry has been accessed. The flag (M) 316 is a more flag indicating whether the additional ACL entries for the page represented by this TLB entry other than the three ACL entries enlisted in the TLB 31 exist or not. The flag (E) 317 is an enable flag indicating whether the ACL for the page represented by this TLB entry is to be checked or not.

Also, in each ACL entry in this TLB 31, the memory access mode permission (rwx) 323 indicates whether the page represented by this TLB entry is readable, writable, and executable In the thread represented by the thread number 318 of this ACL entry.

Moreover, in each ACL entry in this TLB 31, the three flags (PE, TE, and B) 320 to 322 given in the ACL indicate the following attributes of each ACL entry.

The flag (PE) 320 indicates whether a comparison of the thread number 318 of this ACL entry with the thread number specified by the current thread 115 is to be made or not. When this flag (PE) 320 is set to 0, the check of the access condition regarding the thread number can be omitted, such that the access permission can be given to all the threads uniformly.

The flag (TE) 321 indicates whether a comparison of the LPC upper 20 bits value 219 of this ACL entry with the LPC upper 20 bits value 112 is to be made or not. When this flag (TE) 321 is set to 0, the access permission can be given to any ACL entry regardless of the LPC upper 20 bits value, as long as the thread number of the thread is the same as the thread number 318 of this ACL entry, The flag (B) 322 indicates whether the coincidence of the thread numbers is to be checked or the size relationship between the thread numbers is to be checked in the comparison of the thread numbers. When this flag (B) 322 is set to 0, the access permission is given only when the thread number specified by the current thread 115 is equal to the thread number 318 of this ACL entry. On the other hand, when this flag (B) 322 is set to 1, the access permission is given when the thread number specified by the current thread 115 is greater than or equal to the thread number 318 of this ACL entry. Thus, in this case of setting the flag (B) 322 to 1, the thread numbers are utilized to indicate the protection levels in the ring protection, where the larger thread number is given the stronger right.

Now, in this TLB check device 103 of FIGS. 24A-B, the logical page number 111 supplied from the data processing unit specifies the corresponding TLB entry having the identical logical page number 318 in the TLB 31. Then, the thread number specified by the current thread 115 and the LPC upper 20 bits value 112 and the 3 bits memory access mode (RWX) 113 supplied from the data processing unit are combined together at combiners 32 and 33 to obtain 43 bits output 331, which is to be compared with each of the three ACL entries of this TLB entry by three identical comparison units 34, 35, and 36.

Figure 25:
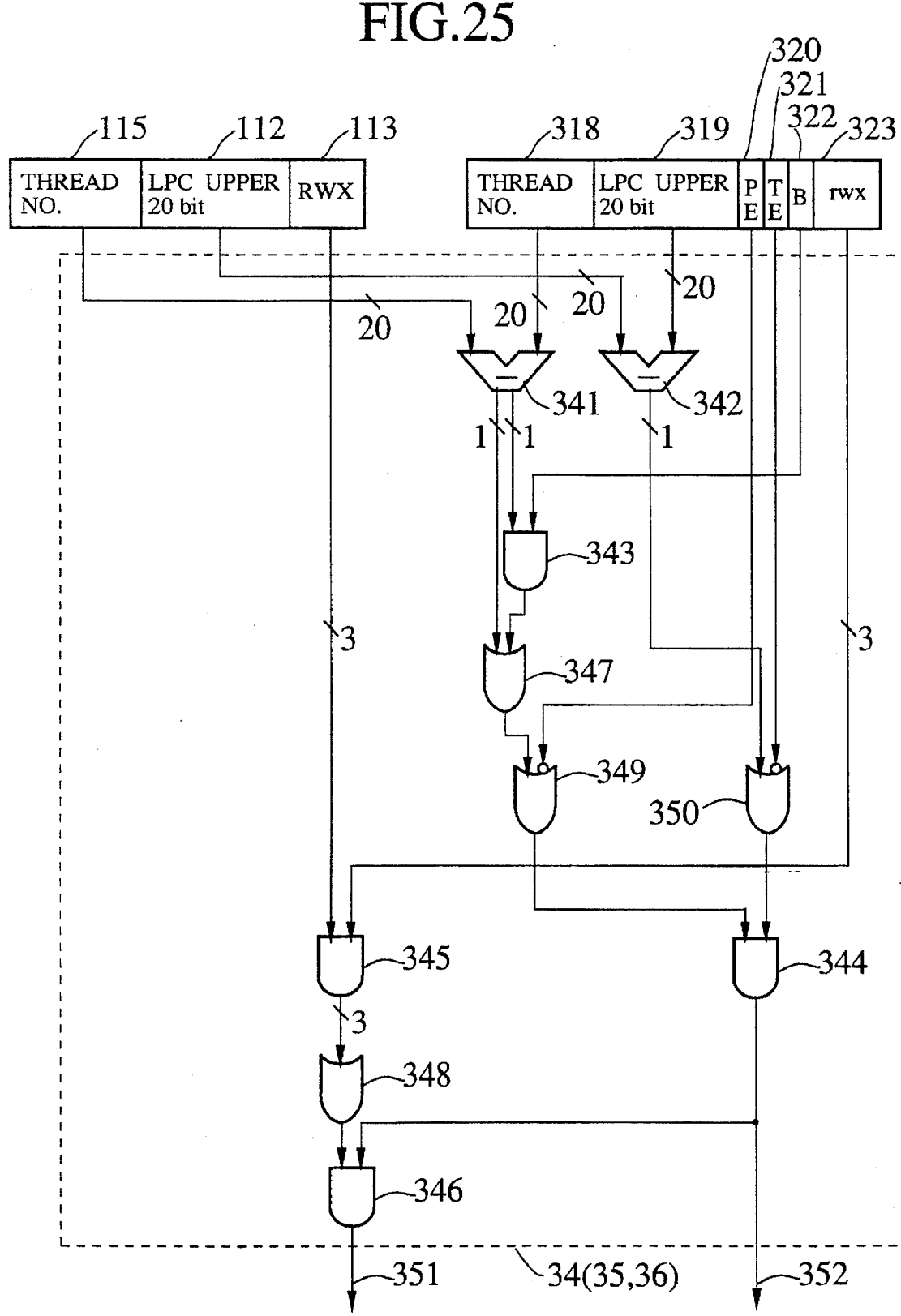
FIG. 25 is a further detailed block diagram of a comparison unit in the translation look-aside buffer (TLB) check device of FIG. 24.

Each of the comparison units 34, 35, and 36 has a configuration as shown in FIG. 25, which comprises: a comparator 341 for comparing the thread number specified by the current thread 115 with the thread number 318 of each ACL entry and asserting its output when they are identical; a comparator 342 for comparing the supplied LPC upper 20 bits value 112 with the LPC upper 20 bits value 319 of each ACL entry and asserting its output when they are identical; an AND gate 343 for asserting its output when the output of the comparator 341 and the flag (B) 322 are both asserted; an OR gate 347 for asserting its output when either one of the outputs of the comparator 341 and the AND gate 343 is asserted; an OR gate 349 for asserting its output when the output of the OR gate 347 is asserted while the flag (PE) 320 is negated; an OR gate 350 for asserting its output when the output of the comparator 342 is asserted while the flag (TE) 321 is negated; an AND gate 344 for asserting its output 352 when the outputs of the OR gates 349 and 350 are both asserted; an AND gate 345 for asserting each bit of its 3 bits output when each of the memory access mode (RWX) 113 is identical to each of the memory access mode permission (rwx) 323 of each ACL entry; an OR gate 348 for asserting its output when any one of the 3 bits output of the AND gate 345 is asserted; and an AND gate 346 for asserting its output 351 when the outputs of the OR gate 348 and the AND gate 344 are both asserted.

Thus, the AND gate 344 asserts the output 352 when the thread number specified by the current thread 115 is identical to the thread number 318 of each ACL entry and the supplied LPC upper 20 bits value 112 is identical to the LPC upper 20 bits value 319 of each ACL entry, i.e., when the memory access conditions are satisfied. Then, the AND gate 346 asserts the output 351 when the memory access conditions are satisfied and the type of the memory access to be made is permitted. In other words, when the output 351 is asserted, the memory access is permitted.

Then, the TLB check device 103 of FIGS. 24A-B further comprises: a NOT gate 42 for asserting its output when the enable flag (E) 317 is negated; an OR gate 37A for asserting the TLB hit 116 when any one of the outputs 351 of the three comparison units 34, 35, and 36 and the output of the NOT gate 42 is asserted; an OR gate 37B for asserting its output when any one of the outputs 352 of the three comparison units 34, 35, and 36 and the output of the NOT gate 42 is asserted; an AND gate 38A for asserting its output when the output of the OR gate 37A is negated while the output of the OR gate 37B is asserted; an AND gate 38B for asserting its output when the outputs of the OR gate 37B and the more flag (M) 316 are both negated; an OR gate 39 for asserting the protection default 121 when either one of the outputs of the AND gate 38A and the AND gate 38B is asserted; an AND gate 38C for asserting the ACL miss 120 when the output of the OR gate 37B is negated while the more flag (M) 316 is asserted; a gate 40 for outputting the physical page number 312 of this TLB entry when the TLB hit 116 is asserted by the OR gate 37A; and a NOT gate 41 for asserting the TLB miss 117 when the valid flag (V) 313 is negated.

Thus, when the memory access conditions are satisfied and the type of the memory access to be made is permitted for any one of the ACL entries on this TLB entry, the TLB hit is asserted and the physical page number of this TLB entry is outputted as the desired physical page number corresponding to the supplied logical page number. On the other hand, the protection fault 121 is asserted when the memory access conditions are satisfied but the type of the memory access to be made is not permitted, or when the memory access conditions are not satisfied and there is no other ACL entries for the page represented by this TLB entry.

Also, when the enable flag (E) 317 is negated, the physical page number 312 of this TLB entry is outputted without carrying out the check of the ACL entries.

When neither the TLB hit 116 nor the protection fault 121 is asserted, the address translation operation of the TLB check device 103 is terminated and the result of the address translation operation by the address translation device 102 is waited while the ACL entries are checked.

When the memory access conditions are satisfied but no corresponding ACL entry can be found in this TLB entry, the TLB check device 103 asserts an ACL miss signal 120 and the address translation device 102 checks the ACL entries.

Figure 26:
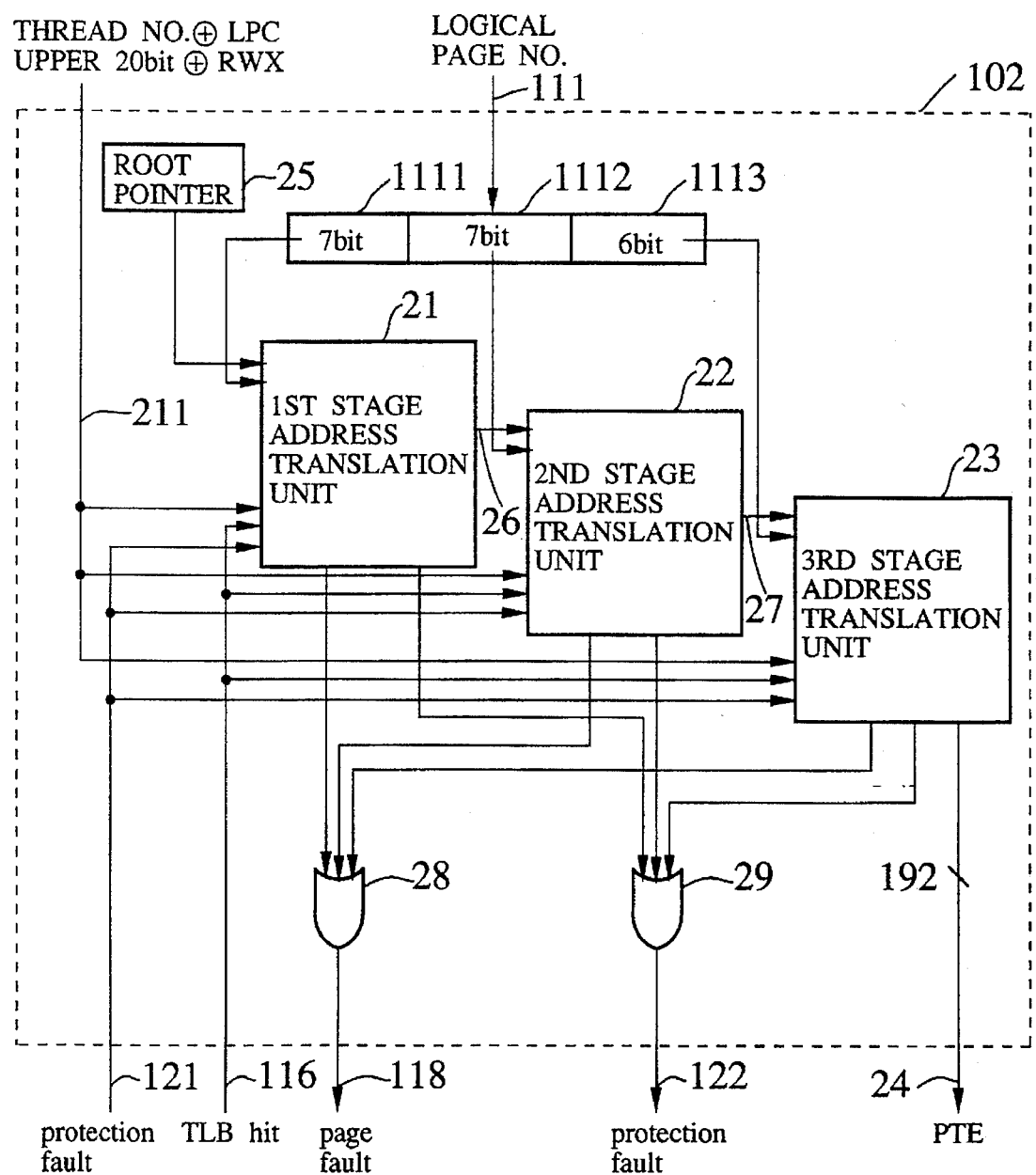
FIG. 26 is a detailed block diagram of an address translation device in the memory management unit of FIG. 23.

FIG. 26 shows a further detail configuration of the address translation device 102 in this memory management unit 101.

In this configuration of FIG. 26, the address translation device 102 comprises: a first stage address translation unit 21 for translating a first 7 bits 1111 of the supplied logical page number 111; a second stage address translation unit 22 for translating next 7 bits 1112 of the supplied logical page number 111; a third stage address translation unit 23 for translating last 6 bits 1113 of the supplied logical page number 111; a root pointer for indicating a start address of a first stage address table in the first stage address translation unit 21; an OR gate 28 for outputting the page fault signal 118 according to the results of the address translation by the first, second, and third stage address translation units 21, 22, and 23; and an OR gate 29 for outputting the protection fault signal 122 according to the results of the address translation by the first, second, and third stage address translation units 21, 22, and 23.

In this address translation device 102 of FIG. 26, the thread number specified by the current thread 115, the supplied LPC upper 20 bits value 112, and the 3 bits memory access mode (RWX) 113 are supplied to each of the first, second, and third stage address translation units 21, 22, and 23 as an input 211, and the first stage address table in the first stage address translation unit 21 is accessed by using the start address indicated by the root pointer 25 and the first 7 bits 1111 of the logical page number 111.

Then, the first stage address translation unit 21 determines an entry in the first stage address table corresponding to the first 7 bits 1111 of the logical page number 111 and outputs the obtained entry as a start address 26 of an address table in the second stage address translation unit 22 such that the second stage address table in the second stage address translation unit 22 is accessed by using the start address 26 and the next 7 bits 1112 of the logical page number 111.

Then, the second stage address translation unit 22 determines an entry in the second stage address table corresponding to the next 7 bits 1112 of the logical page number 111 and outputs the obtained entry as a start address 27 of an address table in the third stage address translation unit 23 such that the third stage address table in the third stage address translation unit 23 is accessed by using the start address 27 and the last 6 bits 1113 of the logical page number 111.

Then, the third stage address translation unit 23 determines an entry in the third stage address table corresponding to the last 6 bits 1113 of the logical page number 111 and outputs the obtained entry as the page table entry (PTE) 24 to be supplied to the TLB check device 103.

Here, the address translation operation carried out in any one of the first, second, and third stage address translation units 21, 22, and 23 is aborted when the TLB hit 116 or the protection fault 121 is supplied from the TLB check device 103.

Also, when the desired physical page number is found to be non-existent by any one of the first, second, and third stage address translation units 21, 22, and 23, that one of the first, second, and third address translation unit 21, 22, and 23 which found the non-existence of the desired physical page number supplies the page fault signal to the OR gate 28 such that the page fault signal 118 is outputted to the OR gate 105.

Also, when the desired physical page number is found to be associated with the memory protection information indicating a prohibition to make an access to the logical address corresponding to this physical page number by any one of the first, second, and third stage address translation units 21, 22, and 23, that one of the first, second, and third address translation unit 21, 22, and 23 which found the access prohibition supplies the protection fault signal to the OR gate 29 such that the protection fault signal 122 is outputted to the OR gate 105.

FIGS. 27A-B shows a further detail configuration of the first stage address translation unit 21 in the address translation device of FIG. 26. It is to be noted that the second stage address translation unit 22 also has a similar further detail configuration for which the reference numerals given in parentheses should be used.

In this configuration of FIGS. 27A-B, the first (second) stage address translation unit 21 (22) is supplied with the 43 bits of the input 211, the TLB hit 116, the first (next) 7 bits 1111 (1112) of the logical page number 111, and the address table start address 25 (26). The first (next) 7 bits 1111 (1112) and the address table start address 25 (26) are combined together by an address composition unit 212 to obtain an address table access address which specify the particular address table entry 213 corresponding to the first (next) 7 bits of the logical page number 111.

Each address table entry 213 contains: a pointer 2131 to next stage address table indicating the address table start address 26 (27) of the second (third) stage address table; three flags (V, M, and E) 2132, 2133, and 2134 similar to the flags (V, M, and E) used in the TLB 31; the ACL having a plurality (three in FIG. 27) of entries for the page represented by this address table entry 213, which is similar to the ACL used in the TLB 31; and a pointer 2135 to next ACL indicating the address of a next ACL for the page represented by this address table entry 213 in a case the total number of entries of the ACL for the page represented by this address table entry 213 exceeds three.

Here, the flag (V) 2132 is a valid flag indicating whether this address table entry 213 is valid or not. The flag (M) 2133 is a more flag indicating whether the additional ACL entries for the page represented by this address table entry 213 other than the three ACL entries enlisted in this address table entry 213 exist or not. The flag (E) 2134 is an enable flag indicating whether the ACL for the page represented by this address table entry 213 is to be checked or not.

When the appropriate address table entry 213 is accessed, the valid flag (V) 2132 is checked. When the valid flag (V) 2132 has a value 0, a NOT gate 229 asserts the page fault 118. Here, the TLB hit 116 supplied from the TLB check device 103 and the page fault 118 asserted by the NOT gate 229 are supplied to an OR gate 228 which asserts its output for activating an address translation abort unit 227, when any one of the TLB hit 116, the page fault 118, and the protection fault 121 is asserted, such that the address translation operation in this first (second) stage address translation unit 21 (22) is aborted.

Also, 43 bits of the input 211 is compared with each one of three ACL entries 214, 215, and 216 at comparison units 217, 218, and 219 similar to the comparison units 34, 35, and 36 used in the TLB check device 103, respectively.

When any one of the comparison units 217, 218, and 219 indicates the permission of the access, an OR gate 220A asserts its output, and the pointer 2131 to next stage address table is enabled such that a gate 230 outputs the address table start address 26 (27) of the second (third) stage address table.

When any one of the comparison units 217, 218, and 219 indicates the rejection of the access due to the memory access mode permission, the OR gate 220A negates its output while an OR gate asserts its output, such that an AND gate 221 asserts its output and an OR gate 223 asserts the protection fault 122 to be supplied to the OR gate 29.

When all of the comparison units 217, 218, and 219 fail to find the ACL entry having the thread number and the LPC upper 20 bits value matching with the input 211, the OR gate 220B negates its output, and the more flag (M) 2133 is checked. When the more flag (M) 2133 has a value 0, it implies that there is no other ACL entries, so that an AND gate 222 asserts its output such that the OR gate 223 asserts the protection fault 122 to be supplied to the OR gate 29.

On the other hand, when the more flag (M) 2133 has a value 1, it implies that there are other ACL entries available, so that an AND gate 224 asserts its output to activate an ACL switching unit 225. In response, the ACL switching unit 225 switches the address table entry 213 to the next address table entry 226 specified by the pointer 2135 to next ACL. Then, 43 bits of the input 211 is compared with each one of additional three ACL entries at the comparison units 217, 218, and 219 again. Here, the next address table entry 226 contains additional three ACL entries; a pointer 2261 to next ACL indicating the address of a next ACL for the page represented by this address table entry 226 containing further additional ACL entries, in a case the total number of entries of the ACL for the page represented by this address table entry 226 exceeds six; and a more bit (M) 2262 indicating whether the next ACL for the page represented by this address table entry 226 containing further additional ACL entries exist or not.

FIGS. 28A-B shows a further detail configuration of the third stage address translation unit 23 in the address translation device of FIG. 26.

In this configuration of FIGS. 28A-B, the third stage address translation unit 23 is supplied with the 43 bits of the input 211, the TLB hit 116, the last 6 bits 1113 of the logical page number 111, and the address table start address 27 obtained by the second stage address translation unit 22. The last 6 bits 1113 and the address table start address 27 are combined together by an address concatenation unit 232 to obtain an address table access address which specify the particular address table entry 233 corresponding to the last 6 bits of the logical page number 111.

Each address table entry 223 contains: a physical page number 2331 corresponding to the logical page number 111; five flags (V, D, R, M, and E) 2332 to 2336 similar to the flags (V, D, R, M, and E) used in the TLB 31; the ACL having a plurality (three in FIG. 28) of entries for the page represented by this address table entry 233, which is similar to the ACL used in the TLB 31; and a pointer 2337 to next ACL indicating the address of a next ACL for the page represented by this address table entry 233 in a case the total number of entries of the ACL for the page represented by this address table entry 233 exceeds three.

Here, the flag (V) 2332 is a valid flag indicating whether this address table entry 233 is valid or not. The flag (D) 2333 is a dirty flag indicating whether the page represented by this address table entry 233 has been changed or not. The flag (R) 2334 is a referenced flag indicating whether the page represented by this address table entry 233 has been accessed. The flag (M) 2335 is a more flag indicating whether the additional ACL entries for the page represented by this address table entry 233 other than the three ACL entries enlisted in this address table entry 233 exist or not. The flag (E) 2336 is an enable flag indicating whether the ACL for the page represented by this address table entry 233 is to be checked or not.

When the appropriate address table entry 233 is accessed, the valid flag (V) 2332 is checked. When the valid flag (V) 2332 has a value 0, a NOT gate 249 asserts the page fault 118. Here, the TLB hit 116 supplied from the TLB check device 103 and the page fault 118 asserted by the NOT gate 249 are supplied to an OR gate 248 which asserts its output for activating an address translation abort unit 247, when any one of the TLB hit 116, the page fault 118, and the protection fault 121 is asserted, such that the address translation operation in this third stage address translation unit 23 is aborted.

Also, 43 bits of the input 211 is compared with each one of three ACL entries 234, 235, and 236 at comparison units 237, 238, and 239 similar to the comparison units 34, 35, and 36 used in the TLB check device 103, respectively.

When any one of the comparison units 237, 238, and 239 indicates the permission of the access, an OR gate 240A asserts its output, and 192 bits of the page table entry (PTE) 24 combining the physical page number 2331, the five flags (V, D, R, M, and E) 2332 to 2336, and the three ACL entries 234 to 236 is outputted to the TLB check device 103 from a gate 250.

When any one of the comparison units 237, 238, and 239 indicates the rejection of the access due to the memory access mode permission, the OR gate 240A negates its output while an OR gate 240B asserts its output, such that an AND gate 241 asserts its output and an OR gate 243 asserts the protection fault 122 to be supplied to the OR gate 29.

When all of the comparison units 237, 238, and 239 fail to find the ACL entry having the thread number and the LPC upper 20 bits value matching with the input 211, the OR gate 240B negates its output, and the more flag (M) 2335 is checked. When the more flag (M) 2335 has a value 0, it implies that there is no other ACL entries, so that an AND gate 242 asserts its output such that the OR gate 243 asserts the protection fault 122 to be supplied to the OR gate 29.

On the other hand, when the more flag (M) 2335 has a value 1, it implies that there are other ACL entries available, so that an AND gate 244 asserts its output to activate an ACL switching unit 245. In response, the ACL switching unit 245 switches the address table entry 233 to the next address table entry 246 specified by the pointer 2337 to next ACL. Then, 43 bits of the input 211 is compared with each one of additional three ACL entries at the comparison units 237, 238, and 239 again. Here, the next address table entry 246 contains additional three ACL entries; a pointer 2461 to next ACL indicating the address of a next ACL for the page represented by this address table entry 246 containing further additional ACL entries, in a case the total number of entries of the ACL for the page represented by this address table entry 246 exceeds six; and a more bit (M) 2462 indicating whether the next ACL for the page represented by this address table entry 246 containing further additional ACL entries exist or not.

Figure 29B:
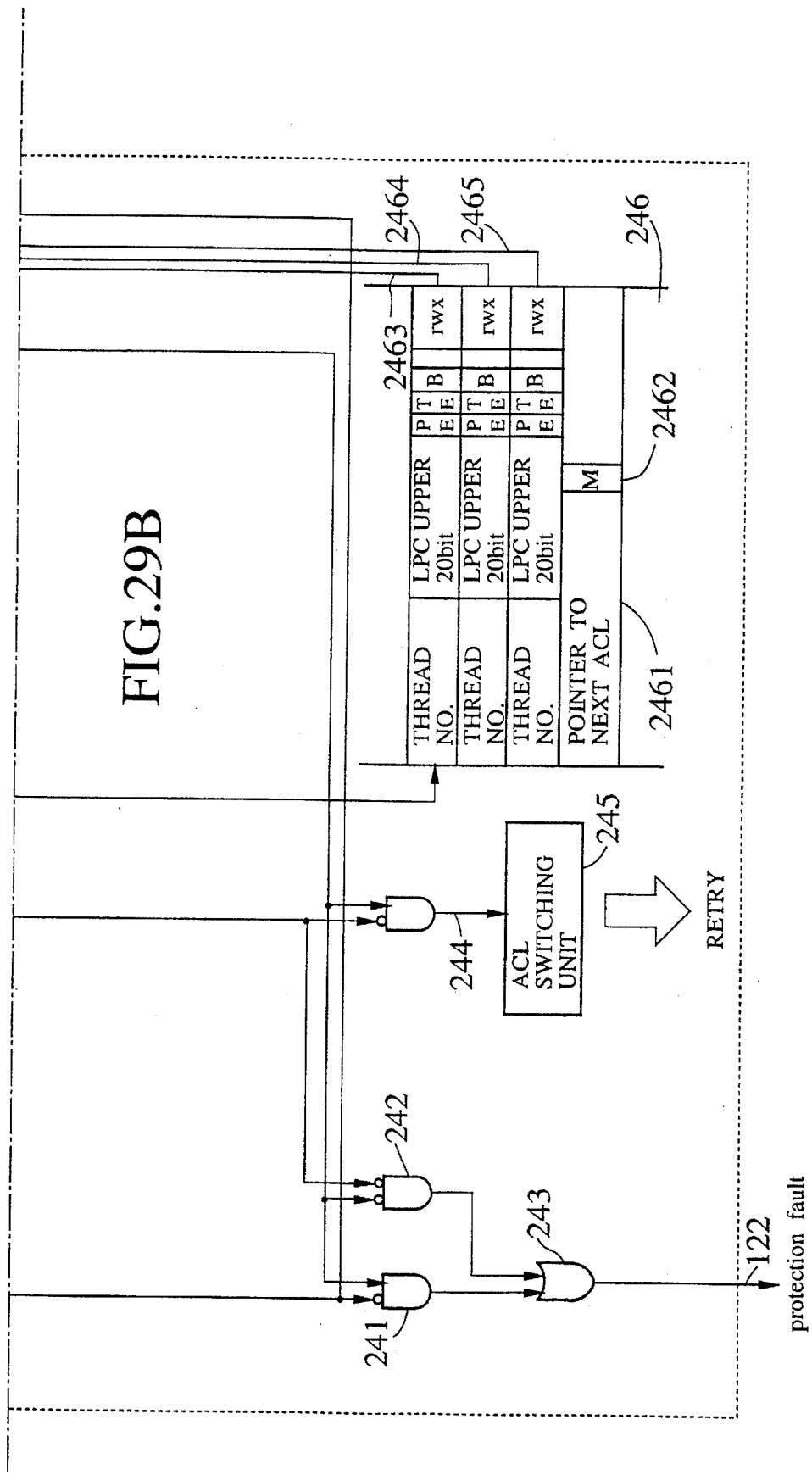

FIGS. 29A–B shows this third stage address translation unit 23 in a case one of the comparison units 237, 238, and 239 indicates the permission of the access for one of the ACL entries on the address table entry 246, after the ACL switching unit 245 switches the address table entry 233 to the next address table entry 246 specified by the pointer 2337 to next ACL. In this case, 192 bits (48 bits required for each entry×4 entries) of the page table entry (PTE) 24 combining the physical page number 2331, the five flags (V, D, R, M, and E) 2332 to 2336, and the three further additional ACL entries 2463 to 2465 of the next address table entry 246 is outputted to the TLB check device 103 from the gate 250.

It is to be noted that the LPC upper 20 bits used in the embodiment described above is an example of a region number specifying a region in a virtual memory space which will be described in further detail below.

It is also to be noted that the number of the ACL entries to be used in this memory management unit of FIG. 23 is not necessarily limited to three used in the above description, and any desired number of the ACL entries may be used.

It is also to be noted that the thread number 318 used in the embodiment described above can be generalized to a general concept of a program number which may identify a program, a process, a context, or a task, instead of the thread.

Figure 30:
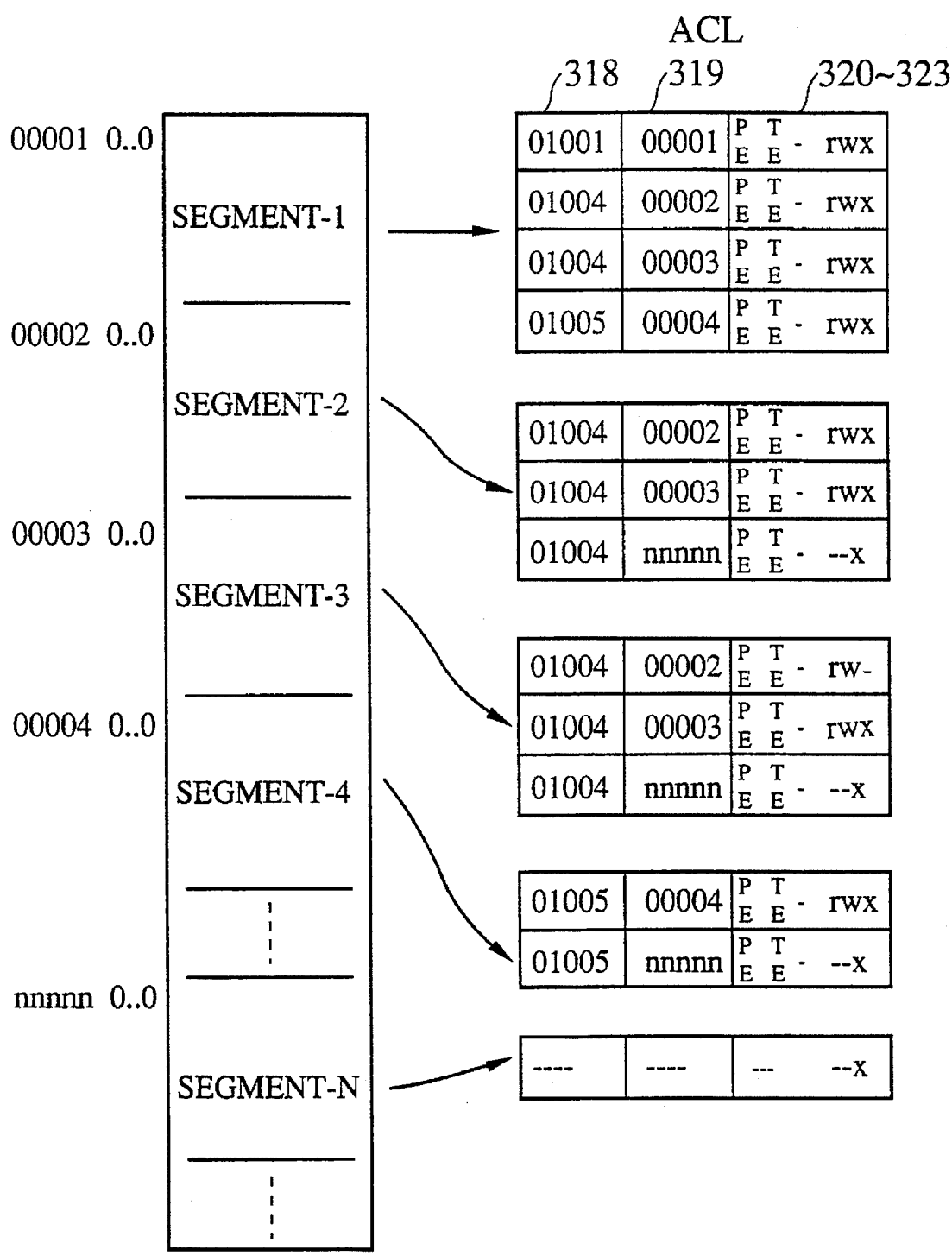
FIG. 30 is a diagrammatic illustration of an example of assignment of access control list (ACL) entries used in the memory management unit of FIG. 23, for realizing the semi-ordered hierarchical relationships shown in FIG. 10.

An exemplary assignment of the ACL entries to be used in this memory management unit of FIG. 23 is shown in FIG. 30, which realizes the similar semi-ordered hierarchical relationships among the segments as those shown in FIG. 10 in the previous embodiment. For example, the direct branching to the segment-3 is permitted only from the same segment-3 and the segment-N which function as the gate page of the previous embodiment, such that the improper execution of the instruction stored in the segment-3 by making accesses from the segments other than the segment-3 and the segment-N can be prevented. In this assignment of FIG. 30, the access from the segment-2 to the segment-3 is limited for the data read and write access, and the instruction execution is not permitted, as indicated by the first ACL entry for the segment-3 which has the permissions for the read and write only.

Here, the program number 318 can be given in terms of the program identifiers as in the conventional memory management unit.

In addition, the program number 318 can also be given in terms of the process identifiers. In this case, by setting the flag (TE) 321 off to prohibit the control related to the address information such as LPC upper 20 bits value used in the above description, this memory management unit can provide the equivalent protection as the conventional memory management unit, so that this memory management unit is compatible with the conventional memory management unit.

Moreover, in a case of the parallel programing system, the program number 318 can be given in terms of thread identifiers, as in the embodiment described above. In this case, the memory space for the process can be separated completely from the execution thread, so that it becomes possible to realize a flexible control related to the memory protection in which only the selected thread can carry out the execution with respect to the shared memory space.

Figure 31:
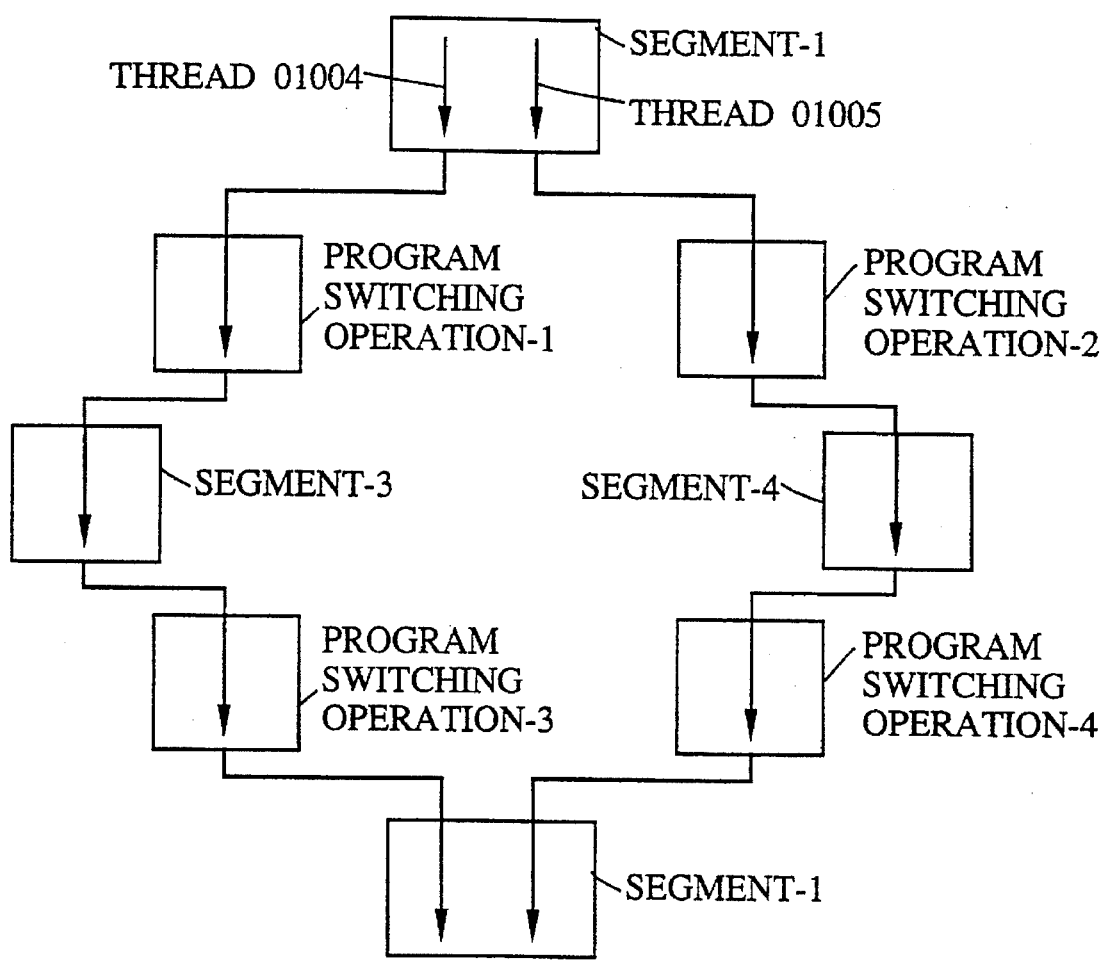
FIG. 31 is a diagrammatic illustration of an exemplary trace of the threads in the memory management unit of FIG. 23 in a case of using the identical program number for the threads for the same program.

In this regard, when the threads which use the same program are assigned with the identical program number in order to omit the program switching at a time of the thread switching, as in the conventional memory management unit, it is impossible to protect the data among the threads, so that it becomes necessary to treat the data requiring the protection by a separate process. In such a case, as shown in FIG. 31, in order for the threads 01004 and 01005 in the same segment-1 to make accesses to different data in different segment-3 and segment-4, respectively, which are treated by different processes, it is necessary to provide four program switching operations. Such a program switching operation can be quite time consuming as it includes the execution environment switching operation such as the retrieval of the stacks used by the programs, the space switching operation to change the variables specified by the currently executed programs, and the scheduling operation to select the next program to be executed.

Figure 32:
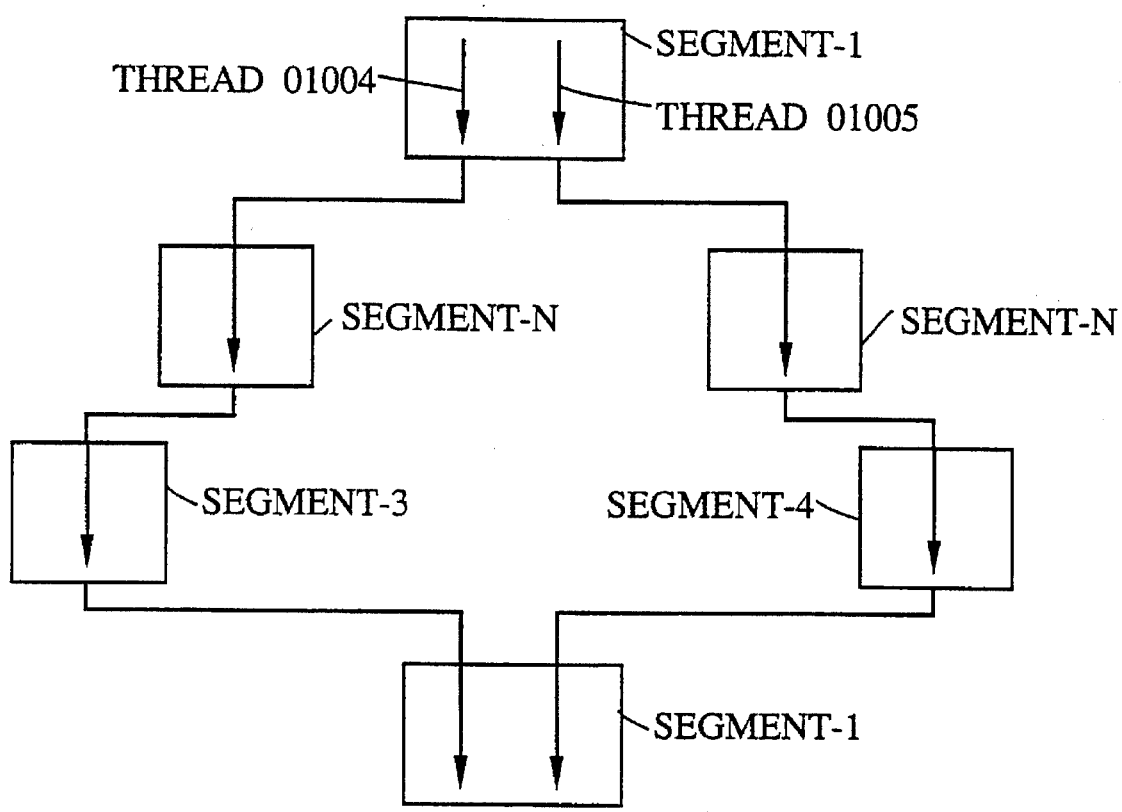
FIG. 32 is a diagrammatic illustration of an exemplary trace of the threads in the memory management unit of FIG. 23 in a case of using the thread identifiers as the program numbers for the threads for the same program.

In contrast, when the thread identifiers are assigned as shown in FIG. 30, it becomes unnecessary to make the program switching when the access space is switched, because the access permission is limited according to the address information (LPC upper 20 bits value) of the instruction to be accessed in addition to the condition of the coincidence of the thread identifiers. Consequently, as shown in FIG. 32, the access from the segment-1 to the segment-3 or the segment-4 can be made by the branching through the segment-N from which the branching is limited only to the prescribed entrance address, without making any program switching operation. Thus, by prohibiting the direct branching from the segment-1 to the segment-3 and the segment-4 and the rewriting of the segment-N by the segment-1, it becomes possible to prohibit the improper access from the segment-1 to the segment-3 and the segment-4. Here, the branching through the segment-N requires only the execution of the usual branch instructions, which is considerably less time consuming.

Also, the program switching associated with the switching of the address space is controlled by using the ACL, so that the space switching operation can be omitted from the program switching operation, so that the program switching operation itself can be made less time consuming.

Figure 33:
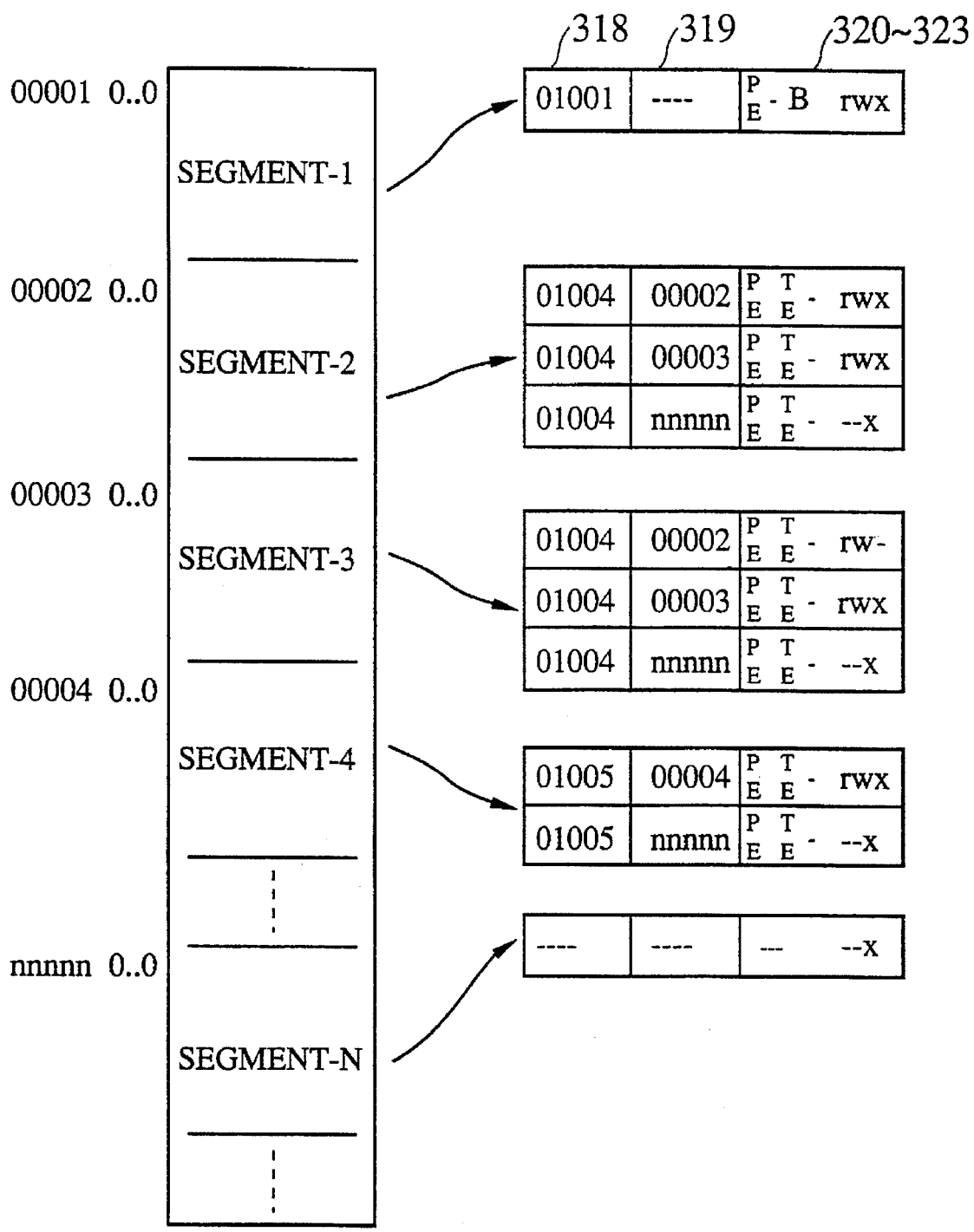
FIG. 33 is a diagrammatic illustration of another example of assignment of access control list (ACL) entries used in the memory management unit of FIG. 23, for a case of realizing the control according to the size relationships among the program numbers.

FIG. 33 shows another exemplary assignment of the ACL entries to be used in this memory management unit of FIG. 23, which is suitable for a case of using the control according to the size relationships among the program numbers. In this assignment of FIG. 33, in the ACL for the segment-1, the flag (B) is set to be on such that the access permission to this segment-1 can be given to only those program numbers which is greater than or equal to the program number listed in this ACL for the segment-1. Consequently, the size of the ACL for the segment-1 can be made smaller in this assignment of FIG. 33, compared with the assignment of FIG. 80 described above. In a similar manner, by incorporating the control according to the size relationships among the program numbers, it becomes possible to realize the protection similar to the conventional ring protection. In other words, this memory management unit is also compatible with the conventional ring protection type memory management unit.

Thus, in this memory management unit, the memory access control can be made according to the coincidence of the program numbers or the size relationships among the program numbers, so that the flexible memory access control can be realized.

Figure 34:
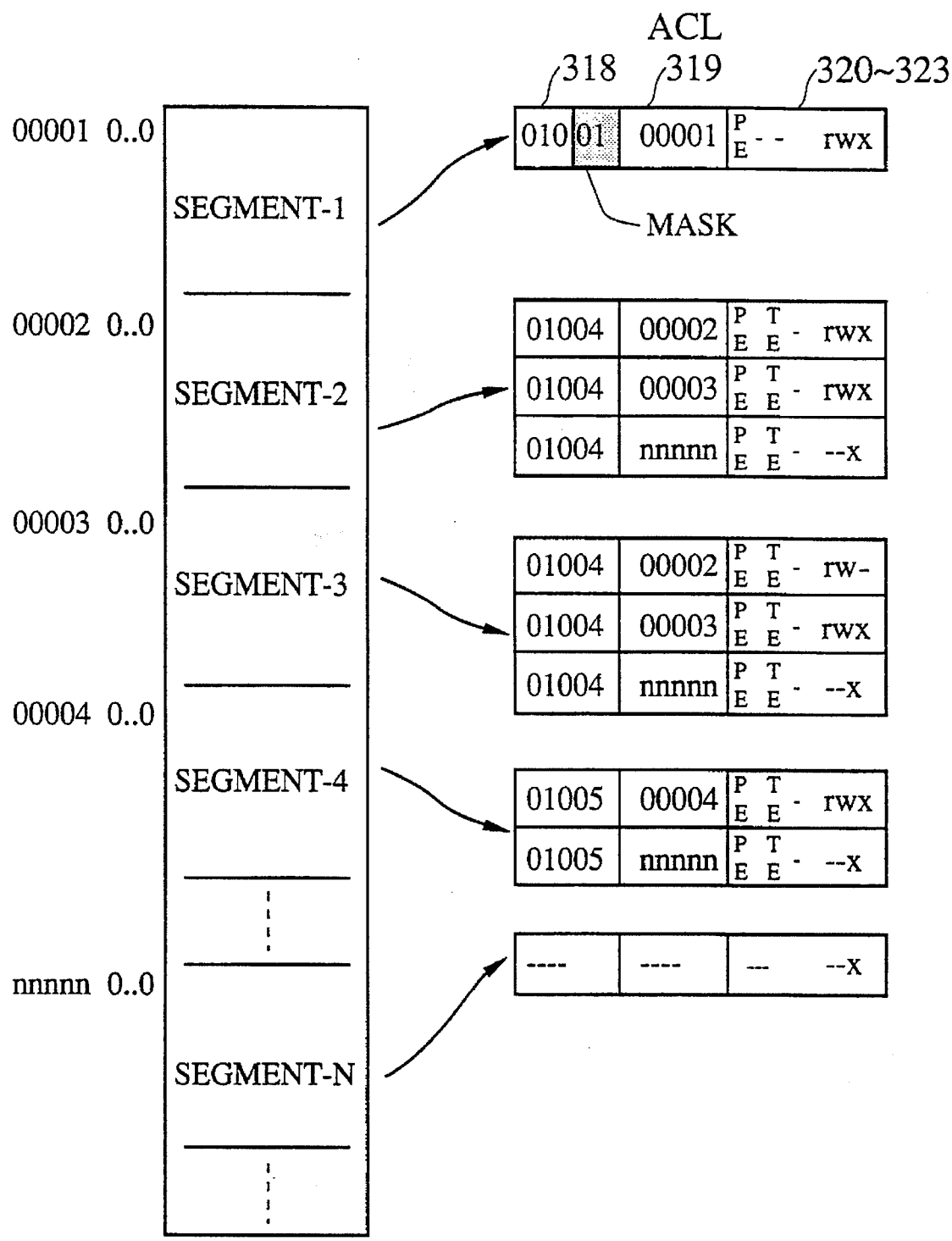
FIG. 34 is a diagrammatic illustration of another example of assignment of access control list (ACL) entries used in the memory management unit of FIG. 23, for a case of realizing a not excessively tight control using a masking of a part of a program number.

FIG. 34 shows another exemplary assignment of the ACL entries to be used in this memory management unit of FIG. 23, which utilizes the masking of a portion of the ACL in order to realize a not excessively tight memory access control. For example, as shown in FIG. 34, the lower 2 bits of the program number can be masked such that the access permission can be given when only the upper 3 bits of the program number which are not masked is matched. In this case, by setting the upper 3 bits of the program number is to be identical for all the programs which makes accesses to this segment-1, the size of the ACL for the segment-1 can be made smaller in this assignment of FIG. 34, compared with the assignment of FIG. 30 described above. Thus, in this assignment of FIG. 34 using the masking, it becomes possible to provide the common access right to a group of the programs which make accessed to the same segment.

It is to be noted that the similar change of the memory access control level can also be achieved by using the modification of the address information such as the LPC upper 20 bits value instead of the program number as described above.

Namely, it is also possible to realize more flexible memory access control can also be realized by modifying the configuration of the TLB check device 103 shown in FIGS. 24A–B into a modified configuration as shown in FIGS. 35A–B. Namely, in this modified configuration of FIGS. 35A–B, each entry of the TLB 31 in the TLB check device 103 further incorporates a mask bit 325 provided in correspondence to each of the thread numbers 318, which specifies a portion of the LPC upper 20 bits value 112 to be masked in the 43 bits output 331 supplied to the comparison units 34, 35, and 36, while the comparison units 34, 35, and 36 are equipped with mask units 43 for masking the portion of the LPC upper 20 bits value 112 in the supplied 43 bits output 331 according to the mask bit 325, such that the comparison of the partially masked 43 bits output 331 and the ACL entries can be carried out at the comparison units 34, 35, and 36. Here, the mask bit 325 can have as many bits as the number of bits of the LPC upper bits value 319 which is 20 in this case.

With this modification of FIGS. 35A–B, the actually utilized address information specifies an address region rather than an individual address specified by the LPC upper 20 bits value, so that more flexible memory access control can be realized. For example, the actually utilized address information can specify a group of the addresses collectively, such that the memory access control in units of groups of addresses can be realized.

It should be obvious here that the masking feature similar to that shown in FIGS. 35A–B can also be applied with respect to the thread number 115 in the 43 bits output 331 in order to realize a not excessively tight memory access control similar to that realized by the assignment shown in FIG. 34, such as the memory access control in units of groups of addresses.

Figure 36A:
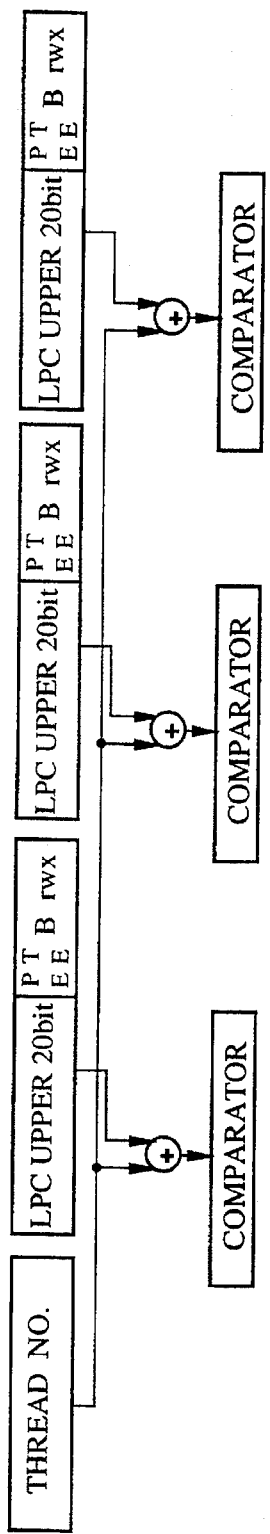
FIGS. 36A, 36B, and 36C are diagrammatic illustrations of three modified configurations for each access control list (ACL) entry that can be used in the memory management unit of FIG. 23.
Figure 36B:
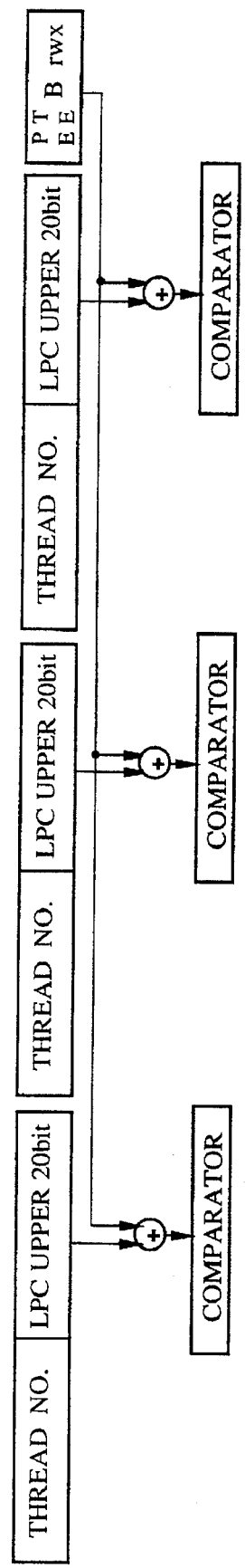
Figure 36C:
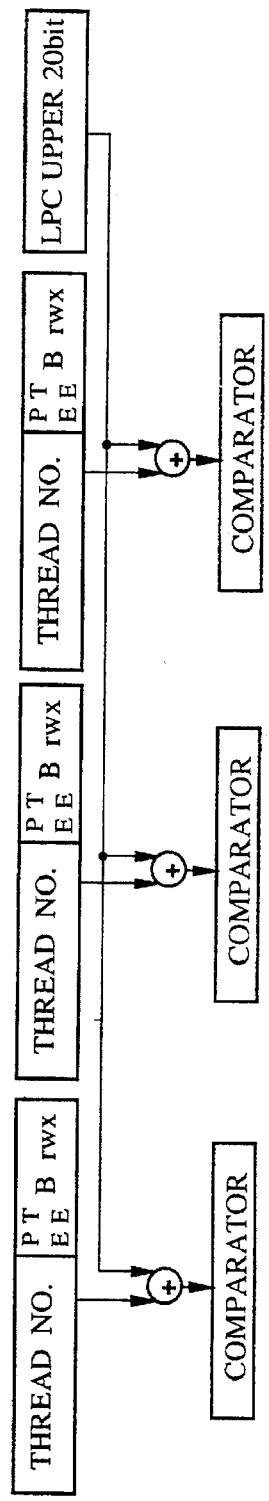

It is also to be noted that the ACL entry formed by one program number (thread number), one address information (LPC upper 20 bit), and one permission set used in the memory management unit of FIG. 23 described above may be modified as follows. Namely, as shown in FIG. 36A, each ACL entry may be formed by one program number associated with a plurality of address information and permission set combinations. Also, as shown in FIG. 36B, each ACL entry may be formed by a plurality of program number and address information combinations associated with one permission set. Also, as shown in FIG. 36C, each ACL entry may be formed by a plurality of program number and permission set combinations associated with one address information.

It is also to be noted that the memory management unit of FIG. 23 described above may be modified for a case in which the protection is provided in units different from the regions representing physical pages in each segment used in the above description. Such a protection units may be larger than a physical page, and may be even in irregular sizes.

It is also to be noted that the memory management unit of FIG. 23 described above may be modified such that the ACL entry in the ACL of the TLB entry or the address table entry can contain information other than those used in the description above.

It is also to be noted that the comparators 341 and 342 used in each of the comparison units 34, 35, and 36 in the embodiment described above may be replaced by other logical calculation circuits such as AND circuits. In this case, the higher address can be assigned to the system program while the lower address can be assigned to the application programs, and each of the AND circuits can be made to assert its output only for the higher address specified by the LPC upper 20 bits value 112, such that only the access from the system program is permitted while the access from any of the application programs is rejected.

It is also to be noted that the checking of the ACL may be carried out only at the third stage address translation unit 23 in the address translation device 102, instead of carrying out the checking of the ACL at each of the first, second, and third stage address translation units 21, 22, and 23 as described above.

Referring now to FIG. 37, additional embodiment of a memory management unit according to the present invention will be described in detail. This embodiment can be effectively regarded as a modification of the embodiment of FIG. 23 described above, which is characterized by providing an independent access right to each thread.

In FIG. 37, a page table 255 is formed similarly to the TLB used in the embodiment of FIG. 23, except that the permissions for various access types are provided for each thread number of the ACL in each page table entry of this page table 255 as the access right and the LPC upper 20 bits values are omitted.

FIG. 37 shows an exemplary case in which a logical address space 260 contains a plurality of threads 251 and 252, and the thread 251 having a thread number 1 executes an instruction 253 for making an access to a certain address in a memory device, where the instruction 253 requires to load the data at a hexadecimal address "0X1234". Here, this address is specified in the C language so that "0X" is attached to indicate the hexadecimal notation.

In this case, the page table entry corresponding to a logical page on which the address to be accessed exists is selected from the page table 255.

Then, a page fault detection unit 258 checks whether this logical page is valid, and whether the corresponding physical page is allocated to this logical page, according to the indication given by the flags in the flag area. When this logical page is invalid, or when the corresponding physical page is not allocated to this logical page, the page fault detection unit 258 outputs the page fault signal to interrupt the operation.

In a case the page fault signal is not outputted by the page fault detection unit 258, a thread number detection unit 256 detects the thread number of this currently executed thread 251, and the ACL entry having the same thread number as this thread number of the currently executed thread 251 is selected from the selected page table entry by using the comparison units (not shown) similar to those used in the embodiment of FIG. 23. Here, by using as many comparison units as a number of the thread numbers registered in the ACL of this page table entry in parallel, the time required for this comparison operation can be reduced.

When the registered thread number identical to the thread number of the currently executed thread cannot be found by this comparison operation, a physical address/protection fault output unit 257 outputs the protection fault signal to interrupt the operation.

When the registered thread number identical to the thread number of the currently executed thread is found by this comparison operation, the permissions for various access types associated with this thread number in the ACL are entered into an access type detection unit 254, at which the access type of the instruction 253 to be executed is compared with these permissions by using a plurality of comparison units (not shown) similar to those used in the embodiment of FIG. 23, in order to determine whether the access type of the instruction 253 to be executed is a permitted one or not. Here, again, by using as many comparison units as a number of the permissions registered in the ACL of this page table entry in parallel, the time required for this comparison operation can be reduced. In addition, this comparison operation for the permissions can be carried out in parallel to the comparison operation for the thread numbers, to further reduce the operation time.

The result of this comparison at the access type detection unit 254 is then entered into the physical address/protection fault output unit 257. In a case the access type of the instruction 253 to be executed is a permitted one, the physical address/protection fault output unit 257 obtains the physical address 259 to be accessed by combining the physical page number registered in this page table entry and an appropriate offset for the address to be accessed within this page and outputs the obtained physical address 259. On the other hand, when the access type of the instruction 253 to be executed is not a permitted one, the physical address/ protection fault output unit 257 outputs the protection fault signal.

According to the content of the page table entry shown in FIG. 37, the thread 1 is permitted to read or write the data in the page having the logical page number 1, but not permitted to execute these data, whereas the thread 2 is permitted to execute these data but not permitted to read or write these data.

Thus, in this embodiment of FIG. 37, it becomes possible to provide an independent access right to each thread within the same logical address space.

It is to be noted here that, in a case of the currently executed thread is to be switched to the other thread in the same logical address space by the scheduling of the operating system (OS), the thread number stored in the thread number memory such as the thread number memory 104 used in the embodiment of FIG. 23 is changed, such that the address translation will be carried out with respect to the new thread thereafter. Here, the page table entries for the addresses in the same logical address space are common to all the threads in this same logical address space, so that the paging by the OS can be accomplished by rewriting only the registered physical page number and the flag in the flag area indicating the existence of the physical page corresponding to the logical page.

Figure 38:
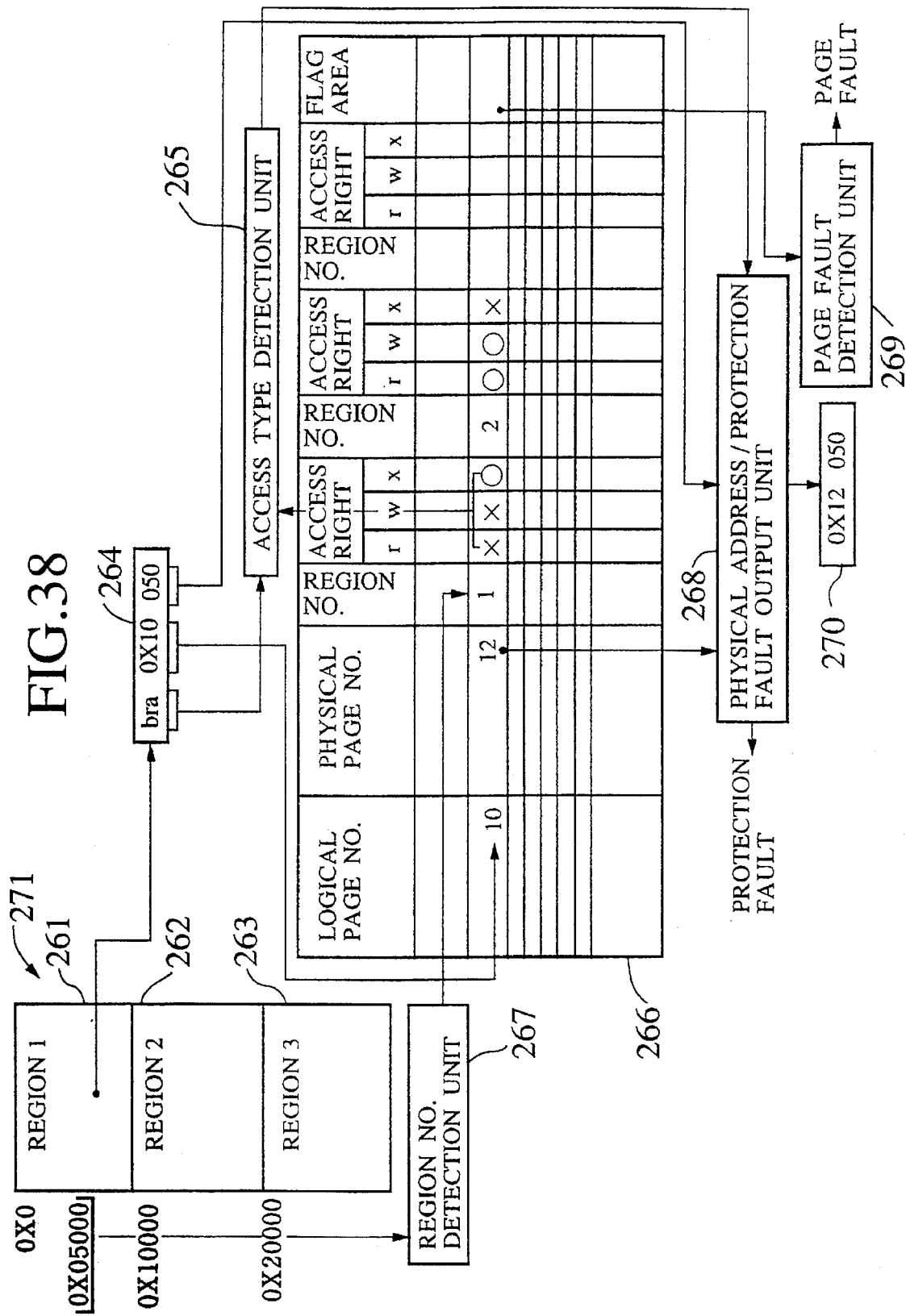
FIG. 38 is a block diagram of further additional embodiment of a memory management unit according to the present invention.

Referring now to FIG. 38, further additional embodiment of a memory management unit according to the present invention will be described in detail. This embodiment can also be effectively regarded as a modification of the embodiment of FIG. 23 described above, which is characterized by providing an independent access right to each region in the logical address space.

In FIG. 38, a page table 266 is formed similarly to the TLB used in the embodiment of FIG. 23, except that the region numbers for identifying different regions in a logical address space 260 are registered instead of the thread numbers, the permissions for various access types are provided for each region number of the ACL in each page table entry of this page table 255 as the access right, and the LPC upper 20 bits values are omitted. Here, in practice, the region number can be given by the upper bits of the LPC which indicates the address at which the currently executed instruction is present.

FIG. 38 shows an exemplary case in which a logical address space 271 is divided into a plurality of regions 261, 262, and 263, and a program in the region 261 having a region number 1 executes an instruction 264 for making an access to a certain address in a memory device.

In this case, the page table entry corresponding to a logical page on which the address to be accessed exists is selected from the page table 266.

Then, a page fault detection unit 269 checks whether this logical page is valid, and whether the corresponding physical page is allocated to this logical page, according to the indication given by the flags in the flag area. When this logical page is invalid, or when the corresponding physical page is not allocated to this logical page, the page fault detection unit 269 outputs the page fault signal to interrupt the operation.

In a case the page fault signal is not outputted by the page fault detection unit 269, a region number detection unit 267 detects the region number of the region at which the currently executed program is present, and the ACL entry having the same region number as this region number of the region at which the currently executed program is present is selected from the selected page table entry by using the comparison units (not shown) similar to those used in the embodiment of FIG. 23. Here, by using as many comparison units as a number of the region numbers registered in the ACL of this page table entry in parallel, the time required for this comparison operation can be reduced.

When the registered region number identical to the region number of the region at which the currently executed program is present cannot be found by this comparison operation, a physical address/protection fault output unit 268 outputs the protection fault signal to interrupt the operation.

When the registered region number identical to the region number of the region at which the currently executed program is present is found by this comparison operation, the permissions for various access types associated with this region number in the ACL are entered into an access type detection unit 265, at which the access type of the instruction 264 to be executed is compared with these permissions by using a plurality of comparison units (not shown) similar to those used in the embodiment of FIG. 23, in order to determine whether the access type of the instruction 264 to be executed is a permitted one or not. Here, again, by using as many comparison units as a number of the permissions registered in the ACL of this page table entry in parallel, the time required for this comparison operation can be reduced. In addition, this comparison operation for the permissions can be carried out in parallel to the comparison operation for the region numbers, to further reduce the operation time.

The result of this comparison at the access type detection unit 265 is then entered into the physical address/protection fault output unit 268. In a case the access type of the instruction 264 to be executed is a permitted one, the physical address/protection fault output unit 268 obtains the physical address 270 to be accessed by combining the physical page number registered in this page table entry and an appropriate offset for the address to be accessed within this page and outputs the obtained physical address 270. On the other hand, when the access type of the instruction 264 to be executed is not a permitted one, the physical address/protection fault output unit 268 outputs the protection fault signal.

According to the content of the page table entry shown in FIG. 38, the program in the region 1 is permitted to execute the data in the page having the logical page number 10, but not permitted to read or write these data, whereas the program in the region 2 is permitted to read or write these data but not permitted to execute these data.

Thus, in this embodiment of FIG. 38, it becomes possible to provide an independent access right to each region in the same logical address space.

It is to be noted that the size of the regions in the same logical address space can be specified in any desired units such as bytes, pages, and mega-bytes. Also, the size of the page can be set to any desired size.

Figure 39:
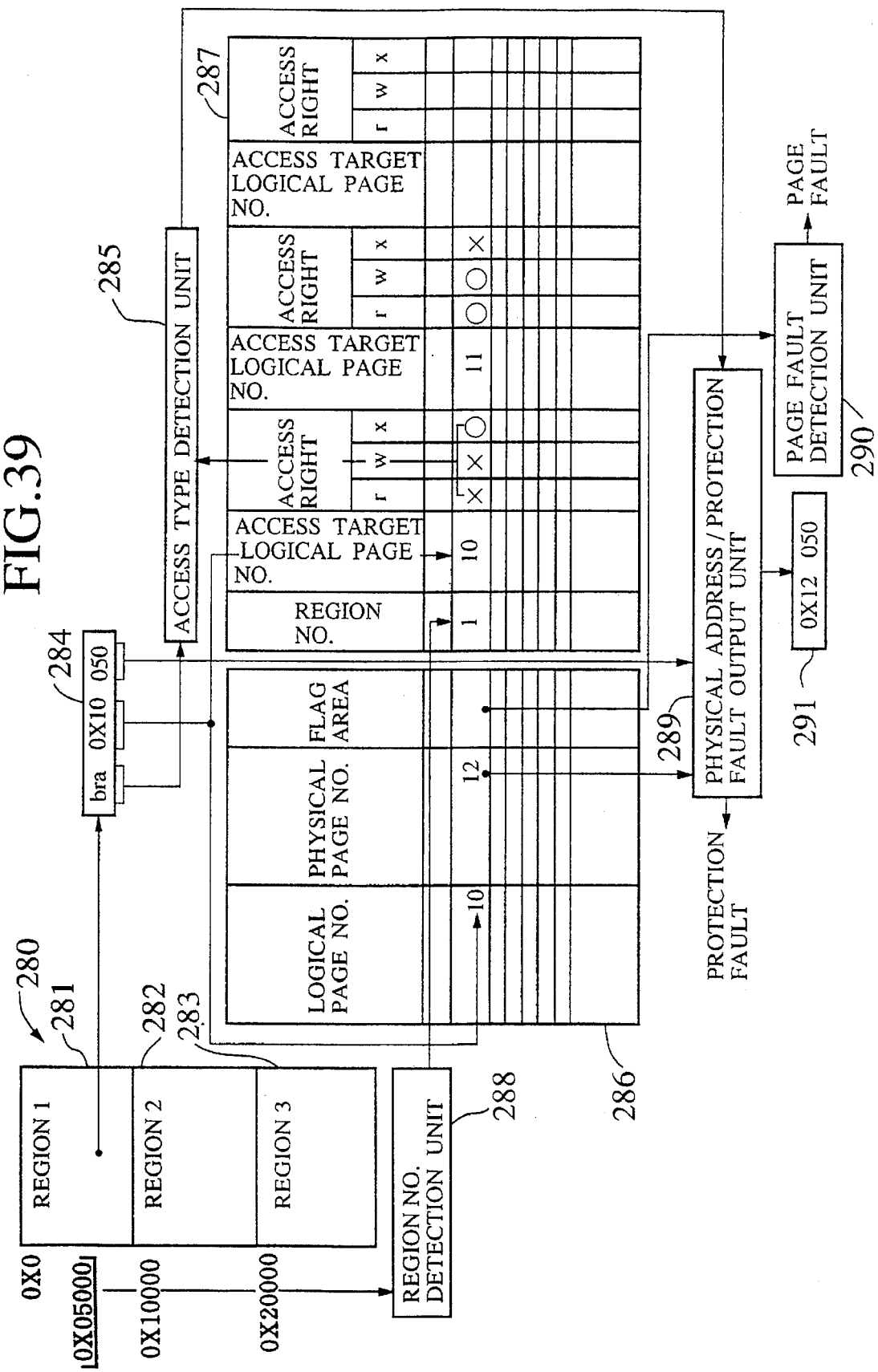
FIG. 39 is a block diagram of further additional embodiment of a memory management unit according to the present invention.

Referring now to FIG. 39, further additional embodiment of a memory management unit according to the present invention will be described in detail. This embodiment can also be effectively regarded as a modification of the embodiment of FIG. 23 described above, which is characterized by providing an independent access right to each logical page to be accessed from the same logical address space, by using the page table and the ACL which are provided separately.

In FIG. 39, a page table 286 is formed from fields for the logical page numbers, physical page numbers, and the flag area, while there is also provided a separate ACL 287 which is formed from fields for the registered region numbers and the corresponding ACL entries indicating the access target logical page numbers and the associated permissions for various access types as the access right.

FIG. 39 shows an exemplary case in which a logical address space 280 is divided into a plurality of regions 281, 282, and 283, and a program in the region 281 having a region number 1 executes an instruction 284 for making an access to a certain address in a memory device. Here, each region has a size which is larger than and independent of the page size. Also, as in the embodiment of FIG. 38 described above, in practice, the region number can be given by the upper bits of the LPC which indicates the address at which the currently executed instruction is present.

In this case, a page fault detection unit 290 checks whether the logical page containing the address to be accessed specified by the instruction 284 to be executed is valid, and whether the corresponding physical page is allocated to this logical page, according to the indication given by the flags in the flag area of the page table 286. When this logical page is invalid, or when the corresponding physical page is not allocated to this logical page, the page fault detection unit 290 outputs the page fault signal to interrupt the operation.

In a case the page fault signal is not outputted by the page fault detection unit 290, a region number detection unit 288 detects the region number of the region at which the currently executed program is present, and the ACL 287 for the same registered region number as this region number of the region at which the currently executed program is present is selected. Then, the ACL entry having the same access target logical page number as the logical page containing the address to be accessed is selected by using the comparison units (not shown) similar to those used in the embodiment of FIG. 23. Here, by using as many comparison units as a number of the access target logical page numbers registered in the ACL 287 in parallel, the time required for this comparison operation can be reduced.

When the registered access target logical page number identical to the logical page number of the logical page containing the address to be accessed cannot be found by this comparison operation, a physical address/protection fault output unit 289 outputs the protection fault signal to interrupt the operation.

When the registered access target logical page number identical to the logical page number of the logical page containing the address to be accessed is found by this comparison operation, the permissions for various access types associated with this access target logical page number in the ACL 287 are entered into an access type detection unit 285, at which the access type of the instruction 284 to be executed is compared with these permissions by using a plurality of comparison units (not shown) similar to those used in the embodiment of FIG. 23, in order to determine whether the access type of the instruction 284 to be executed is a permitted one or not. Here, again, by using as many comparison units as a number of the permissions registered in the ACL 287 in parallel, the time required for this comparison operation can be reduced. In addition, this comparison operation for the permissions can be carried out in parallel to the comparison operation for the access target logical page numbers, to further reduce the operation time.

The result of this comparison at the access type detection unit 285 is then entered into the physical address/protection fault output unit 289. In a case the access type of the instruction 284 to be executed is a permitted one, the physical address/protection fault output unit 289 obtains the physical address 291 to be accessed by combining the physical page number registered in the page table 286 in correspondence to this logical page number and an appropriate offset for the address to be accessed within this page and outputs the obtained physical address 291. On the other hand, when the access type of the instruction 284 to be executed is not a permitted one, the physical address/protection fault output unit 289 outputs the protection fault signal.

According to the content of the ACL entry shown in FIG. 39, the data in the access target logical page having the logical page number 10 are permitted to be executed by the program in the region 1, but not permitted to be read or written by the program in the region 1, whereas these data are permitted to read or written by the program in the region 2, but not permitted to be execute by the program in the region 2.

Thus, in this embodiment of FIG. 39, it becomes possible to provide an independent access right to each logical page to be accessed from the same logical address space.

In addition, in this embodiment of FIG. 39, the page table 286 and the ACL 287 are provided separately in order to reduce the memory capacity required for the page table 286 and the ACL 287. Namely, with this configuration, when each region contains a plurality of pages, there is no need to provide as many ACL 287 as the number of pages, because the ACL 287 is provided for each region. It is to be noted that the size of the regions in the same logical address space can be specified in any desired units such as bytes, pages, and mega-bytes. Also, the size of the page can be set to any desired size.

Figure 40:
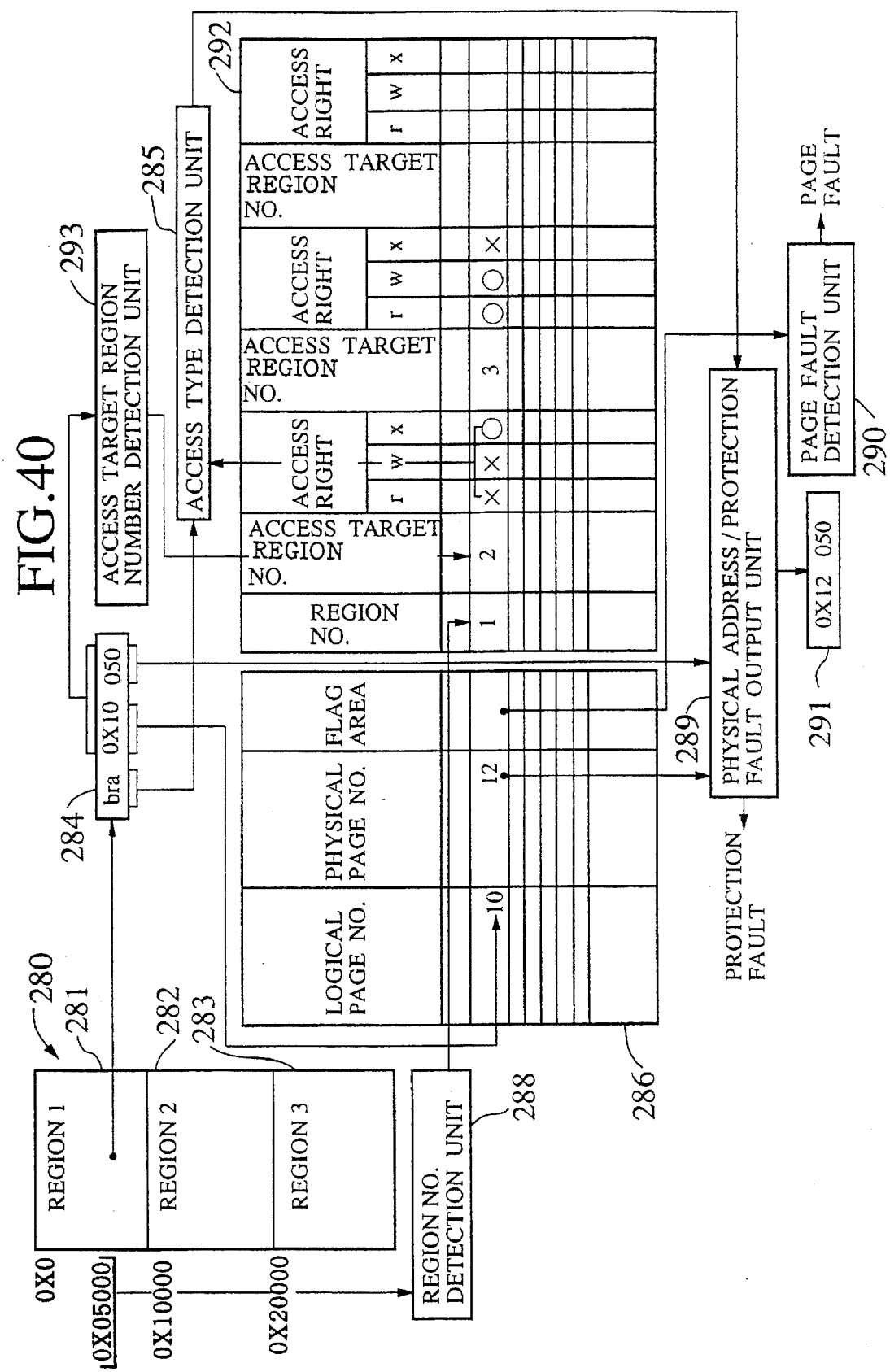
FIG. 40 is a block diagram of a modified configuration for the memory management unit of FIG. 39.

It is also to be noted that the ACL 287 shown in FIG. 39 may be modified to the ACL 292 shown in FIG. 40, which is formed from fields for the registered region numbers and the corresponding ACL entries indicating the access target region numbers and the associated permissions as the access right.

In this case, an access target region number detection unit 293 for detecting the region number of the region to be accessed from the instruction 284 to be executed may be also provided such that the access target region number corresponding to the region number of the region to be accessed can be selected from the ACL 292 according to the region number detected by this access target region number detection unit 293.

With this modified ACL 292 of FIG. 40, it becomes possible to eliminate the redundant ACL entries required to be provided for each page in the ACL 287 of FIG. 39 in a case each region contains a plurality of pages, so that it becomes possible to realize a more efficient memory access control.

In addition, the size of each region can be set to be different from one region to another, so that it becomes possible to realize a more flexible memory access control.

Thus, in the memory management unit of the various embodiments described in conjunction with FIG. 23 to FIG. 40, a plurality of program numbers for making access to the same address can be stored collectively in a signal address table entry in a form of the ACL, so that it becomes possible to prevent a plurality of program numbers for making accesses to the same address from occupying a large part of the address table entries. Consequently, it also becomes possible to prevent the memory management unit from storing a large number of identical logical and physical addresses pairs. As a result, the address table hit rate can be improved as the number of different logical addresses stored in the address table can be increased.

Also, in this memory management unit, the program number supplied from the data processing unit can be compared with a plurality of program numbers stored in a single address table entry simultaneously in parallel, so that the decrease of the processing speed will not be caused by this memory management unit.

Moreover, in this memory management unit, the fault occurring in the address translation operation can be classified into two categories of the page fault due to the erroneous access address and the protection fault due to the failure to satisfy the access conditions such as a matching of the program numbers, and the area for storing the address and the area for storing the access conditions can be changed separately. Consequently, even when all the program numbers associated with a particular address table entry cannot be stored in a form of the ACL, the program numbers in the ACL can be replaced by the other program numbers without invalidating this address table entry. As a result, the time required for the address table miss recovery operation can be reduced. This is particularly advantageous when a number of programs sharing the same logical address space is greater than a number of program numbers that can be stored in each address table entry.

As a consequence, the overall address translation time can be reduced in this memory management unit, because the basic address translation operation time remains the same, while the address table hit rate is improved and the address table miss recovery operation time is reduced.

Furthermore, in this memory management unit, the ACL can store various memory access permissions along with the program numbers, so that the delicate memory access control can be realized.

It is to be noted that the page table and the ACL used in this memory management unit may be modified such that the memory access conditions can be verified in terms of the program or region permitted to make an access to each logical address or logical page, as well as the logical addresses or logical pages permitted to be accessed from each program or region, whichever turned out to be convenient in each case.

Figure 41:
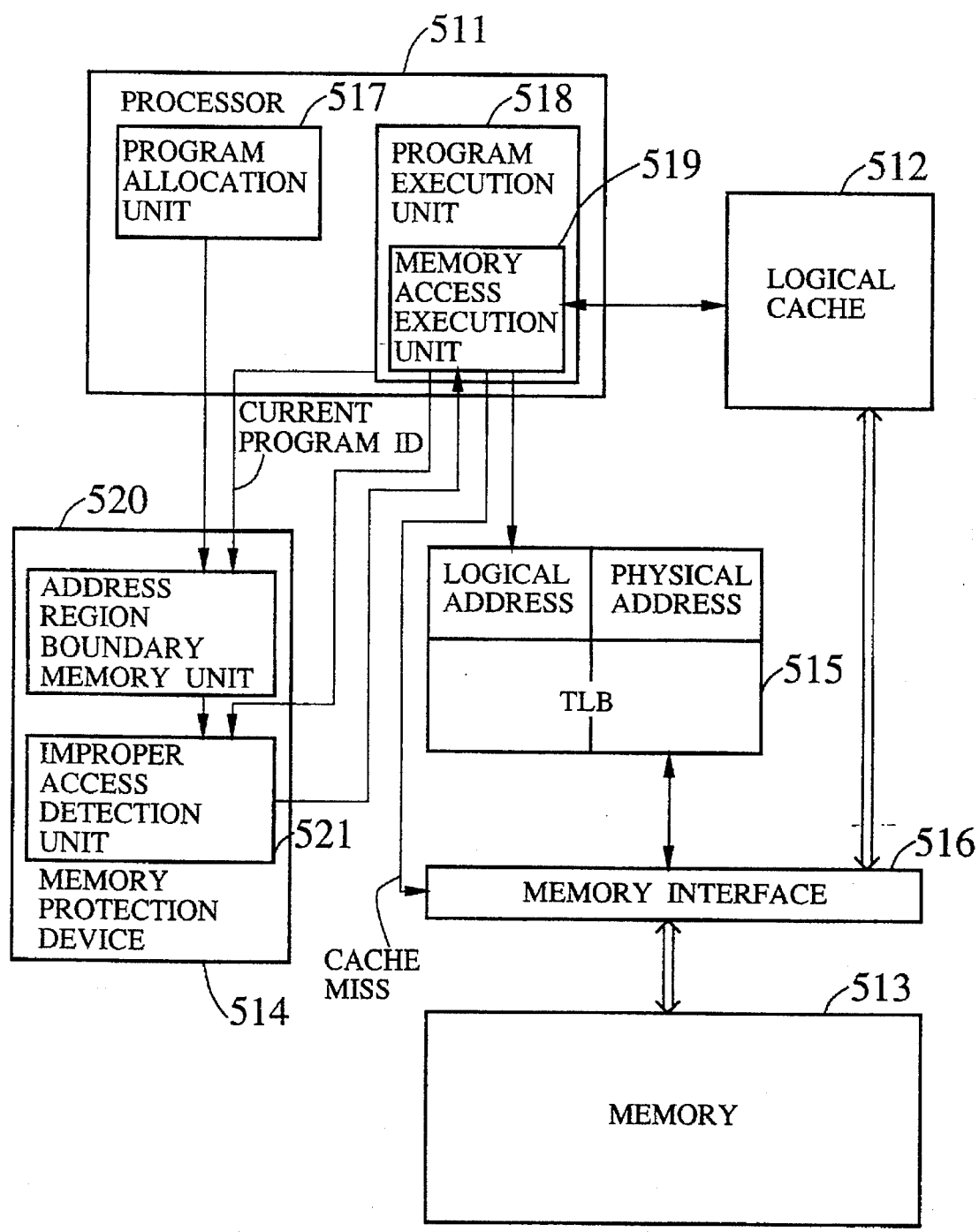
FIG. 41 is a block diagram of another embodiment of a memory management and protection system according to the present invention.

Referring now to FIG. 41, another embodiment of a memory management and protection system according to the present invention will be described in detail.

In this embodiment, the system comprises: a processor 511 having a program allocation unit 517 for determining allocation of the user programs to a logical address space, and a program execution unit 518 for executing the user programs including a memory access execution unit 519 for making memory accesses; a logical cache 512 for caching data to be accessed by the memory access execution unit 519; a memory 513 for storing all the data required by the user programs; a TLB (Translation Look-aside Buffer) for for translating logical address supplied from the memory access execution unit 519 into a corresponding physical address, which has an address table storing logical addresses of the data to be accessed by the memory access execution unit 519 cached in the logical cache 512 in correspondence to physical addresses to make accesses in the memory 513; a memory interface 516 for interfacing the access from the logical cache 512 and the TLB 515 to the memory 513 in a case of a cache miss in the logical cache 512; a memory protection device 514 for protecting the data in the logical cache 512 and the memory 513 from improper accesses, including an address region boundary memory unit 520 for memorizing the allocation of the user programs determined by the program allocation unit 517, and an improper access detection unit 521 for detecting the improper accesses made by the memory access execution unit 519.

Here, it is to be noted that the memory management unit described above can be used in places of the memory protection device 514 and the TLB 515.

Now, in this embodiment, the program allocation unit 517 allocates the user programs to the logical address space as follows.

Namely, in a case of a single virtual space scheme in which the programs are allocated to a single logical address space, the programs are allocated to the logical address space as shown in FIG. 42A, in which OS 401 and a plurality (five in FIG. 42A) of user programs 402 to 406 (user program-1 to user program-5) are mapped into the logical address space 400 without any overlapping address region between adjacently mapped programs.

On the other hand, in a case of a multiple virtual space scheme in which the programs are allocated to a plurality of logical address spaces, the programs are allocated to the logical address spaces as shown in FIG. 42B, in which OS 401 and a plurality (three in FIG. 42B) of user programs 402 to 404 (user program-1 to user program-3) are mapped into a first logical address space 410 without any overlapping address region between adjacently mapped programs, while the same OS 401 and a plurality (two in FIG. 42B) of user programs 405 and 406 (user program-4 and user program-5) are mapped into a second logical address space 420 without any overlapping address region between adjacently mapped programs, where the OS 401 is mapped to the same address region in the first and second logical address spaces 410 and 420, while the user programs 405 and 406 are mapped to the address regions in the second logical address space 420 which are not mapped by the user programs 402 to 404 in the first logical address space 410.

In other words, in this embodiment, the user programs are mapped into the logical address space without any overlapping address region between adjacently mapped programs, regardless of whether all the user programs are mapped into a single logical address space or not.

More specifically, such an allocation of the programs without any overlapping address region between adjacently mapped programs can be achieved by the program allocation unit 517 as follows. Here, for the sake of explanation, the size of each user program is assumed to be fixed to 32 Mbytes.

Figures 43, 44:
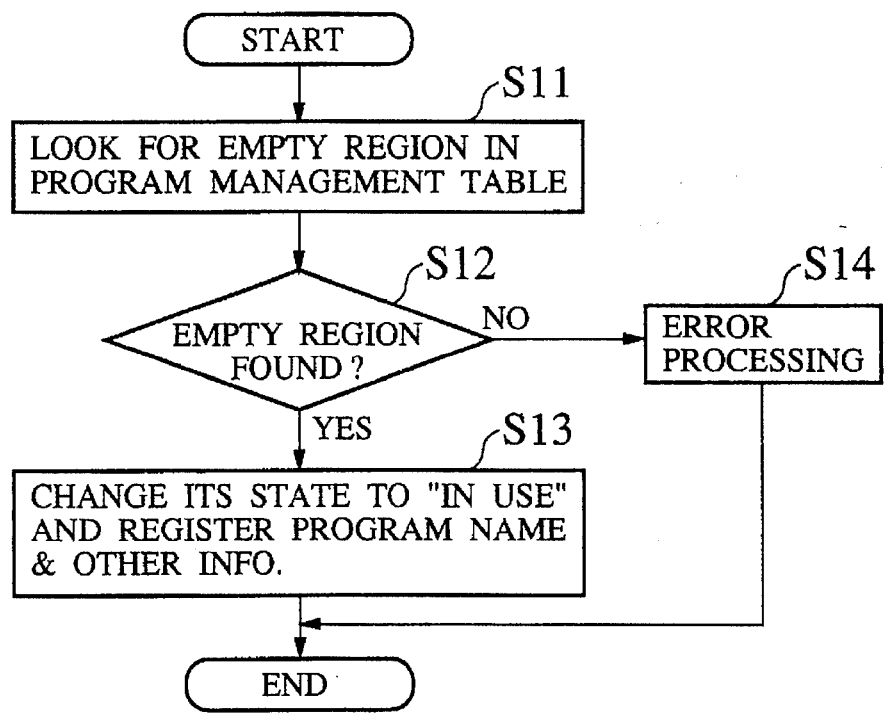
FIG. 43 is an illustration of an exemplary configuration of a program management table to be used by a program allocation unit in the memory management and protection system of FIG. 41 for a case of a single virtual space scheme.
FIG. 44 is a flow chart for the operation of the program management unit in the memory management and protection system of FIG. 41 for a case of a single virtual space scheme.

Here, the program allocation unit 517 has a program management table as shown in FIG. 43 which indicates the current utilization state of the logical address space. Namely, for each region in the logical address space, the program management table of FIG. 43 contains fields for a start address of this region, an end address of this region, a program ID of a program allocated to this region, a program name of a program allocated to this region, a state of this region, and other information. Here, the program IDs are assigned in an order of the regions to which the programs have been allocated.

Then, when an allocation of a new program to the logical address space is requested from a user or another program by using a system call, the program allocation unit 517 operates according to the flow chart of FIG. 44 as follows.

First, at the step S11, an empty region in the program management table of FIG. 43 is searched by checking the state field of the program management table.

When the empty region is found at the step S12, next at the step S13, the state of this empty region is changed to "in use" state, and the program name and the other information for the new program to be allocated are registered into the program management table.

When the empty region cannot be found in the program management table at the step S12, next at the step S14, an appropriate error processing is carried out.

Now, in this embodiment, because a plurality of user programs are mapped into a single logical address space, it is necessary to protect the improper access from one user program to the other user program sharing the same logical address space, which is provided by the memory protection device 514 in this embodiment.

Here, the number of user programs that are allocated to the same logical address space is determined according to a maximum number of programs for which the sufficient memory protection can be provided by the memory protection device 514. Thus, the allocation of FIG. 42A is for a case in which the maximum number is a number greater than five such as six, while the allocation of FIG. 42B is for a case in which the maximum number is equal to four so that the user programs 405 and 406 in excess of four minus one for the OS 401 are allocated to the second logical address space 420.

More specifically, such an allocation of the programs to a plurality of logical address spaces, without any overlapping address region between adjacently mapped programs, within a limit of the maximum number of programs for which the sufficient memory protection can be provided can be achieved by the program allocation unit 517 as follows. Here, again, for the sake of explanation, the size of each user program is assumed to be fixed to 32 Mbytes.

Here, the program allocation unit 517 has a program management table as shown in FIG. 45 which indicates the current utilization state of the logical address space. This program management table of FIG. 45 differs from that shown in FIG. 43 in that, for each region in the logical address space, the program management table of FIG. 45 contains fields for a region number identifying this region, a start address of this region, an end address of this region, a program name of a program allocated to this region, a state of this region, a logical address space number of a logical address space to which this region belongs, a protection key for identifying this region among the regions belonging to the same logical address space, and other information.

In addition, the program allocation unit 517 also has a logical address space management table shown in FIG. 46 which indicates the current utilization state of the logical address spaces. Namely, for each region of each logical address space, the logical address space management table of FIG. 46 contains fields for a logical address number of this logical address space, a protection key for identifying each region among the regions belonging to this logical address space, a state of this logical address space, a region number for identifying a program using each region of this logical address space which corresponds to the region number in the program management table of FIG. 45, and other information.

Figure 47:
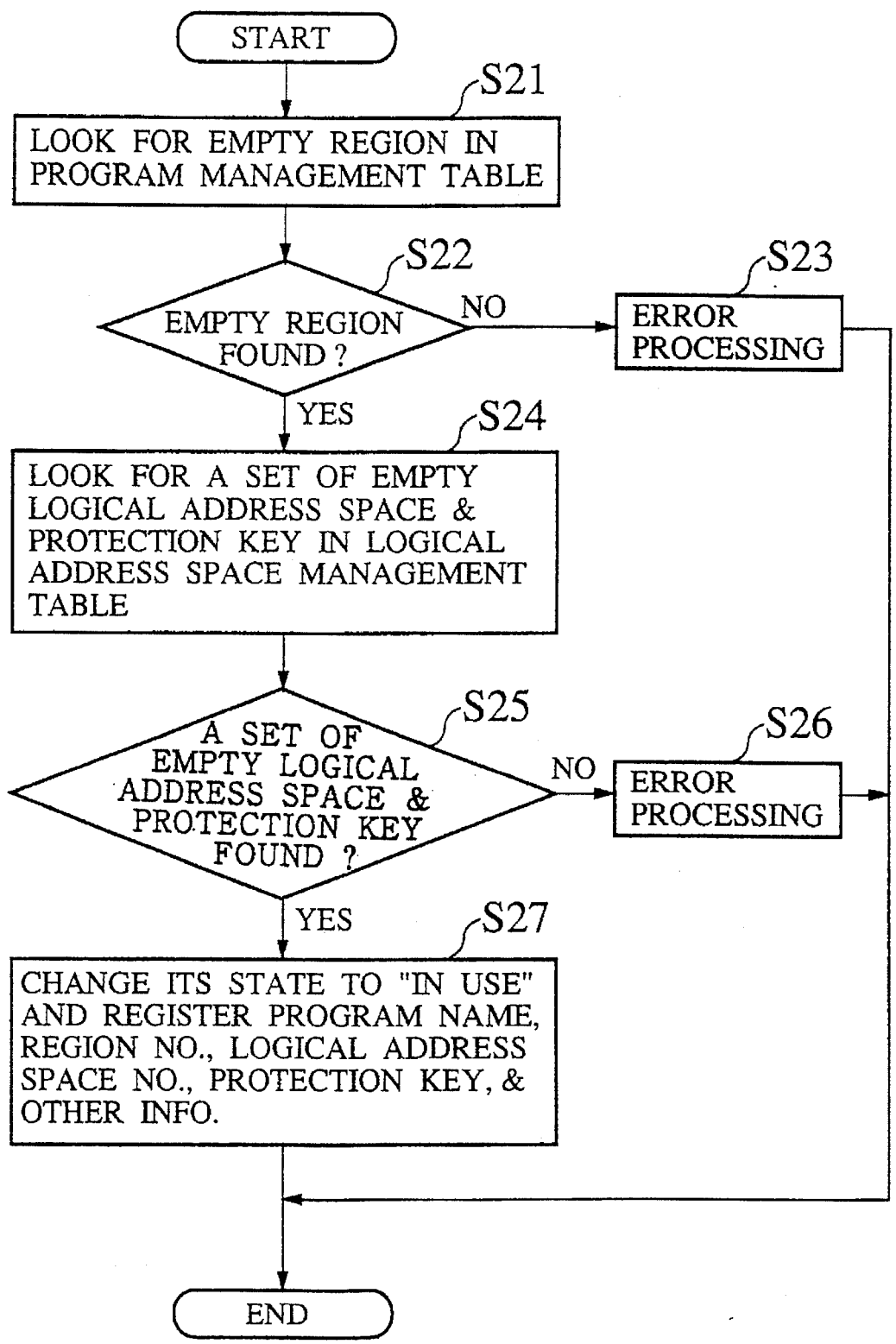
FIG. 47 is a flow chart for the operation of the program management unit in the memory management and protection system of FIG. 41 for a case of a multiple virtual space scheme.

Then, when an allocation of a new program to the logical address space is requested from a user or another program by using a system call, the program allocation unit 517 operates according to the flow chart of FIG. 47 as follows.

First, at the step S21, an empty region in the program management table of FIG. 45 is searched by checking the state field of the program management table.

When the empty region cannot be found in the program management table at the step S22, next at the step S23, an appropriate error processing is carried out.

When the empty region is found at the step S22, next at the step S24, a set of the empty logical address space and the protection key are searched in the logical address space of FIG. 46.

When the appropriate set of the empty logical address space and the protection key cannot be found in the logical address space management table at the step S25, next at the step S26, an appropriate error processing is carried out.

When the appropriate set of the empty logical address space and the protection key is found at the step S25, next at the step S27, the state of this empty logical address space is changed to "in use" state, and the program name, region number, logical address space number, protection key, and the other information for the new program to be allocated are registered into the program management table of FIG. 45 and the logical address space management table of FIG. 46.

Now, in the memory protection device 514 shown in FIG. 41, the boundaries of the allocated address region for each user program according to the allocation of the user programs determined by the program allocation unit 517 are memorized in the address region boundary memory unit 520, while the program ID of the currently executed program is supplied from the program execution unit 518 to the address region boundary memory unit 520. Then, the improper access detection unit 521 detects the occurrence of the improper access whenever the logical address to be accessed by the memory access execution unit 519 is outside of the allocated address region of the currently executed program. When the occurrence of the improper access is detected, the improper access detection unit 521 notifies the occurrence of the improper access to the memory access execution unit 519.

The TLB 515 manages the data cached In the logical cache 512 by using the address table. When the occurrence of the cache miss in the logical cache 512 is notified from the memory access execution unit 519 to the memory interface 516, the memory interface 516 replaces the least necessary data in the logical cache 512 with a new data from the memory 513 and an address table entry corresponding to the replaced least necessary data with a new address table entry corresponding to the new data in the TLB 515.

Now, in a case of adopting a single virtual space scheme of FIG. 42A, the context switching can be achieved without making any operation on the logical cache 512 and the TLB 515 at all, because the user programs are allocated to the logical address space by the program allocation unit 517 in advance such that no logical address is used by more than one user program. Thus, in this case, the context switching can be made while the data in the logical cache 512 and the corresponding address table entry in the TLB 515 remain unchanged, so that the switching of the context can be achieved at high speed.

Moreover, after the context switching from an original context to a new context has been made, the data in the logical cache 512 will be replaced by new data related to the new context gradually as the cache miss occurs one by one. Here, in this case, when the context switching to return to the original context is made then, there is a good chance for the data related to the original context to be still remaining in the logical cache 512, and so on, so that the replacement of the data in the logical cache 512 can be kept to the absolute minimum. Therefore, in this case, the logical cache 512 and the TLB 515 can be utilized very efficiently throughout the system operation.

In this case, the execution of a user program is carried out according to the flow chart of FIG. 48, as follows.

First, at the step S1, the instruction to be executed is fetched by the processor 511, and the access check for the access to be made by this instruction is made by the memory protection device 514 at the step S2 while at the same time the TLB hit in the TLB 515 for this access is checked by the TLB 515 at the step S3.

When the memory protection device 514 detects the occurrence of the improper access, the occurrence of the improper access is notified to the memory access execution unit 519 such that the execution of the instruction is interrupted at the step S4.

On the other hand, when the TLB miss occurs at the TLB 515 at the step S3, next at the step S5, the memory interface fetches the necessary new data from the memory 513 and replaces the least necessary data in the logical cache 512 while replacing the corresponding address table entry in the TLB 515 by a new address table entry.

In a case the access is permitted by the memory protection device 514 at the step S2, and the TLB hit is obtained at the step S3 or the replacement of the necessary new data in the logical cache 512 is completed at the step S5, next at the step S6, the processor 511 executes the instruction to carry out the desired operation such as the reading of the data from the logical cache 512 or the writing of the data into the logical cache 512.

Then, a program counter in the processor 511 is increased by one at the step S7, and this process is repeated from the step S1 until the program is found to be finished at the step S8.

Next, in a case of adopting a multiple virtual space scheme of FIG. 42B in which each logical address space has the protection key equal to four, there is a situation in which the context switching over the different logical address spaces is required. For example, the context switching from the user program 402 on the logical address space 410 to the user program 405 on the logical address space 420 can be required.

In such a situation, each TLB entry in the TLB 515 should include an invalidation bit as sown in FIG. 49. In this TLB 515 of FIG. 49, the first bit "a" of the logical addresses and the first bit "A" of the physical addresses indicate the addresses for the user program 405, while the first bit "b" of the logical address and the first it "B" of the physical address indicate the addresses for the user program 402.

The invalidation bit is used to indicate the valid data lines in this TLB 515 as follows. For example, when the OS 401 makes the scheduling for the context switching from the user program 402 to the user program 405, it can be recognized from the program management table of FIG. 45 that the user program 402 is protected by the protection key 2 of the logical address space 410, while the user program 405 is protected by the protection key 2 of the logical address space 420, so that the context switching from the logical address space 410 to the logical address space 420 is required. Accordingly, the OS 401 carries out the usual context switching operation such as the saving of the context of the user program 402, the loading of the context of the user program 405, and the switching of the logical address spaces.

In addition, the OS 401 adjusts the invalidation bits in the TLB 515 such that the invalidation bits for the data lines belonging to the user programs 402, 403, and 404 allocated to the first logical address space 410, such as the second data line belonging to the user program 402, are set to "1" to indicate that these data lines are invalidated, while the invalidation bits for the data line belonging to the user program 405, such as the first and third data lines, are set to "0" to indicate these data lines are valid. Here, however, the data lines belonging to the OS 401 itself are left to be valid, as they are common to both of the logical address spaces.

Figure 48:
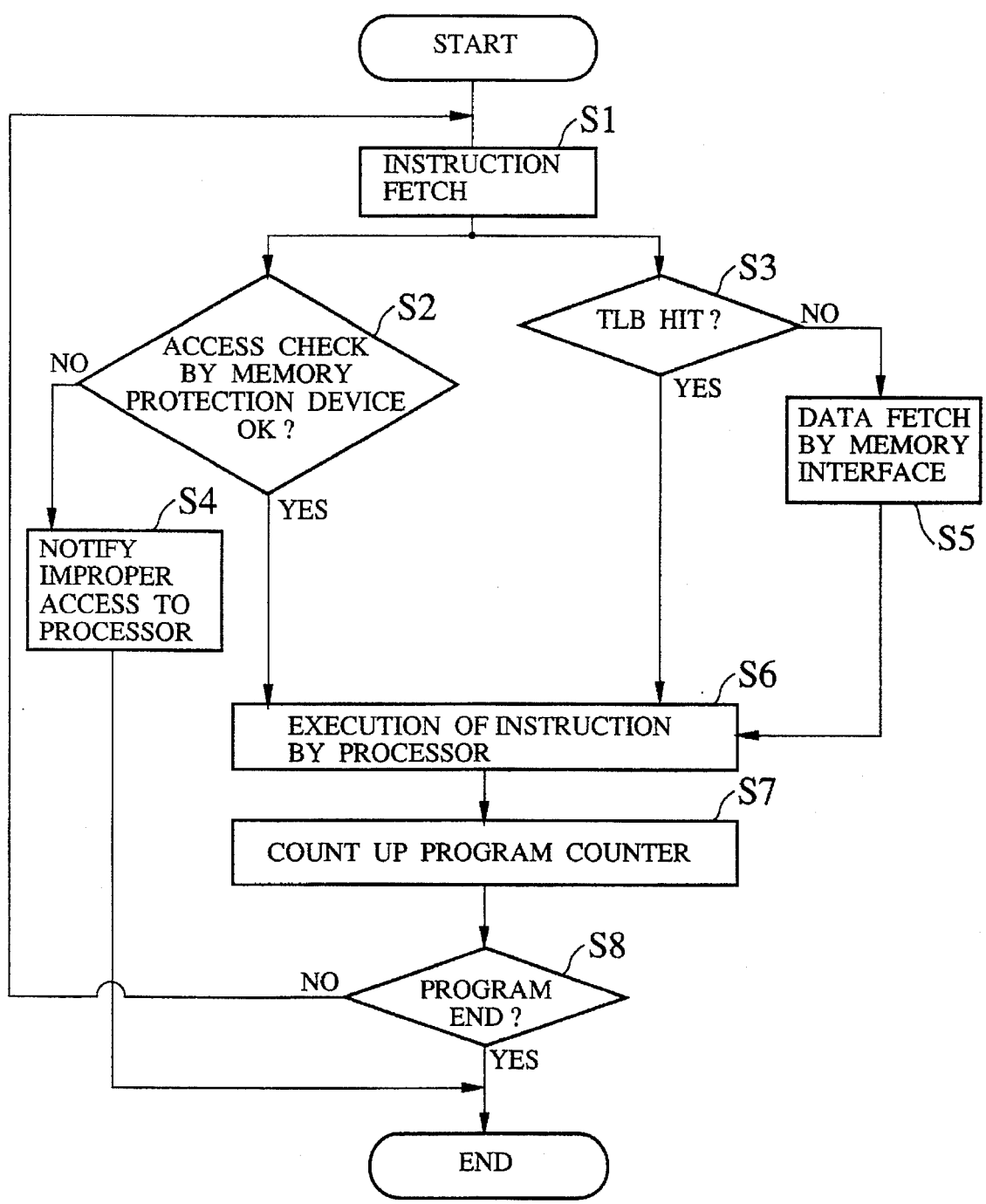
FIG. 48 is a flow chart for the operation of the memory management and protection system of FIG. 41 for a case of a single virtual space scheme.
Figure 50:
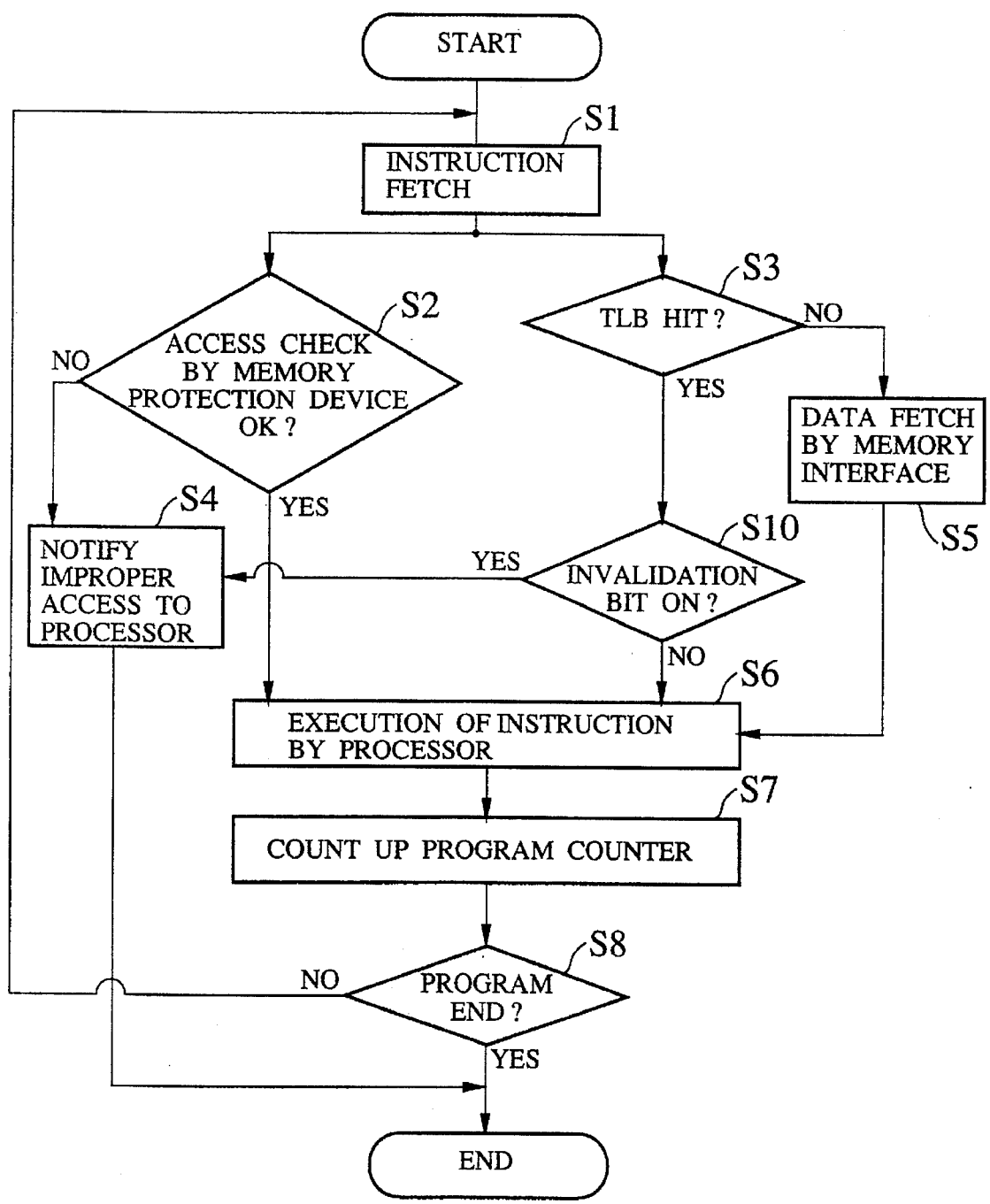
FIG. 50 is a flow chart for the operation of the memory management and protection system of FIG. 41 for a case of a multiple virtual space scheme.

In correspondence to this modification of the TLB 515, the flow chart of FIG. 48 should be modified to include the step S10 as indicated in the modified flow chart shown in FIG. 50, after the step S3, at which the invalidation bit of the data line which made the TLB hit at the step S3 is checked. When the invalidation bit is "0", the process proceeds to the next step S6, whereas when the invalidation bit is "1", the process proceeds to the step S4 to inform the occurrence of the improper access to the processor 511.

The invalidation bit in the TLB 515 is necessary in this case because the memory protection device 514 can provide the protection against the improper accesses only within each logical address space so that there is a need to prevent the improper access from a user program on one logical address space to another logical address space.

In a case another context switching for returning from the user program 405 to the user program 402 is made subsequently, the invalidation bits in the TLB 515 are re-adjusted such that the invalidation bits for the data lines belonging to the user program 402 are set to "0" to indicate that these data lines are valid, while the invalidation bits for the data line belonging to the user program 405 are set to "1" to indicate these data lines are invalidated, so that any data lines for the user program 402 which are still remaining in the TLB 515 when the context returns to the user program 402 can be used immediately. Thus, in this embodiment, there is no need to invalidate the entire TLB 515 at a time of the context switching, so that it becomes possible to utilize the TLB more effectively and efficiently, and consequently it becomes possible to realize the high speed execution of the multiple programs.

It is to be noted that the check of the TLB hit and the check of the invalidation bit can be carried out in parallel by using a simple configuration, so that the deterioration of the processing speed due to the cache related operations is far less than a conventional case which heavily relies on the cache refilling.

It is also to be noted that the invalidation bits are provided in the TLB 515 rather than in the logical cache 512 in this embodiment because it is more efficient to carry out the invalidation operation in the TLB.

Now, in a case any two user programs such as the user programs 404 and 405 call up each other frequently such that the switching of the logical address spaces is required very often, the efficiency of the operation of this memory management and protection system will be deteriorated. In such a case, in order to prevent the deterioration of the operation efficiency, the program allocation unit 517 may re-allocate the user programs 402 to 406 to the logical address spaces 410 and 420 as shown in FIG. 51A, where the user programs 404 and 405 which are calling up each other frequently are allocated to the same logical address space 420 while all the remaining user programs 402, 403, and 406 are allocated to another logical address space 410, so as to eliminate the overhead due to the switching of the logical address spaces required by the mutual calling between the user programs 404 and 405.

Figure 51A:
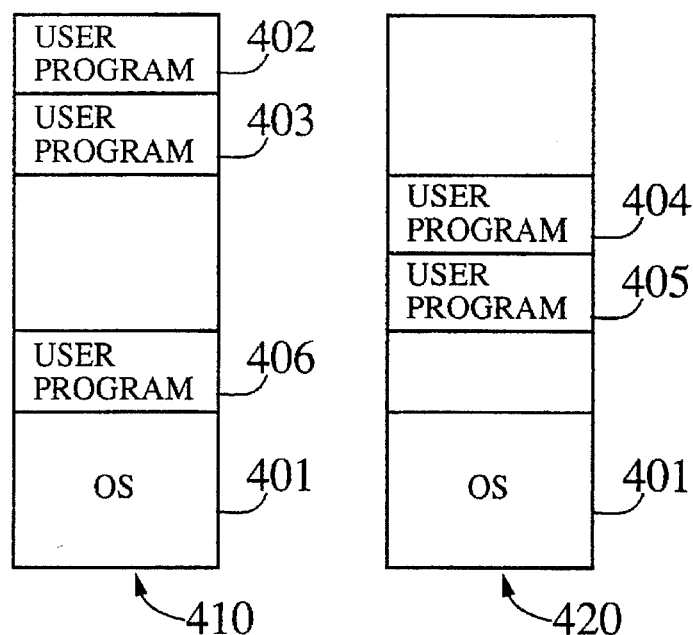
FIG. 51A is a diagrammatic representation of another example of allocation of the multiple programs to two logical address space in the memory management and protection system of FIG. 41.

In this case, the other information field of the program management table shown in FIG. 45 can be utilized to record the previously executed program name, in order to facilitate a regular analysis of the calling order relationships among the user programs, according to which the re-allocation of the user programs to the logical address spaces as shown in FIG. 51A can be effectuated.

Figure 51B:
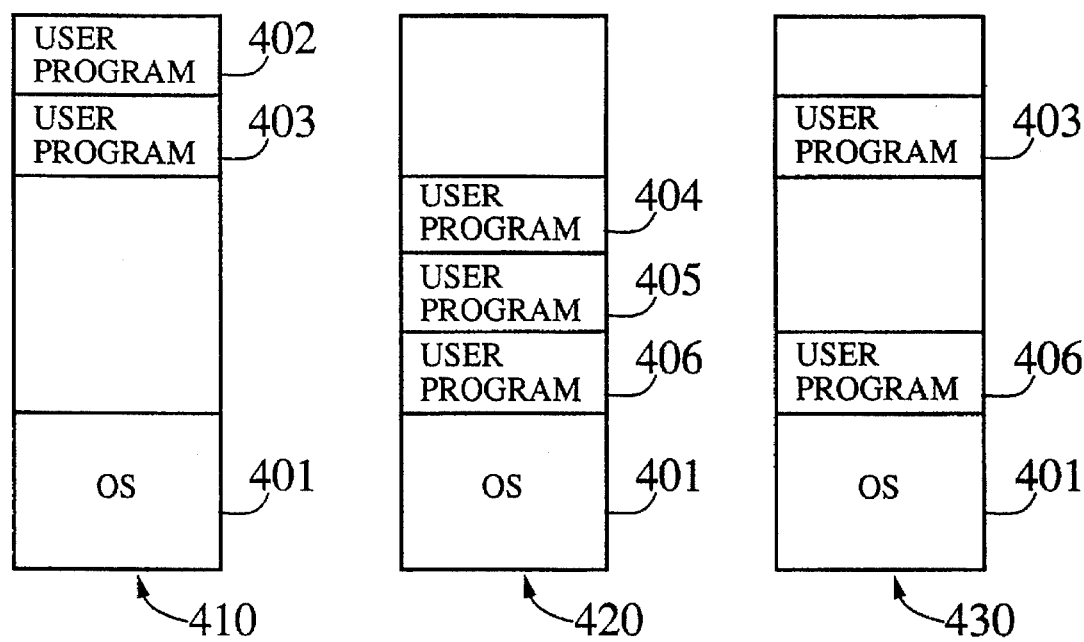
FIG. 51B is a diagrammatic representation of one example of allocation of the multiple programs to three logical address spaces in the memory management and protection system of FIG. 41.

Here, in a case the frequent mutual calling occurs among four user programs 408, 404, 405, and 406 while the protection key for each logical address space is only three, it is impossible to allocate all these four user programs to the same logical address space. In such a case, the user programs 402 to 406 can be divided into groups of relatively frequently related user programs, such that each group can be allocated to its own logical address space. Namely, as shown in FIG. 51B, a group of the user programs 402 and 403 can be allocated to the logical address space 410, and the group of the user programs 404, 405, and 406 can be allocated to the logical address space 420, while the group of the user programs 403 and 406 can be further allocated to the logical address space 430 in duplicate.

In this case, the other information field of the program management table shown in FIG. 45 can also be utilized in the same manner as described above for a case of the allocation of FIG. 51A.

Figure 52:
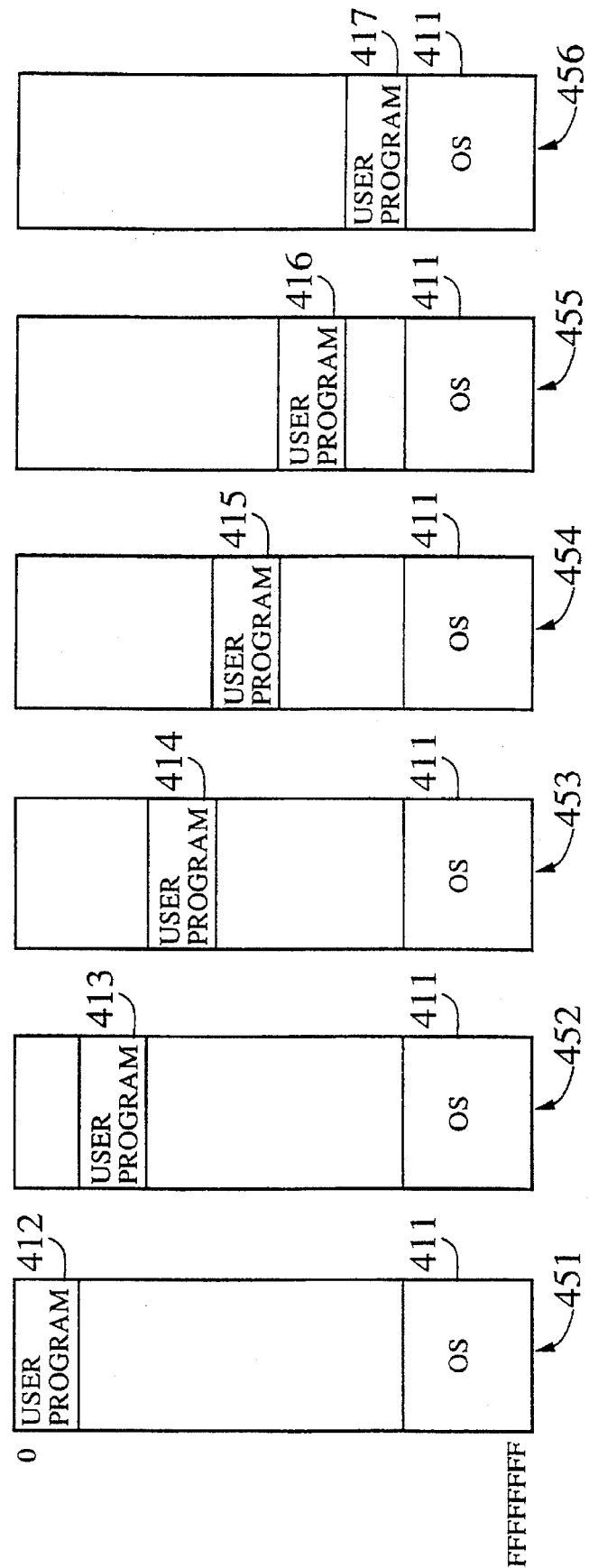
FIG. 52 is a diagrammatic representation of one example of allocation of the multiple programs to a plurality of logical address spaces in the memory management and protection system of FIG. 41.

Referring now to FIG. 52, an alternative allocation of the programs to a plurality of logical address spaces, without any overlapping address region between adjacently mapped programs, within a limit of the maximum number of programs for which the sufficient memory protection can be provided will be described. This alternative allocation of FIG. 52 is suitable for a case in which the memory protection device 514 provides only two protection modes including the user mode and the supervisor mode.

Here, the program allocation unit 517 allocates the user programs to the logical address spaces as shown in FIG. 52, in which the OS 411 is allocated to each one of the logical address spaces 451 to 456 at the common logical address, while each one of the user programs 412 to 417 is allocated separately to each one of the logical address spaces 451 to 456, respectively, without any logical address which is occupied by more than one of the user programs 412 to 417. In this allocation, the memory protection device 514 provides the protection mode of the supervisor mode to the OS 411 such that the OS 411 is accessible only when the execution mode is the supervisor mode, while the user programs 412 to 417 are provided with the protection mode of the user mode.

In this allocation of FIG. 52, when the user program 412 on the logical address space 451 called up the user program 417 on the logical address space 456, the OS 411 carries out the context switching operation including the saving of the context of the user program 412, switching from the logical address space 451 to the logical address space 456, and the loading of the context of the user program 417, such that the user program 417 can be executed next.

In this allocation of FIG. 52, because the allocation of the user programs 412 to 417 is such that there is no logical address which is occupied by more than one of the user programs 412 to 417, the user programs can be uniquely specified in terms of the logical addresses alone, so that it becomes possible to realize the remote procedure call (RPC) of direct call up type using the logical addresses rather than the usual RPC of indirect call up type using the program names.

Now, this allocation of FIG. 52 can be utilized for the server-client type programming in which only one OS and one user program are to be allocated to one logical address space. For example, the user programs 412 to 414 can be the client programs while the user programs 415 to 417 can be the server programs such that any one of the client programs 412 to 414 can call up any one of the server programs 415 to 417, but the calling from the server programs 415 to 417 to any one of the client programs 412 to 414, as well as the calling among the client programs 412 to 414 themselves or the server programs 415 to 417 themselves is prohibited.

Such a calling order relationships among the user programs 412 to 417 can be summarized in a form to the ACL shown in FIG. 53 which indicates from which user program can the calling be made to which user program, where a circle mark indicates the calling from the user program of that row to the user program of that column is possible, while a cross mark indicates the calling from the user program of that row to the user program of that column is impossible. This ACL of FIG. 53 can be prepared by the user or the program through the system call of the OS 411.

More specifically, the call up from the user program 412 to the user program 417 for example can carried out according to the flow chart of FIG. 54, as follows.

Here, the user program 412 calls up the user program 417 by specifying the logical address in the user program 417 directly. In response, when the processor attempts to execute the instruction at the specified logical address at the step S31, this access will be judged as improper one by the access check by the memory protection device 514 at the step S32 because the logical address of the user program 417 specified by the user program 412 in the current logical space 451 is not allocated with any program and therefore inaccessible. Consequently, the trap processing is activated, and the process proceeds to the step S33 next. Here, in a case the specified logical address is accessible in the same logical space, the process proceeds to the step S41 at which the execution of the instruction is carried out immediately by the processor.

At the step S33, an execution of the current instruction in the currently executed program is interrupted and the processing is handed over to the OS 411. Then, the OS 411 determines which program is wishing to make an access to which program according to the logical address of the interrupted instruction and the access target logical address of the interrupted instruction at the step S34, and checks if this access is a permitted one according to the ACL of FIG. 53 managed by the OS 411, in order to ascertain whether this access is really improper one or not. In a case of the present example, according to the ACL of FIG. 53, the access from the user program 412 to the user program 417 is permitted.

When the access is a permitted one, next at the step S36, the context of the interrupted program is saved, and the process proceeds to the step S38, whereas when the access is not a permitted one, next at the step S37, the appropriate processing for the improper access is carried out by the OS 411.

At the step S38, the OS 411 judges whether the access target program to be executed next is ready for execution or not according to the program management table managed by the OS 411, i.e., whether the access target program is already allocated to the appropriate logical address space 456 in the "in use" state or not. When the access target program is not ready for execution, next at the step S39, an appropriate logical address space is newly prepared and the access target program is properly allocated to this new logical address space, in a manner substantially similar to that described above in conjunction with FIG. 44 and FIG. 45, such that the access target program becomes ready for execution.

When the access target program is ready for execution, next at the step S40, the context of the access target program is loaded, and then at the step S41, the execution of the instruction by the processor is resumed such that the instruction at the access target logical address in the access target program can be executed next.

The returning from the user program 417 to the user program 412 can also be made similarly.

In a case the access to be made is from the user program 412 to the user program 414, this access will be judged as not a permitted one at the step S35 according to the ACL of FIG. 53, so that the processing for the improper access at the step S37 will take place.

Referring now to FIGS. 55A, 55B, and 55C, a further modification of the alternative allocation shown in FIG. 52 described above will be described.

In this modified allocation, each user program is further divided into a text region on which the instruction codes of the instructions to be executed are present and a data region to be used in reading and writing data during the execution of the instruction, as shown in FIG. 55A. In correspondence, the user mode provided to the user program as the protection mode is further divided into the execution mode, read mode, and write mode, such that only the specified type of access is permitted in each mode.

In the allocation of FIG. 55A, a logical address space 460 contains a client program formed from the user program text region 422 and the user program data region 423, a server program formed by the user program text region 425 and the user program data region 426, a common data region 424 managed by the server program, and the OS 421.

As indicated by the arrows attached on the logical address space 460 in FIG. 55A, the user program text region 422 of the client program is permitted to make accesses for the execution of the RPC to the user program text region 422 itself and the user program text region 425 of the server program. In addition, during the execution at the user program text region 422, the access for the read and the write operations to the user program data region 423 as well as the access for the read operation to the common data region 424 are permitted.

The user program data region 423 of the client program is only accessible from the user program text region 422 for the read and the write operations.

The common data region 424 has a default setting to permit an access from any region for the read operation, but an access for the write operation is permitted only from the user program text region 425 of the server program.

The user program text region 425 of the server program is accessible by the execution of the RPC from the user program text region 422 of the client program, and also permitted to make accesses for the write operation to the common data region 424 and the user program data region 426 which is a dedicated data region of the server program.

The OS 421 manages these access rights assigned to various regions in the logical address space 460 by using the ACL shown in FIG. 56 similar to the ACL of FIG. 53 described above. In the ACL of FIG. 56, "E" mark indicates the access in the execution mode from the region of that row to the region of that column is possible, "R" mark indicates the access in the read mode from the region of that row to the region of that column is possible, and "W" mark indicates the access In the write mode from the region of that row to the region of that column is possible, while a cross mark indicates the access in any mode from the region of that row to the region of that column is impossible. These marks can be given in combination as in "RW" marks appearing in the ACL of FIG. 56. Any other combinations of these marks may also be used. In addition, the ACL of FIG. 56 also contains a row labelled "ALL" which indicates the default setting in which the access rights for all the regions are Identical.

The OS 421 manages these access rights assigned to various regions in the logical address space 460 according to this ACL of FIG. 56 as follows.

Namely, in a case of carrying out the execution operation at the user program text region 422, the user program text region 422 and the regions which are accessible in the read mode and/or the write mode from this user program text region 422 are allocated to the same logical address space 460 as indicated In FIG. 55B in which the user program text region 422 is allocated along with the user program data region 423 which is accessible from the user program text region 422 in the read mode and the write mode, and the common data region 424 which is accessible from the user program text region 422 in the read mode. In FIG. 55B, the logical address space 460 is accompanied by an access mode assignment 461 indicating the access rights of the user program text region 422 with respect to the other regions in the logical address space 460. In the access mode assignment 461, "S" mark indicates the supervisor mode.

Then, when the user program text region 422 executes the RPC with respect to the user program text region 425 by specifying the logical address in the user program text region 425 directly, the region containing the specified logical address in the logical address space 460 is indicated as inaccessible from the user program text region 422 by the access mode assignment 461, so that the access will be detected as the improper access by the memory protection device 514.

Consequently, the trap processing is activated, such that an execution of the current instruction in the user program text region 422 is interrupted and the processing is handed over to the OS 421.

Then, the OS 421 determines which program (region) is wishing to make an access to which program (region) according to the logical address of the interrupted instruction and the access target logical address of the interrupted instruction, and checks if this access is a permitted one according to the ACL of FIG. 56 managed by the OS 421, in order to ascertain whether this access is really improper one or not. In a case of the present example, according to the ACL of FIG. 56, the access in the execution mode from the user program text region 422 to the user program text region 425 is permitted.

Consequently, the context of the interrupted program is saved, and if it is necessary to use a new logical address space, the OS prepare a new logical address space 470 as shown in FIG. 55C, in which the user program text region 425 to be accessed next is allocated at appropriate logical addresses, along with the user program data region 426 which is accessible from the user program text region 425 in the read mode and the write mode, and the common data region 424 which is accessible from the user program text region 425 in the read mode and the write mode.

Then, the access mode assignment 471 indicating the access rights of the user program text region 425 with respect to the other regions in the logical address space 470 is set up as shown in FIG. 55C, according to the ACL of FIG. 56. Here, the access rights of the user program text region 425 can be obtained by looking at the row labelled "425" in the ACL of FIG. 56.

Thus, in this embodiment, the plurality of programs are allocated to the logical address spaces such that at most one execution program, which is capable of executing an instruction for any one of reading from another program, writing to another program, and executing another program, is allocated to each logical address space.

In setting the access rights in the access mode assignment 471, all the access rights indicated at the appropriate row in the ACL of FIG. 56 will be set to the access mode assignment 471, except for an access right in the execution mode to the region other than itself, such as that indicated in the row labelled "422" which contains an access right in the execution mode to the user program text region 425 as well as an access right in the execution mode to itself. In other words, the access right in the execution mode is limited to just one in each logical address space.

Here, however, when there are more than one regions assigned with the identical access modes with respect to the other regions, these regions may be allocated to the same logical address space. In other words, when the ACL of FIG. 56 contains two rows indicating the identical assignment of the access modes for two different regions, these two regions may be allocated to the same logical address space even when this assignment contains an access right in the execution mode to the region other than itself. For example, when a certain program is divided into two parts and the divided parts are allocated to two different regions, these two regions containing the divided parts of the same program may be allocated to the same logical address space together.

Thus, in this embodiment, the plurality of programs can be allocated to the logical address spaces such that at most one unique access mode assigned execution program, which is capable of executing an instruction for any one of reading from another program, writing to another program, and executing another program, and which has unique access modes with respect to other ones of the plurality of programs, can be allocated to each logical address space, while any number of non-unique access mode assigned execution programs, each of which is capable of executing an instruction for any one of reading from another program, writing to another program, and executing another program, and each of which has identical access modes with respect to other ones of the plurality of programs as another non-unique execution program, can be allocated to each logical address space.

The returning from the user program text region 425 to the user program text region 422 can also be made by changing the allocation of FIG. 55C back to the allocation of FIG. 55B similarly.

It is to be noted that the procedure described above which includes the tentative detection of the access to the other logical address space as an improper access by the memory protection device 514 can be rather inefficient. To cope with this drawback, a specialized system call for the changing of the access mode assignment attached to the logical address space may be provided such that the processing is handed over to the OS 421 by this specialized system call every time the RPC is executed and the operation to change the access mode assignment can be carried out by the OS immediately.

It is also to be noted that the procedure described above included the preparation of a new logical address space and the set up of a new access mode assignment for this new logical address space every time the RPC is executed, because by leaving the original logical address space and the original access mode assignment before the execution of the RPC, it is possible to recover the original state in a case of returning from the new program back to the original program. However, this procedure has a disadvantage that it is rather time consuming at a time of the execution of the RPC. In this regard, the procedure described above may be modified such that the changing of the access mode assignment is carried out at the same logical address space, without preparing a new logical address space. This modification is capable of reducing operation time at a time of the execution of the RPC, but it is more time consuming in a case of returning from the new program back to the original program, because the original state must be re-constructed anew.

It is to be noted here that the various embodiment of a memory management and protection system described above are equally applicable to the cases of making accesses to the resources other than the logical address space such as devices, files, shared library, etc.

It is further to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A memory management and protection system, comprising:

address table means having a plurality of address table entries, each address table entry storing a logical address and a physical address corresponding to the logical address;

access control list means, attached to each address table entry, for storing a plurality of program numbers for identifying programs which are permitted to make accesses to the logical address stored in said each address table entry;

hit check means for detecting one of the plurality of program numbers stored in the access control list means attached to one of the address table entries storing the logical address to be accessed, which matches with a current program number identifying a currently executing program;

hit notice means for generating an address table hit notice when the hit check means detects said one of the plurality of program numbers; and means for outputting the physical address stored in said one of the address table entries, when the hit notice means generates the address table hit notice.

2. The system of claim 1, wherein the access control list means further stores an address information indicating an address of a program identified by each of the plurality of program numbers.

3. The system of claim 2, further comprising:

address information detection means for detecting one of a plurality of address informations stored in correspondence to the plurality of program numbers in the access control list means attached to said one of the address table entries storing the logical address to be accessed, which matches with the address information for the currently executing program;

means for generating protection fault notice when the address information detection means fails to detect said one of the plurality of address informations.

4. The system of claim 1, wherein the access control list means further stores a memory access permission indicating a type of memory access permitted to a program identified by each of the plurality of program numbers.

5. The system of claim 4, further comprising:

memory access permission detection means for detecting one of a plurality of memory access permissions stored in correspondence to the plurality of program numbers in the access control list means attached to said one of the address table entries storing the logical address to be accessed, which matches with a memory access mode of a memory access to be made to the logical address to be accessed by the currently executing program;

means for generating protection fault notice when the memory access permission detection means fails to detect said one of the plurality of memory access permissions.

6. The system of claim 1, further comprising means for generating an address table miss notice when the hit check means fails to detect said one of the plurality of program numbers.

7. The system of claim 1, wherein the hit check means determines a matching of said one of the plurality of program numbers with the current program number according to a coincidence of said one of the plurality of program numbers with the current program number.

8. The system of claim 1, wherein the hit check means determines a matching of said one of the plurality of program numbers with the current program number according to a coincidence of a predetermined part of said one of the plurality of program numbers with the predetermined part of the current program number.

9. The system of claim 1, wherein the hit check means determines a matching of said one of the plurality of program numbers with the current program number according to a size relationship indicating whether said one of the plurality of program numbers is greater than or equal to the current program number.

10. The system of claim 1, wherein the plurality of program numbers stored in the access control list means and the current program number are expressed in terms of thread identifiers.

11. The system of claim 1, wherein the plurality of program numbers stored in the access control list means and the current program number are expressed in terms of process identifiers.

12. The system of claim 1, wherein the hit check means simultaneously checks a matching of the current program number and each one of the plurality of program numbers stored in the access control list means.

13. The system of claim 1, wherein each one of the plurality of program numbers stored in the access control list means is replaceable by another plurality of program numbers for identifying other programs which are also permitted to make accesses to the logical address stored in said each address table entry.

* * * * *